(12) United States Patent
Lee et al.

(10) Patent No.: US 11,197,182 B2
(45) Date of Patent: Dec. 7, 2021

(54) TECHNIQUES TO PROVIDE ENERGY EFFICIENT RADIO RESOURCE MANAGEMENT

(71) Applicant: QUALCOMM Incorporated, San Diego, CA (US)

(72) Inventors: Heechoon Lee, San Diego, CA (US); Hung Ly, San Diego, CA (US); Tingfang Ji, San Diego, CA (US); Haitong Sun, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/954,569

(22) Filed: Apr. 16, 2018

(65) Prior Publication Data

US 2018/0302819 A1 Oct. 18, 2018

Related U.S. Application Data

(60) Provisional application No. 62/486,919, filed on Apr. 18, 2017.

(51) Int. Cl.
*H04W 24/10* (2009.01)
*H04B 7/06* (2006.01)
*H04W 84/04* (2009.01)

(52) U.S. Cl.
CPC .......... *H04W 24/10* (2013.01); *H04B 7/0617* (2013.01); *H04B 7/0626* (2013.01);
(Continued)

(58) Field of Classification Search
None
See application file for complete search history.

(56) References Cited

U.S. PATENT DOCUMENTS

| 2015/0172990 A1* | 6/2015 | Patel | ................. H04W 36/0083 |
| | | | 370/332 |
| 2016/0036511 A1* | 2/2016 | Ko | ....................... H04B 7/0456 |
| | | | 370/252 |

(Continued)

OTHER PUBLICATIONS

International Search Report and Written Opinion—PCT/US2018/027878—ISA/EPO—dated Sep. 4, 2018 (173812WO).

(Continued)

*Primary Examiner* — Gregory B Sefcheck
*Assistant Examiner* — Suk Jin Kang
(74) *Attorney, Agent, or Firm* — Holland & Hart LLP

(57) ABSTRACT

A method of wireless communications at a user equipment (UE) includes receiving, from a serving cell associated with a wireless network, a radio resource management (RRM) mode indicator that indicates a set of one or more beams for which cell measurement and reporting is to be performed by the UE; performing at least one cell measurement on at least one synchronization signal (SS) block received from at least one neighboring cell; determining, based at least in part on the RRM mode indicator, whether to decode a physical broadcast channel (PBCH) received in each SS block of the at least one SS block; and transmitting a cell measurement report, the cell measurement report based at least in part on the at least one cell measurement, the cell measurement report selectively including at least one beam index based at least in part on whether the PBCH is decoded.

28 Claims, 24 Drawing Sheets

(52) U.S. Cl.
CPC ......... *H04B 7/0632* (2013.01); *H04W 84/045* (2013.01); *Y02D 30/70* (2020.08)

(56) References Cited

U.S. PATENT DOCUMENTS

| | | | |
|---|---|---|---|
| 2017/0195998 A1* | 7/2017 | Zhang | H04B 7/086 |
| 2017/0207845 A1* | 7/2017 | Moon | H04B 7/088 |
| 2017/0208494 A1* | 7/2017 | Moon | H04W 24/10 |
| 2017/0325244 A1* | 11/2017 | Zhang | H04W 24/10 |
| 2017/0325260 A1* | 11/2017 | Guo | H04L 5/0007 |
| 2017/0359791 A1* | 12/2017 | Onggosanusi | H04L 5/0023 |
| 2018/0007679 A1* | 1/2018 | Lee | H04W 72/048 |
| 2018/0014278 A1* | 1/2018 | Papasakellariou | H04W 48/12 |
| 2018/0042000 A1* | 2/2018 | Zhang | H04B 7/04 |
| 2018/0048413 A1* | 2/2018 | Liu | H04J 11/0069 |
| 2018/0102817 A1* | 4/2018 | Park | H04B 7/04 |
| 2018/0115990 A1* | 4/2018 | Abedini | H04W 56/004 |
| 2018/0123654 A1* | 5/2018 | Park | H04B 7/04 |
| 2018/0124718 A1* | 5/2018 | Ng | H04B 7/15 |
| 2018/0132168 A1* | 5/2018 | Ingale | H04W 48/12 |
| 2018/0176065 A1* | 6/2018 | Deng | H04B 7/0695 |
| 2018/0192384 A1* | 7/2018 | Chou | H04W 56/001 |
| 2018/0198585 A1* | 7/2018 | Lin | H04L 5/005 |
| 2018/0198659 A1* | 7/2018 | Ko | H04L 5/005 |
| 2018/0199328 A1* | 7/2018 | Sang | H04B 7/0617 |
| 2018/0212651 A1* | 7/2018 | Li | H04B 7/0695 |
| 2018/0227031 A1* | 8/2018 | Guo | H04B 7/0626 |
| 2018/0227866 A1* | 8/2018 | Jung | H04W 56/001 |
| 2018/0227867 A1* | 8/2018 | Park | H04L 5/0053 |
| 2018/0227886 A1* | 8/2018 | Chou | H04W 72/046 |
| 2018/0227929 A1* | 8/2018 | Yoo | H04L 5/005 |
| 2018/0262313 A1* | 9/2018 | Nam | H04L 5/005 |
| 2018/0279145 A1* | 9/2018 | Jung | H04W 24/08 |
| 2018/0279240 A1* | 9/2018 | Sheng | H04J 11/0069 |
| 2018/0279241 A1* | 9/2018 | Lee | H04W 56/001 |
| 2018/0279380 A1* | 9/2018 | Jung | H04W 56/0005 |
| 2018/0302182 A1* | 10/2018 | Ly | H04L 27/2613 |
| 2019/0028170 A1* | 1/2019 | Zhang | H04B 7/04 |
| 2019/0044584 A1* | 2/2019 | Lee | H04B 7/0417 |
| 2019/0053235 A1* | 2/2019 | Novlan | H04L 7/0008 |
| 2019/0053288 A1* | 2/2019 | Zhou | H04L 5/0091 |
| 2019/0081684 A1* | 3/2019 | da Silva | H04L 5/005 |
| 2019/0098520 A1* | 3/2019 | Kim | H04W 24/04 |
| 2019/0103931 A1* | 4/2019 | Yl | H04W 56/00 |
| 2019/0132759 A1* | 5/2019 | Park | H04W 72/0453 |
| 2019/0141617 A1* | 5/2019 | Abedini | H04L 5/0051 |
| 2019/0200249 A1* | 6/2019 | Yoon | H04W 72/042 |
| 2019/0268205 A1* | 8/2019 | Shin | H04L 5/0048 |
| 2019/0268813 A1* | 8/2019 | Ramachandra | H04W 48/16 |
| 2019/0268852 A1* | 8/2019 | Ryu | H04W 52/38 |
| 2019/0313314 A1* | 10/2019 | Yang | H04W 24/10 |
| 2019/0327650 A1* | 10/2019 | Yiu | H04W 36/06 |
| 2019/0364452 A1* | 11/2019 | Hwang | H04B 17/318 |
| 2020/0007371 A1* | 1/2020 | Ko | H04L 27/2613 |
| 2020/0015273 A1* | 1/2020 | Zhang | H04L 5/0051 |
| 2020/0022010 A1* | 1/2020 | Kim | H04W 24/02 |
| 2020/0037212 A1* | 1/2020 | Ramachandra | H04W 36/08 |
| 2020/0053607 A1* | 2/2020 | Ingale | H04W 36/0058 |
| 2020/0245200 A1* | 7/2020 | Xiong | H04B 7/0695 |

OTHER PUBLICATIONS

Nokia et al., "Beam Measurements in NR", 3GPP DRAFT; R4-1609327, 3rd Generation Partnership Project (3GPP), Mobile Competence Centre; 650, Route Des Lucioles; F-06921 Sophia-Antipolis Cedex; France, vol. RAN WG4, No. Reno, USA; 2016111-20161118 Nov. 4, 2016, XP051194516, Retrieved from the Internet: URL:http://www.3gpp.org/ftp/tsg_ran/WG4_Radio/TSGR4_81/Docs/, 6 pages.
Partial International Search Report—PCT/US2018/027878—ISA/EPO—dated Jun. 20, 2018 (173812WO).
VIVO: "Support Beam Operation for RRM Measurement", 3GPP DRAFT; R2-1702942_Support beam operation for RRM measurement, 3rd Generation Partnership Project (3GPP), Mobile Competence Centre; 650, Route Des Lucioles; F-06921 Sophia-Antipolis Cedex; France, vol. RAN WG2, No. Spokane, USA; 20170403-20170407 Mar. 25, 2017, XP051254341, Retrieved from the Internet: URL:http://www.3gpp.org/ftp/tsg_ran/WG2_RL2/TSGR2_97bis/Docs/ [retrieved on Mar. 25, 2017], 2 pages.

* cited by examiner

TECHNIQUES TO PROVIDE ENERGY EFFICIENT RADIO RESOURCE MANAGEMENT

CROSS REFERENCES

The present Application for Patent claims priority to U.S. Provisional Patent Application No. 62/486,919 by Lee et al., entitled "Techniques to Provide Energy Efficient Radio Resource Management," filed Apr. 18, 2017, assigned to the assignee hereof, and which is hereby expressly incorporated by reference herein in its entirety.

BACKGROUND

Field of the Disclosure

The present disclosure, for example, relates to wireless communications systems, and more particularly to techniques to provide energy efficient radio resource management (RRM).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communications system may include a number of base stations, each simultaneously supporting communication for multiple communication devices, otherwise known as user equipments (UEs). In a Long-Term Evolution (LTE) or LTE-Advanced (LTE-A) network, a set of one or more base stations may define an eNodeB (eNB). In a next generation, new radio (NR), millimeter wave (mmW), or 5G network, a base station may take the form of a smart radio head (or radio head (RH)) or access node controller (ANC), with a set of smart radio heads in communication with an ANC defining a gNodeB (gNB). A base station may communicate with a set of UEs on downlink channels (e.g., for transmissions from a base station to a UE) and uplink channels (e.g., for transmissions from a UE to a base station).

Wireless devices that operate in mmW frequency ranges, e.g., 28 GHz, 40 GHz, 60 GHz, etc. may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. In some cases, a base station may transmit signals on a broadcast channel by repetitively transmitting the signals while changing the beam on which the signals are transmitted (e.g., the base station may transmit the signals on each of a plurality of beams while performing a beam sweep). In other cases, a base station may repetitively transmit signals on a broadcast channel without changing the beam on which the signals are transmitted. In some cases, a base station may repetitively transmit a group of signals defining a synchronization signal (SS) block. The signals transmitted within the SS block may include a primary synchronization signal (PSS), a secondary synchronization signal (SSS), and/or a physical broadcast channel (PBCH). These signals may be used by a UE for cell measurement, acquisition of a network, or other purposes.

SUMMARY

When a base station transmits a plurality of synchronization signal (SS) blocks carrying duplicative signals on different beams (or on a same beam, but at different times), and a user equipment (UE) receives one of the SS blocks, the UE may determine the timing of the SS block with respect to a slot boundary, subframe boundary, frame boundary, or some other timing reference, so that the UE may synchronize with the base station. In some examples, the timing of the SS block may be determined based at least in part on an SS block index, which may convey a beam index and/or the location of the SS block within a sequence of SS blocks. In some cases, the SS block index may be transmitted/received in a physical broadcast channel (PBCH) of an SS block. A UE may therefore have to decode the PBCH to obtain the SS block index. However, decoding a PBCH of an SS block can consume substantially more resources (e.g., time, power, etc.) than decoding signals such as a primary synchronization signal (PSS) or a secondary synchronization signal (SSS). In accordance with techniques described in the present disclosure, an radio resource management (RRM) mode indicator may be transmitted from a base station to a UE. The RRM mode indicator may indicate a set of one or more beams for which cell measurement and reporting is to be performed by the UE, and may enable the UE to refrain from decoding a PBCH in one or more SS blocks. The RRM mode indicator may also indicate when a cell measurement is to be reported to the base station, and whether and/or which parameters are to be transmitted with the cell measurement. In accordance with other techniques described in the present disclosure, repetitions of SS blocks may be managed, and SS blocks may be combined.

In one example, a method of wireless communications at a UE is described. The method may include receiving at the UE, from a serving cell associated with a wireless network, a RRM mode indicator that indicates a set of one or more beams for which cell measurement and reporting is to be performed by the UE; performing at least one cell measurement on at least one SS block received from at least one neighboring cell; determining, based at least in part on the RRM mode indicator, whether to decode a PBCH received in each SS block of the at least one SS block; and transmitting a cell measurement report, the cell measurement report based at least in part on the at least one cell measurement, and the cell measurement report selectively including at least one beam index based at least in part on whether the PBCH is decoded.

In one example, an apparatus for wireless communications at a UE is described. The apparatus may include means for receiving at the UE, from a serving cell associated with a wireless network, a RRM mode indicator that indicates a set of one or more beams for which cell measurement and reporting is to be performed by the UE; means for performing at least one cell measurement on at least one SS block received from at least one neighboring cell; means for determining, based at least in part on the RRM mode indicator, whether to decode a PBCH received in each SS block of the at least one SS block; and means for transmitting a cell measurement report, the cell measurement report based at least in part on the at least one cell measurement, and the cell measurement report selectively including at least one beam index based at least in part on whether the PBCH is decoded.

In one example, another apparatus for wireless communications at a UE is described. The apparatus may include a processor, memory in electronic communication with the processor, and instructions stored in the memory. The instructions may be executable by the processor to receive at the UE, from a serving cell associated with a wireless network, a RRM mode indicator that indicates a set of one or more beams for which cell measurement and reporting is to be performed by the UE; to perform at least one cell measurement on at least one SS block received from at least one neighboring cell; to determine, based at least in part on the RRM mode indicator, whether to decode a PBCH received in each SS block of the at least one SS block; and to transmit a cell measurement report, the cell measurement report based at least in part on the at least one cell measurement, and the cell measurement report selectively including at least one beam index based at least in part on whether the PBCH is decoded.

In one example, a non-transitory computer-readable medium storing computer-executable code for wireless communications at a UE is described. The code may be executable by a processor to receive at the UE, from a serving cell associated with a wireless network, a RRM mode indicator that indicates a set of one or more beams for which cell measurement and reporting is to be performed by the UE; to perform at least one cell measurement on at least one SS block received from at least one neighboring cell; to determine, based at least in part on the RRM mode indicator, whether to decode a PBCH received in each SS block of the at least one SS block; and to transmit a cell measurement report, the cell measurement report based at least in part on the at least one cell measurement, and the cell measurement report selectively including at least one beam index based at least in part on whether the PBCH is decoded.

In some examples of the method, apparatus, and non-transitory computer-readable medium described above, the set of one or more beams indicated by the RRM mode indicator may include a single beam, and the method, apparatus, and non-transitory computer-readable medium may further include processes, features, means, or instructions for monitoring the single beam for the at least one SS block; determining, based at least in part on the RRM mode indicator, to refrain from decoding the PBCH received in each SS block of the at least one SS block; and formatting the cell measurement report, based at least in part on the RRM mode indicator, to include an association of a cell identity (cell ID) of a neighboring cell and one or more of the at least one cell measurement.

In some examples of the method, apparatus, and non-transitory computer-readable medium described above, the set of one or more beams indicated by the RRM mode indicator may include a plurality of beams, and the method, apparatus, and non-transitory computer-readable medium may further include processes, features, means, or instructions for monitoring the plurality of beams for the at least one SS block. In some examples of the method, apparatus, and non-transitory computer-readable medium described above, the at least one cell measurement may include at least one intra-frequency measurement on the at least one SS block.

Some examples of the method, apparatus, and non-transitory computer-readable medium described above may further include processes, features, means, or instructions for determining a maximum value of the at least one cell measurement; determining, based at least in part on the RRM mode indicator, to refrain from decoding the PBCH received in each SS block of the at least one SS block; and formatting the cell measurement report, based at least in part on the RRM mode indicator, to include an association of a cell ID of a neighboring cell and the maximum value of the at least one cell measurement.

Some examples of the method, apparatus, and non-transitory computer-readable medium described above may further include processes, features, means, or instructions for determining a maximum value of the at least one cell measurement; determining, based at least in part on the RRM mode indicator, to decode a first PBCH received in a first SS block associated with the maximum value of the at least one cell measurement; and formatting the cell measurement report, based at least in part on the RRM mode indicator, to include an association of a cell ID of a neighboring cell, a beam index obtained from the decoded first PBCH, and the maximum value of the at least one cell measurement.

Some examples of the method, apparatus, and non-transitory computer-readable medium described above may further include processes, features, means, or instructions for determining a maximum value of the at least one cell measurement; determining that the maximum value satisfies a threshold; determining, based at least in part on the RRM mode indicator and the determination that the maximum value satisfies the threshold, to decode a first PBCH received in a first SS block associated with the maximum value of the at least one cell measurement; and formatting the cell measurement report, based at least in part on the RRM mode indicator and the determination that the maximum value satisfies the threshold, to include an association of a cell ID of a neighboring cell, a beam index obtained from the decoded first PBCH, and the maximum value of the at least one cell measurement.

Some examples of the method, apparatus, and non-transitory computer-readable medium described above may further include processes, features, means, or instructions for determining a maximum value of the at least one cell measurement; determining that the maximum value fails to satisfy a threshold; determining, based at least in part on the RRM mode indicator and the determination that the maximum value fails to satisfy the threshold, to refrain from decoding the PBCH received in each SS block of the at least one SS block; and formatting the cell measurement report, based at least in part on the RRM mode indicator and the determination that the maximum value fails to satisfy the threshold, to include an association of a cell ID of a neighboring cell and the maximum value of the at least one cell measurement.

Some examples of the method, apparatus, and non-transitory computer-readable medium described above may further include processes, features, means, or instructions for determining a maximum value of the at least one cell measurement per beam, for a set of one or more beams; identifying one or more of the maximum values that satisfies a threshold; determining, based at least in part on the RRM mode indicator and the identified one or more of the maximum values that satisfy the threshold, to decode a set of one or more PBCHs received in a set of one or more SS blocks associated with the identified one or more of the maximum values; and formatting the cell measurement report, based at least in part on the RRM mode indicator and the identified one or more of the maximum values that satisfies the threshold, to include, per beam associated with the identified one or more of the maximum values, an association of a cell ID of a neighboring cell, a beam index obtained from a decoded PBCH, and a corresponding maximum value of the identified one or more of the maximum values.

Some examples of the method, apparatus, and non-transitory computer-readable medium described above may further include processes, features, means, or instructions for determining a maximum value of the at least one cell measurement per beam, for a set of one or more beams; determining that each of the maximum values fail to satisfy a threshold; determining, based at least in part on the RRM mode indicator and the failure of each of the maximum values to satisfy the threshold, to refrain from decoding the PBCH received in each SS block of the at least one SS block; and formatting the cell measurement report, based at least in part on the RRM mode indicator and the failure of each of the maximum values to satisfy the threshold, to include an association of a cell ID of a neighboring cell and a maximum value of the at least one cell measurement.

Some examples of the method, apparatus, and non-transitory computer-readable medium described above may further include processes, features, means, or instructions for receiving the threshold from the serving cell.

Some examples of the method, apparatus, and non-transitory computer-readable medium described above may further include processes, features, means, or instructions for determining a maximum value of the at least one cell measurement per beam, for a set of one or more beams; determining, based at least in part on the RRM mode indicator, to decode a set of one or more PBCHs received in a set of one or more SS blocks associated with the determined maximum values; and formatting the cell measurement report, based at least in part on the RRM mode, to include, per beam of the set of one or more beams, an association of a cell ID of a neighboring cell, a beam index obtained from a decoded PBCH, and a corresponding maximum value of the determined maximum values.

Some examples of the method, apparatus, and non-transitory computer-readable medium described above may further include processes, features, means, or instructions for receiving at the UE, from the serving cell, an indicator of a measurement window larger than an SS burst set periodicity of the serving cell and the at least one neighboring cell; and performing the at least one cell measurement on the at least one SS block received from the at least one neighboring cell, and at least one measurement on at least one SS block received from the serving cell, during the measurement window.

Some examples of the method, apparatus, and non-transitory computer-readable medium described above may further include processes, features, means, or instructions for determining an indicator of a measurement window is not received from the serving cell; performing, based at least in part on the determination that the indicator of the measurement window is not received, the at least one cell measurement on the at least one SS block during a measurement gap; and performing, based at least in part on the determination that the indicator of the measurement window is not received, and during a measurement window larger than an SS burst set periodicity of the serving cell and the at least one neighboring cell, at least one measurement on at least one SS block received from the serving cell.

Some examples of the method, apparatus, and non-transitory computer-readable medium described above may further include processes, features, means, or instructions for determining the serving cell and a neighboring cell have a synchronized SS burst set periodicity and SS burst set transmission; and determining, based at least in part on the determination that the serving cell and the neighboring cell have the synchronized SS burst set periodicity and SS burst set transmission, and based at least in part on a first timing or a first beam index of each SS block received from the serving cell, at least one of a second timing or a second beam index of each SS block in the at least one SS block received from the neighboring cell.

Some examples of the method, apparatus, and non-transitory computer-readable medium described above may further include processes, features, means, or instructions for receiving, from the serving cell, an indicator of a maximum number of SS blocks in an SS burst set of a neighboring cell.

In some examples of the method, apparatus, and non-transitory computer-readable medium described above, the RRM mode indicator may be associated with a cell measurement report transmission periodicity.

In some examples of the method, apparatus, and non-transitory computer-readable medium described above, the cell measurement report transmission periodicity may be based at least in part on whether the RRM mode indicator indicates per cell measurement reporting or per beam measurement reporting.

In one example, another method of wireless communications at a UE is described. The method may include receiving at the UE, from a serving cell associated with a wireless network, at least one of a first indicator of a number of SS block repetitions within an SS burst set, a second indicator of a distance between SS block repetitions within the SS burst set, or a combination thereof; receiving a plurality of SS blocks; and combining at least two of the plurality of SS blocks based at least in part on the first indicator, the second indicator, or a combination thereof.

In one example, another apparatus for wireless communications at a UE is described. The apparatus may include means for receiving at the UE, from a serving cell associated with a wireless network, at least one of a first indicator of a number of SS block repetitions within an SS burst set, a second indicator of a distance between SS block repetitions within the SS burst set, or a combination thereof; means for receiving a plurality of SS blocks; and means for combining at least two of the plurality of SS blocks based at least in part on the first indicator, the second indicator, or a combination thereof.

In one example, another apparatus for wireless communications at a UE is described. The apparatus may include a processor, memory in electronic communication with the processor, and instructions stored in the memory. The instructions may be executable by the processor to receive at the UE, from a serving cell associated with a wireless network, at least one of a first indicator of a number of SS block repetitions within an SS burst set, a second indicator of a distance between SS block repetitions within the SS burst set, or a combination thereof to receive a plurality of SS blocks; and to combine at least two of the plurality of SS blocks based at least in part on the first indicator, the second indicator, or a combination thereof.

In one example, another non-transitory computer-readable medium storing computer-executable code for wireless communications at a UE is described. The code may be executable by a processor to receive at the UE, from a serving cell associated with a wireless network, at least one of a first indicator of a number of SS block repetitions within an SS burst set, a second indicator of a distance between SS block repetitions within the SS burst set, or a combination thereof; to receive a plurality of SS blocks; and to combine at least two of the plurality of SS blocks based at least in part on the first indicator, the second indicator, or a combination thereof.

In some examples of the method, apparatus, and non-transitory computer-readable medium described above, the plurality of SS blocks may be received from at least one of the serving cell, a neighboring cell, or a combination thereof.

In one example, a method of wireless communications at a base station is described. The method may include transmitting, to a UE, a RRM mode indicator that indicates a set of one or more beams for which cell measurement and reporting is to be performed by the UE; receiving a cell measurement report from the UE; and interpreting the cell measurement report, based at least in part on the RRM mode indicator, to extract at least one cell measurement on at least one SS block received by the UE from at least one neighboring cell.

In one example, an apparatus for wireless communications at a base station is described. The apparatus may include means for transmitting, to a UE, a RRM mode indicator that indicates a set of one or more beams for which cell measurement and reporting is to be performed by the UE; means for receiving a cell measurement report from the UE; and means for interpreting the cell measurement report, based at least in part on the RRM mode indicator, to extract at least one cell measurement on at least one SS block received by the UE from at least one neighboring cell.

In one example, another apparatus for wireless communications at a base station is described. The apparatus may include a processor, memory in electronic communication with the processor, and instructions stored in the memory. The instructions may be executable by the processor to transmit, to a UE, a RRM mode indicator that indicates a set of one or more beams for which cell measurement and reporting is to be performed by the UE; to receive a cell measurement report from the UE; and to interpret the cell measurement report, based at least in part on the RRM mode indicator, to extract at least one cell measurement on at least one SS block received by the UE from at least one neighboring cell.

In one example, a non-transitory computer-readable medium storing computer-executable code for wireless communications at a base station is described. The code may be executable by a processor to transmit, to a UE, a RRM mode indicator that indicates a set of one or more beams for which cell measurement and reporting is to be performed by the UE; to receive a cell measurement report from the UE; and to interpret the cell measurement report, based at least in part on the RRM mode indicator, to extract at least one cell measurement on at least one SS block received by the UE from at least one neighboring cell.

In some examples of the method, apparatus, and non-transitory computer-readable medium described above, the set of one or more beams indicated by the RRM mode indicator may include a single beam, and interpreting the cell measurement report may include interpreting the cell measurement report, based at least in part on the RRM mode indicator, to include an association of a cell ID of a neighboring cell and the at least one cell measurement.

In some examples of the method, apparatus, and non-transitory computer-readable medium described above, the set of one or more beams indicated by the RRM mode indicator may include a plurality of beams. In some examples, interpreting the cell measurement report may include interpreting the cell measurement report, based at least in part on the RRM mode indicator, to include an association of a cell ID of a neighboring cell and a maximum value of the at least one cell measurement. In some examples, interpreting the cell measurement report may include interpreting the cell measurement report, based at least in part on the RRM mode indicator, to include an association of a cell ID of a neighboring cell, a beam index, and a maximum value of the at least one cell measurement. In some examples, interpreting the cell measurement report may include interpreting the cell measurement report, based at least in part on the RRM mode indicator, to include, for each beam in a set of one or more beams, an association of a cell ID of a neighboring cell, a beam index for a beam in the set of one or more beams, and a maximum value of the at least one cell measurement for the beam in the set of one or more beams.

Some examples of the method, apparatus, and non-transitory computer-readable medium described above may further include processes, features, means, or instructions for transmitting, to the at least one UE, at least one cell measurement threshold for determining whether the UE should include a cell measurement in the cell measurement report.

Some examples of the method, apparatus, and non-transitory computer-readable medium described above may further include processes, features, means, or instructions for transmitting, to the at least one UE, an indicator of a measurement window smaller than an SS burst set periodicity of a serving cell for the UE and the at least one neighboring cell.

Some examples of the method, apparatus, and non-transitory computer-readable medium described above may further include processes, features, means, or instructions for transmitting, to the UE, a maximum number of SS blocks in an SS burst set of a neighboring cell.

In some examples of the method, apparatus, and non-transitory computer-readable medium described above, the RRM mode indicator may be associated with a cell measurement report transmission periodicity.

In some examples of the method, apparatus, and non-transitory computer-readable medium described above, the cell measurement report transmission periodicity may be based at least in part on whether the RRM mode indicator indicates per cell measurement reporting or per beam measurement reporting.

In one example, another method of wireless communications at a base station is described. The method may include transmitting, to a UE, at least one of a first indicator of a number of SS block repetitions within an SS burst set, a second indicator of a distance between SS block repetitions within the SS burst set, or a combination thereof; and transmitting a plurality of SS blocks according to the number of SS block repetitions, the distance between SS block repetitions, or a combination thereof.

In one example, another apparatus for wireless communications at a base station is described. The apparatus may include means for transmitting, to a UE, at least one of a first indicator of a number of SS block repetitions within an SS burst set, a second indicator of a distance between SS block repetitions within the SS burst set, or a combination thereof; and means for transmitting a plurality of SS blocks according to the number of SS block repetitions, the distance between SS block repetitions, or a combination thereof.

In one example, another apparatus for wireless communications at a base station is described. The apparatus may include a processor, memory in electronic communication with the processor, and instructions stored in the memory. The instructions may be executable by the processor to transmit, to a UE, at least one of a first indicator of a number of SS block repetitions within an SS burst set, a second indicator of a distance between SS block repetitions within the SS burst set, or a combination thereof; and to transmit a plurality of SS blocks according to the number of SS block repetitions, the distance between SS block repetitions, or a combination thereof.

In one example, another non-transitory computer-readable medium storing computer-executable code for wireless communications at a base station is described. The code may be executable by a processor to transmit, to a UE, at least one of a first indicator of a number of SS block repetitions within an SS burst set, a second indicator of a distance between SS block repetitions within the SS burst set, or a combination thereof; and to transmit a plurality of SS blocks according to the number of SS block repetitions, the distance between SS block repetitions, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
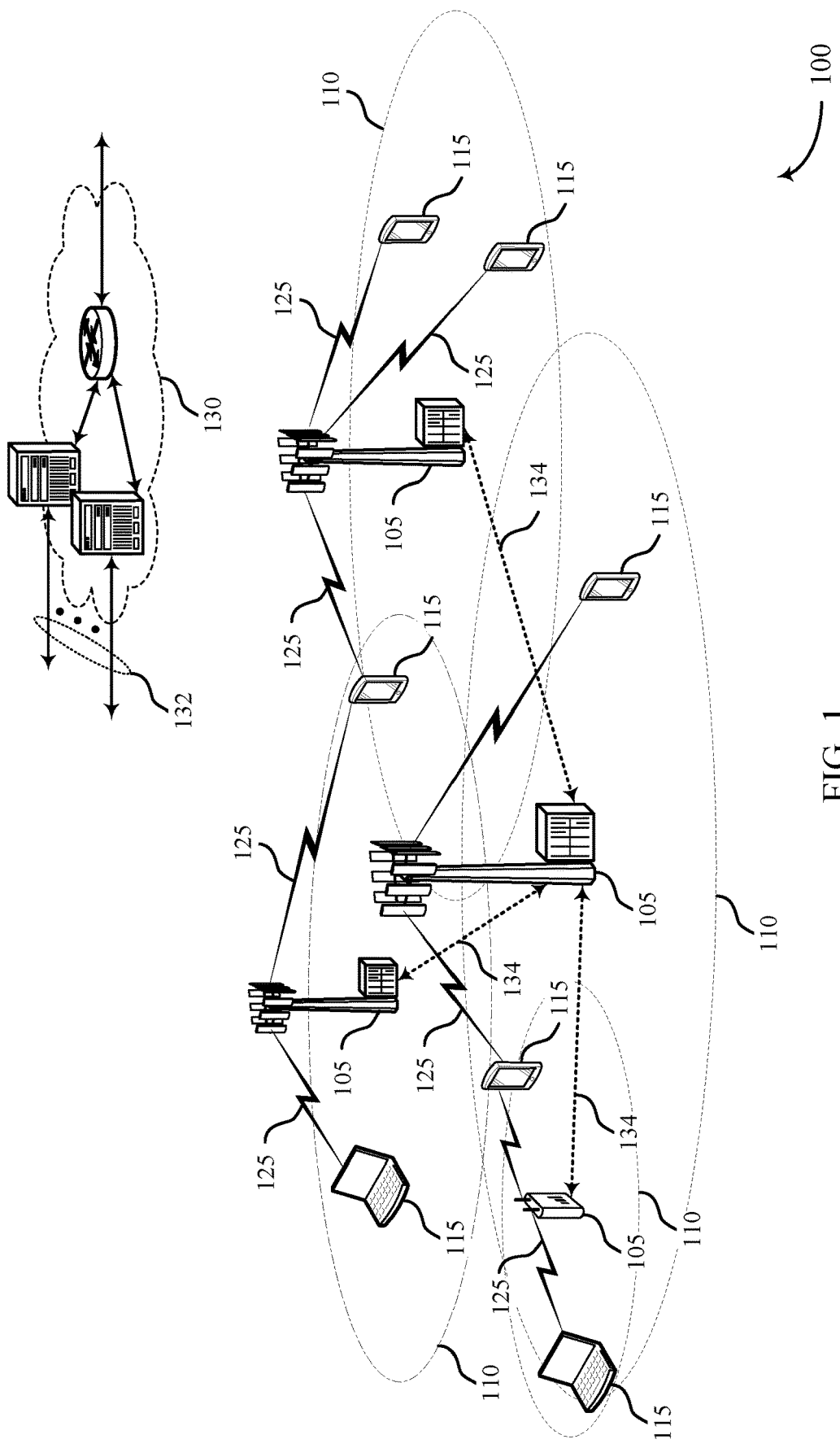
FIG. 1 shows an example of a wireless communications system, in accordance with aspects of the present disclosure.

A wireless communications system (e.g., a mmW system) may utilize directional or beamformed transmissions (e.g., beams) for communication. For example, a base station may transmit signals on multiple beams associated with different directions. In some cases, the base station may engage in beam sweeping over a portion (or all) of the possible beams for transmitting messages or signals intended for user equipments (UEs) distributed throughout a coverage area of the base station. For example, a base station may transmit multiple instances of a synchronization signal (SS) block, on different beams, during a periodic broadcast channel transmission time interval (BCH TTI). In other cases, a base station may transmit multiple instances of an SS block on a same beam, or in an omnidirectional manner, during a periodic BCH TTI.

An SS block may include, for example, a primary synchronization signal (PSS), a secondary synchronization signal (SSS), a physical broadcast channel (PBCH), and/or other synchronization signals (e.g., a tertiary synchronization signal (TSS)). In some examples, the signals included in an SS block may include a PSS, an SSS, a PBCH, and/or other synchronization signals that are time division multiplexed. For example, the signals included in an SS block may include a time division multiplexed first PBCH, SSS, second PBCH, and PSS (transmitted in the indicated order), or a time division multiplexed first PBCH, SSS, PSS, and second PBCH (transmitted in the indicated order), etc.

A UE that receives an SS block may perform a cell measurement on the SS block, and in some cases may acquire a network associated with a base station that transmitted the SS block. To determine a beam on which the SS block is transmitted, or to determine a timing of the SS block within a sequence of SS blocks (and in some cases, to fully determine the timing of the SS block or a synchronization signal therein), a UE may have to decode a PBCH within the SS block and obtain an SS block index from the SS block (e.g., because the SS block index may convey a beam index associated with the SS block and/or the location of the SS block within a sequence of SS blocks). However, when a UE performs cell measurements on SS blocks and reports the cell measurements to a base station (e.g., for mobility management purposes), the beam information contained in the SS block index may or may not be useful, or the benefit of obtaining the information may not outweigh the cost of decoding a PBCH to obtain the information.

The present disclosure describes techniques to provide energy efficient radio resource management (RRM). In accordance with some of the described techniques, cell measurements may be performed, and a cell measurement report may be formatted and transmitted to a base station without decoding a PBCH included in one or more SS blocks on which the cell measurement report is based. By refraining from decoding PBCH, the use of resources such as time and power can be reduced, and more energy efficient RRM may be provided. The present disclosure also describes techniques for managing and combining repetitions of SS blocks.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

FIG. 1 shows an example of a wireless communications system 100, in accordance with aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communications device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) or gNodeBs (gNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

At times, a UE 115 may perform an initial access (acquisition) procedure with a base station 105, synchronize with a base station 105, or measure signals transmitted by a base station 105. When performing the initial access procedure (or synchronizing, or performing measurements), the UE 115 may search a wireless spectrum for an SS block transmitted by the base station 105. The SS block may include information usable by the UE 115 to synchronize the UE 115 with the base station 105, so that the UE 115 may communicate with the base station 105 (or over a network to which the base station 105 provides access). After synchronizing with the base station 105, the UE 115 may initiate a random access procedure with the base station 105 by transmitting a random access preamble to the base station 105.

Figure 2:
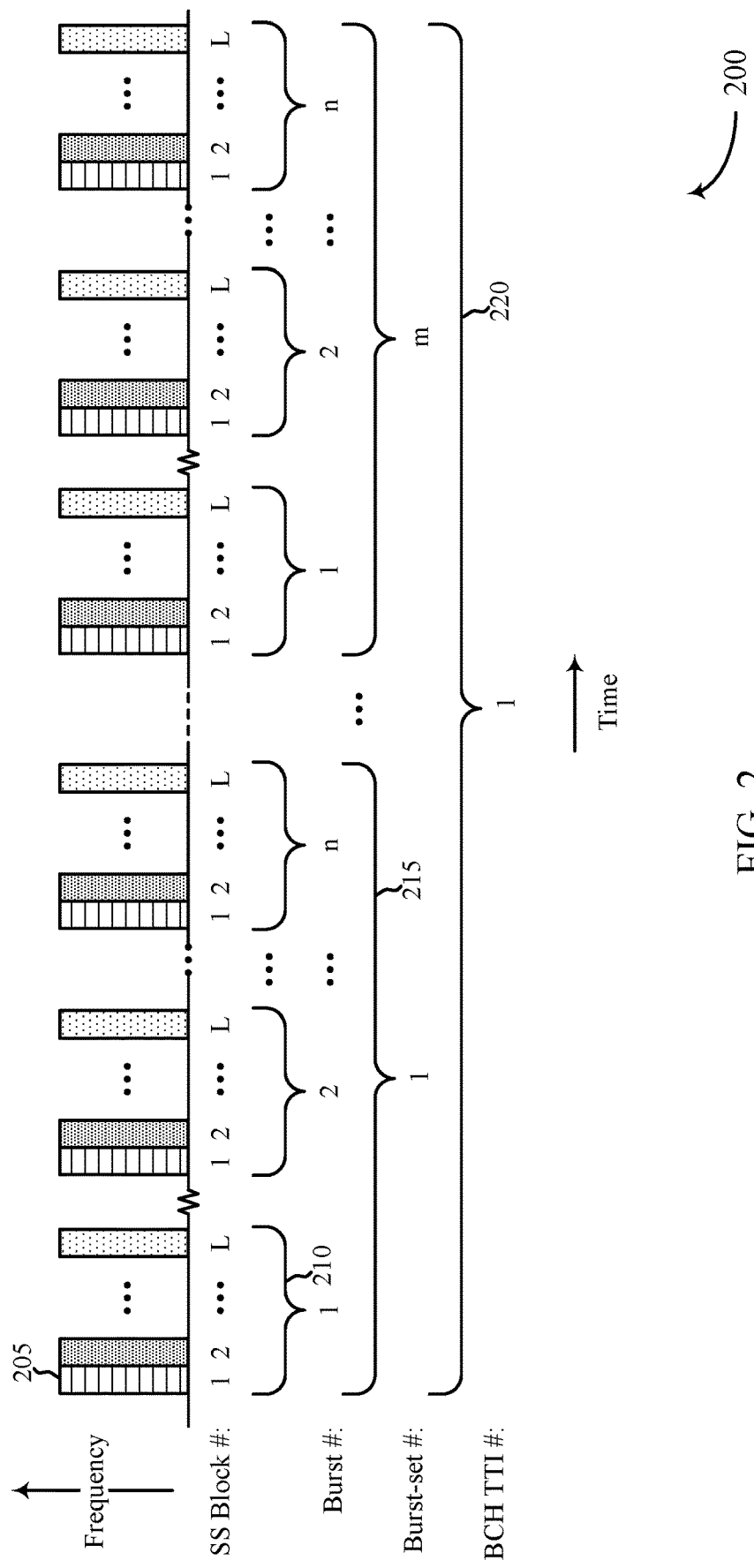
FIG. 2 shows an example timeline of synchronization signal (SS) blocks within a periodic broadcast channel transmission time interval (BCH TTI), in accordance with aspects of the present disclosure.

FIG. 2 shows an example timeline 200 of SS blocks 205 within a periodic BCH TTI, in accordance with aspects of the present disclosure. The SS blocks 205 may be transmitted by a base station, which base station may be an example of aspects of one or more of the base stations 105 described with reference to FIG. 1. A UE may receive one or more of the SS blocks 205. The UE may be an example of aspects of one or more of the UEs 115 described with reference to FIG. 1.

The SS blocks 205 may include a plurality of SS blocks 205 transmitted in succession during an SS block burst 210. An SS block burst 210 may include L SS blocks 205. In some examples, the SS blocks 205 within an SS block burst 210 may be transmitted on different beams using a beam sweep. In other examples, the SS blocks 205 within an SS block burst 210 may be transmitted on a same beam, or in an omnidirectional manner. In some examples, an SS block 205 may include a PBCH and one or more of a PSS and an SSS. The payload of the PBCH may include an SS block index or other timing information. Alternatively, the SS block index may be implicitly included in the PBCH (e.g., conveyed by a PBCH redundancy version (RV) number). An SS block index may indicate a timing of an SS block 205 within a sequence of SS blocks 205 (e.g., a timing of an SS block 205 within an SS block burst 210). An SS block index may thus also indicate a timing of an SS block 205 within an SS block burst-set 215 and within a BCH TTI 220 (although in some cases, other timing information may need to be combined with the timing indicated by an SS block index to fully determine a timing of an SS block 205 within an SS block burst-set 215 or BCH TTI 220). In some cases, an indication flag may indicate whether a UE may utilize an indicated timing of the serving cell to derive an SS block index of an SS block transmitted by a neighboring cell. In some examples, an SS block index may also indicate a beam on which an SS block 205 is transmitted (e.g., an SS block index may convey a beam index). In some examples, the SSS of an SS block 205 may be based at least in part on a physical cell index (PCI) of the base station that transmitted the SS block 205.

A plurality of SS blocks bursts 210 may be transmitted within an SS block burst-set 215. In some examples, the SS block bursts 210 in an SS block burst-set 215 may be associated with different PBCH RVs. In some cases, an SS block burst-set 215 may include n SS block bursts 210. The SS block bursts 210 within an SS block burst-set 215 may be separated in time.

A plurality of SS block burst-sets 215 may be transmitted within the BCH TTI 220. For purposes of this disclosure, a BCH TTI is defined to include any time interval in which a plurality of SS blocks are transmitted with the same system information, regardless of whether the SS blocks are allocated to SS block bursts 210 or SS block burst-sets 215. In some examples, the SS block burst-sets 215 in a BCH TTI 220 may be associated with different SSSs. In some cases, a BCH TTI 220 may include m SS block burst-sets 215.

When m=2, n=4, and L=14, the number of SS blocks 205 transmitted within the BCH TTI 220 may be 112 (e.g., (m)(n)(L)=112). In other examples, the values of m, n, and L may be higher or lower. Regardless, a UE that receives one of the SS blocks 205 may need to determine the timing of the SS block 205 within an SS block burst 210, an SS block burst-set 215, and/or a BCH TTI 220.

Figure 3:
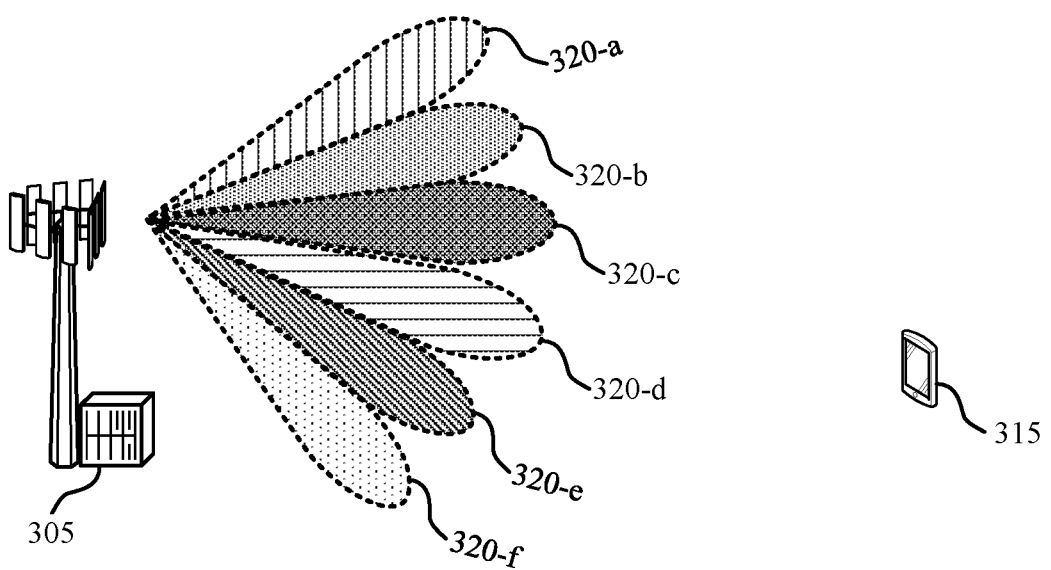
FIG. 3 shows an example of a millimeter wave (mmW) wireless communications system, in accordance with aspects of the present disclosure.

FIG. 3 shows an example of a mmW wireless communications system 300, in accordance with aspects of the present disclosure. The mmW wireless communications system 300 may include a base station 305 and a UE 315, which may be examples of aspects of one or more of the base stations 105 or UEs 115 described with reference to FIG. 1.

To overcome signal attenuation and path losses at mmW frequencies, the base station 305 and UE 315 may communicate with one another on one or more beams (i.e., directional beams). As shown, the base station 305 may transmit signals on a plurality of beams 320 (e.g., on different directional beams 320, including, for example, a first beam 320-a, a second beam 320-b, a third beam 320-c, a fourth beam 320-d, a fifth beam 320-e, and a sixth beam 320-f). In other examples, the base station 305 may transmit on more or fewer beams 320.

In some examples, the base station 305 may transmit an SS block on each of the beams 320, and the UE 315 may receive the SS block on one or more of the beams 320. The UE 315 may determine the timing of an SS block, and a beam 320 on which the SS block is received, to acquire a network to which the base station 305 provides access. In some examples, the UE 315 may determine the timing of the SS block and/or identify the beam 320 on which the SS block is received after receiving and combining decoding metrics for two or more SS blocks.

A mobile UE may connect to a base station, and while connected to the base station may perform cell measurements on signals transmitted by the base station to which the UE is connected (e.g., on signals transmitted by a serving cell) and signals transmitted by other base stations to which the UE may be handed over (e.g., on signals transmitted by neighboring cells). In some examples, the transmitted signals on which the cell measurements are performed may include SS blocks. When SS blocks are transmitted on beams, a UE may identify a beam on which an SS block is transmitted by identifying a beam index associated with the SS block. In some cases, a PBCH included in the SS block may need to be decoded to obtain the beam index associated with the SS block. Decoding a PBCH may be relatively slow compared to the decode of other synchronization signals received in an SS block. Techniques described in the present disclosure allow a UE to refrain from decoding the PBCH included in some SS blocks.

Figure 4:
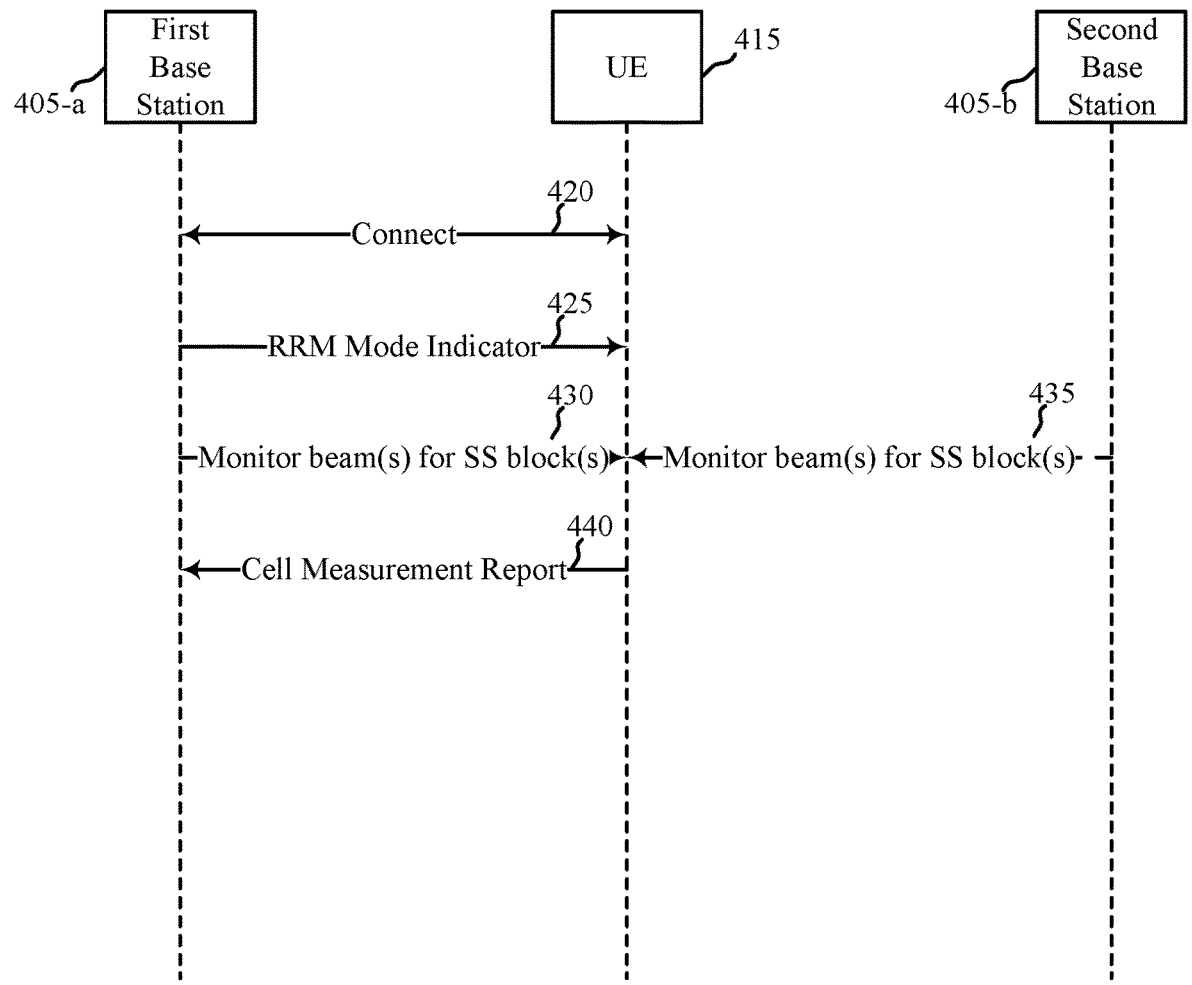
FIG. 4 shows an example message flow between a first base station, a second base station, and a user equipment (UE), in accordance with aspects of the present disclosure.

FIG. 4 shows an example message flow 400 between a first base station 405-*a*, a second base station 405-*b*, and a UE 415, in accordance with aspects of the present disclosure. The base stations 405 and UE 415 may be examples of aspects of the base stations and UEs described with reference to FIGS. 1 and 3.

At 420, the UE 415 may connect to the first base station 405-*a* (e.g., the UE 415 may establish a radio resource control (RRC) connection with the first base station 405-*a*). While the UE 415 is connected to the first base station 405-*a*, the first base station 405-*a* may transmit to the UE 415, at 425, an RRM mode indicator. The RRM mode indicator may be transmitted, for example, in system information or RRC messaging. The RRM mode indicator may indicate a set of one or more beams for which cell measurement and reporting is to be performed by the UE 415.

At 430 and 435, the UE 415 may monitor the set of one or more beams for SS blocks. The SS blocks may be transmitted by the first base station 405-*a*, the second base station 405-*b*, or other base stations, and may perform at least one cell measurement on each SS block. Based at least in part on the RRM mode indicator, the UE 415 may determine whether to decode a PBCH received in each SS block.

At 440, the UE 415 may transmit a cell measurement report (e.g., to the first base station 405-*a*). The cell measurement report may be based at least in part on the at least one cell measurement, and the cell measurement report selectively including at least one beam index based at least in part on whether the PBCH is decoded.

When the RRM mode indicator indicates a single beam for which cell measurement and reporting is to be performed by the UE 415, and in some examples, the UE 415 may monitor the single beam for at least one SS block, and may determine, based at least in part on the RRM mode indicator, to refrain from decoding a PBCH received in each SS block of the at least one SS block. The UE 415 may refrain from decoding the PBCH because the first base station 405-*a* already knows the beam for which cell measurement and reporting is to be performed, and the UE 415 does not need to report this information back to the first base station 405-*a*. In these examples, the UE 415 may format a cell measurement report, based at least in part on the RRM mode indicator and the at least one cell measurement, to include an association of a cell identity (ID) of a neighboring cell and one or more of the at least one cell measurement.

When the RRM mode indicator indicates a plurality of beams for which cell measurement and reporting is to be performed by the UE 415, and in some examples, the RRM mode indicator may implicitly or explicitly configure the UE 415 to transmit a cell measurement report meeting one or more criterion.

When the RRM mode indicator indicates a plurality of beams for which cell measurement and reporting is to be performed by the UE 415, and when the RRM mode indicator indicates a first RRM mode or set of criterion, the UE 415 may monitor the plurality of beams for at least one SS block, perform at least one cell measurement on the at least one SS block, and determine a maximum value of the at least one cell measurement. The UE 415 may also determine, based at least in part on the RRM mode indicator, to refrain from decoding a PBCH received in each SS block of the at least one SS block. The UE 415 may further format a cell measurement report, based at least in part on the RRM mode indicator and the at least one cell measurement, to include an association of a cell ID of a neighboring cell and the maximum value of the at least one cell measurement. The UE 415 may refrain from decoding the PBCH because the first RRM mode does not require transmission of a beam index in the cell measurement report. The first base station 405-*a* may configure the UE 415 to use the first RRM mode to conserve resources of the UE 415, and because a handover decision may be made based on a best possible reception for the UE 115 from a cell. A beam index associated with the maximum value of the at least one cell measurement may be determined in a separate procedure or during handover.

When the RRM mode indicator indicates a plurality of beams for which cell measurement and reporting is to be performed by the UE 415, and when the RRM mode indicator indicates a second RRM mode or set of criterion, the UE 415 may monitor the plurality of beams for at least one SS block, perform at least one cell measurement on the at least one SS block, and determine a maximum value of the at least one cell measurement. The UE 415 may also determine, based at least in part on the RRM mode indicator, to decode a first PBCH received in a first SS block associated with the maximum value of the at least one cell measurement. The UE 415 may further format a cell measurement report, based at least in part on the RRM mode indicator and the at least one cell measurement, to include an association of a cell ID of a neighboring cell, a beam index obtained from the decoded first PBCH, and the maximum value of the at least one cell measurement. Thus, when configured in the second RRM mode, the UE 415 may decode the PBCH associated with as few as one SS block.

When the RRM mode indicator indicates a plurality of beams for which cell measurement and reporting is to be performed by the UE, and when the RRM mode indicator indicates a third RRM mode or set of criterion, the UE 415 may monitor the plurality of beams for the at least one SS block, perform at least one cell measurement on the at least one SS block, and determine a maximum value of the at least one cell measurement. The UE 415 may also determine whether the maximum value satisfies a threshold. When the maximum value satisfies the threshold, and in some examples, the UE 415 may determine, based at least in part on the RRM mode indicator and the determination that the maximum value satisfies the threshold, to decode a first PBCH received in a first SS block associated with the maximum value of the at least one cell measurement. The UE 415 may also format a cell measurement report, based at least in part on the RRM mode indicator, the determination that the maximum value satisfies the threshold, and the at least one cell measurement, to include an association of a cell ID of a neighboring cell, a beam index obtained from the decoded first PBCH, and the maximum value of the at least one cell measurement. When the maximum value fails to satisfy the threshold, and in some examples, the UE 415 may determine, based at least in part on the RRM mode indicator and the determination that the maximum value fails to satisfy the threshold, to refrain from decoding a PBCH received in each SS block of the at least one SS block. In these latter examples, the UE 415 may format a cell measurement report, based at least in part on the RRM mode indicator, the determination that the maximum value fails to satisfy the threshold, and the at least one cell measurement, to include an association of a cell ID of a neighboring cell and the maximum value of the at least one cell measurement. Thus, when configured in the third RRM mode, the UE 415 may decode the PBCH associated with as few as one SS block when the maximum value satisfies a threshold, and refrain from decoding any PBCH when the maximum value fails to satisfy the threshold. The third RRM mode recognizes that handover is unlikely, and thus beam information is unlikely to be relevant, when cell measurements performed on neighboring cells do not satisfy a threshold.

When the RRM mode indicator indicates a plurality of beams for which cell measurement and reporting is to be performed by the UE, and when the RRM mode indicator indicates a fourth RRM mode or set of criterion, the UE 415 may monitor the plurality of beams for the at least one SS block, perform at least one cell measurement on the at least one SS block, and determine a maximum value of the at least one cell measurement per beam (for a set of one or more beams). The UE 415 may also determine whether one or more of the maximum values satisfies a threshold. When one or more of the maximum values satisfies the threshold, and in some examples, the UE 415 may determine, based at least in part on the RRM mode indicator and the determination that the maximum value satisfies the threshold, to decode a set of one or more PBCHs received in a set of one or more SS blocks associated with the identified one or more maximum values. The UE 415 may also format a cell measurement report, based at least in part on the RRM mode indicator, the identified one or more of the maximum values, and the at least one cell measurement, to include, per beam associated with the identified one or more of the maximum values, an association of a cell ID of a neighboring cell, a beam index obtained from a decoded PBCH, and a corresponding maximum value of the identified one or more of the maximum values. When each of the maximum values fails to satisfy the threshold, and in some examples, the UE 415 may determine, based at least in part on the RRM mode indicator and the determination that the maximum value fails to satisfy the threshold, to refrain from decoding a PBCH received in each SS block of the at least one SS block. In these latter examples, the UE 415 may format a cell measurement report, based at least in part on the RRM mode indicator, the failure of each of the maximum values to satisfy the threshold, and the at least one cell measurement, to include an association of a cell ID of a neighboring cell and the maximum value of the at least one cell measurement. Thus, when configured in the fourth RRM mode, the UE 415 may decode the PBCH associated with just a subset of SS blocks (i.e., a subset of SS blocks associated with the maximum values per beam), and refrain from decoding any PBCH when each maximum value per beam fails to satisfy the threshold. The fourth RRM mode recognizes that handover is unlikely, and thus beam information is unlikely to be relevant, when cell measurements performed on neighboring cells do not satisfy a threshold. The fourth RRM mode also provides the first base station 405-*a* with information from which the first base station 405-*a* may select from among.

In some examples, the UE 415 may receive the threshold(s) to which maximum values are compared from the first base station 405-*a*.

When the RRM mode indicator indicates a plurality of beams for which cell measurement and reporting is to be performed by the UE, and when the RRM mode indicator indicates a fifth RRM mode or set of criterion, the UE 415 may monitor the plurality of beams for the at least one SS block, perform at least one cell measurement on the at least one SS block, and determine a maximum value of the at least one cell measurement. In some of these examples, the UE 415 may determine, based at least in part on the RRM mode indicator, to decode a set of one or more PBCHs received in a set of one or more SS blocks associated with the determined maximum values. The UE 415 may also format a cell measurement report, based at least in part on the RRM mode indicator and the at least one cell measurement, to include, per beam of the set of one or more beams, an association of a cell ID of a neighboring cell, a beam index obtained from a decoded PBCH, and a corresponding maximum value of the determined maximum values.

In some examples, the UE 415 may determine the first base station 405-*a* (i.e., its serving cell) and a neighboring cell (e.g., the second base station 405-*b*) have a synchronized SS burst set periodicity and SS burst set transmission. In these examples, the UE 415 may determine, based at least in part on the determination that the serving cell and the neighboring cell have the synchronized SS burst set periodicity and SS burst set transmission, and based at least in part on a first timing or a first beam index of each SS block received from the serving cell, at least one of a second timing or a second beam index of each SS block in the at least one SS block received from the neighboring cell. The UE 415 may also determine, based at least in part on the RRM mode indicator and the determination that the serving cell and the neighboring cell have the synchronized SS burst set periodicity and SS burst set transmission, to refrain from decoding a PBCH received in each SS block of the at least one SS block.

In some examples, the UE 415 may receive, from the first base station 405-*a* (i.e., its serving cell), an indicator of a maximum number of SS blocks in an SS burst set of a neighboring cell. The UE 415 may use the maximum number of SS blocks within the SS burst set to appropriately size its measurement window (e.g., a window for performing cell measurements) when the serving cell and the neighboring cell for the UE 415 are synchronized, and may determine the locations of SS blocks transmitted by the neighboring cell relative to a frame boundary. When the neighboring cell does not transmit each of the SS blocks that may be transmitted in an SS burst set, the UE 415 may identify the non-transmitted SS blocks based at least in part on a detected energy level on a beam.

In some examples, the UE 415 may receive network assistance in determining its measurement window size. For example, the UE 415 may receive, from the first base station 405-*a* (i.e., its serving cell), an indicator of a measurement window smaller than an SS burst set periodicity of the serving cell and the at least one neighboring cell, and the UE 415 may perform at least one cell measurement on at least one SS block received from at least one neighboring cell, and at least one measurement on at least one SS block received from the serving cell, during the measurement window. In a wireless communications system in which NR and LTE communications are supported, the size of the measurement window indicated by the first base station 405-*a* may be narrower than an LTE measurement gap (e.g., narrower than 6 milliseconds (ms)) corresponding to the time span with respect to SS burst set transmission (whether single beam or multiple beam). In some examples, the timing of the measurement window may be specified within a small margin. In some examples, the indicator of the measurement window may be transmitted in downlink control information (DCI) or an RRC message.

In other examples, the UE 415 may not receive network assistance in determining its measurement window size. In these examples, the UE 415 may determine an indicator of a measurement window is not received from the first base station 405-*a* (i.e., its serving cell), and based at least in part on the determination that the indicator of the measurement window is not received, the UE 415 may perform at least one inter-frequency cell measurement (i.e., a cell measurement on a neighboring cell) on at least one SS block during a measurement gap. The UE 415 may also perform, based at least in part on the determination that the indicator of the measurement window is not received, and during a measurement window larger than a smallest potential SS burst set periodicity of the serving cell and the at least one neighboring cell, at least one intra-frequency measurement on at least one SS block received from its serving cell.

Figure 5:
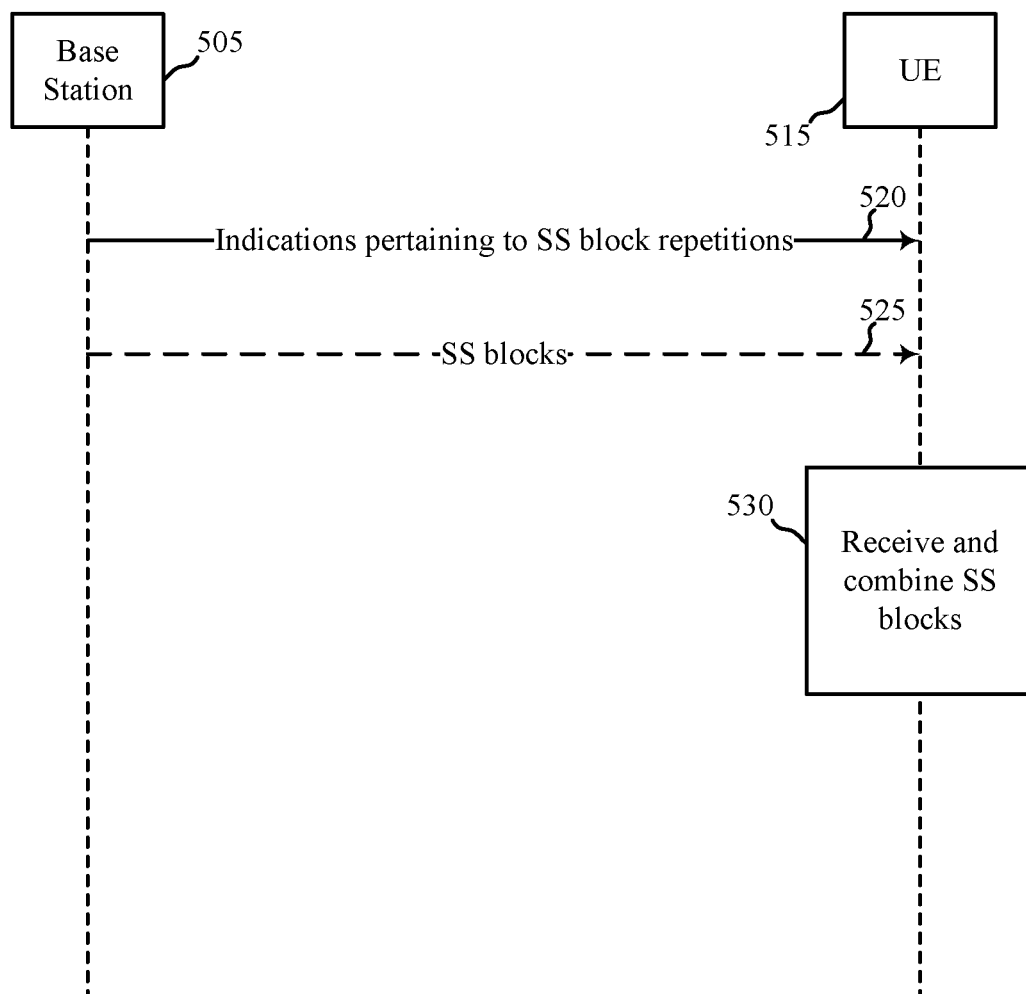
FIG. 5 shows an example message flow between a base station and a UE, in accordance with aspects of the present disclosure.

FIG. 5 shows an example message flow 500 between a base station 505 and a UE 515, in accordance with aspects of the present disclosure. The base station 505 and UE 515 may be examples of aspects of the base stations and UEs described with reference to FIGS. 1, 3, and 4.

At 520, the base station 505 may transmit, to the UE 515, a first indicator of a number of SS block repetitions within a SS burst set, a second indicator of a distance between SS block repetitions within the SS burst set, or a combination thereof. The indicators may pertain to SS blocks transmitted by the base station 505 or SS blocks transmitted by a neighboring cell.

At 525, the base station 505 (or a neighboring cell) may transmit a plurality of SS blocks according to the indicated number of SS block repetitions, the distance between SS block repetitions, or a combination thereof.

At 530, the UE 515 may receive and combine repeated SS blocks based at least in part on the first indicator, the second indicator, or a combination thereof. Combining repeated SS blocks may increase the link budget (whether single beam or multiple beam). The first indicator and/or second indicator may enable the UE 515 to combine the repeated SS blocks without blindly testing SS block combination hypotheses.

Figure 6:
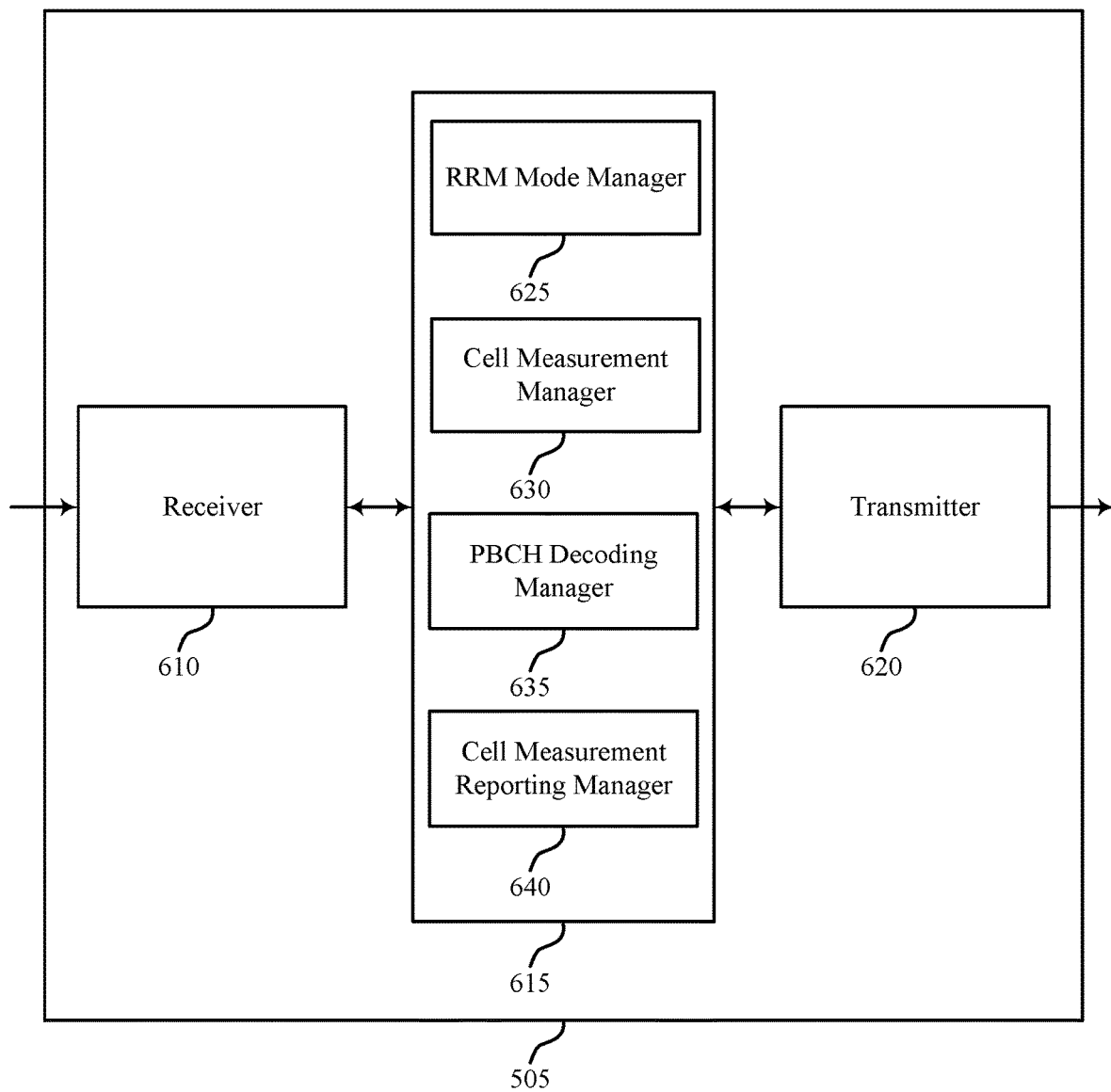
FIG. 6 shows a block diagram of an apparatus for use in wireless communication, in accordance with aspects of the present disclosure.

FIG. 6 shows a block diagram 600 of an apparatus 605 for use in wireless communication, in accordance with aspects of the present disclosure. The apparatus 605 may be an example of aspects of one or more of the UEs described with reference to FIGS. 1 and 3 through 5. The apparatus 605 may include a receiver 610, a UE wireless communications manager 615, and a transmitter 620. The apparatus 605 may also include a processor. Each of these components may be in communication with one another (e.g., via one or more buses).

The receiver 610 may receive data or control signals or information (i.e., transmissions), some or all of which may be associated with various information channels (e.g., data channels, control channels, etc.). Received signals or information, or measurements performed thereon, may be passed to other components of the apparatus 605. The receiver 610 may include one or a plurality of antennas.

The transmitter 620 may transmit data or control signals or information (i.e., transmissions) generated by other components of the apparatus 605, some or all of which may be associated with various information channels (e.g., data channels, control channels, etc.). In some examples, the transmitter 620 may be collocated with the receiver 610 in a transceiver. For example, the transmitter 620 and receiver 610 may be an example of aspects of the transceiver(s) 1230 described with reference to FIG. 12. The transmitter 620 may include one or a plurality of antennas, which may be separate from (or shared with) the one or more antennas used by the receiver 610.

The UE wireless communications manager 615 and/or at least some of its various sub-components may be implemented in hardware, software executed by a processor, firmware, or any combination thereof. If implemented in software executed by a processor, the functions of the UE wireless communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE wireless communications manager 615 and/or at least some of its various sub-components may be physically located at various positions, including being distributed such that portions of functions are implemented at different physical locations by one or more physical devices. In some examples, the UE wireless communications manager 615 and/or at least some of its various sub-components may be a separate and distinct component in accordance with aspects of the present disclosure. In other examples, the UE wireless communications manager 615 and/or at least some of its various sub-components may be combined with one or more other hardware components, including but not limited to an I/O component, a transceiver, another computing device, one or more other components described in the present disclosure, or a combination thereof, in accordance with aspects of the present disclosure. The UE wireless communications manager 615 may include an RRM mode manager 625, a cell measurement manager 630, a PBCH decoding manager 635, and a cell measurement reporting manager 640.

The RRM mode manager 625 may be used to receive at a UE including the apparatus 605, from a serving cell associated with a wireless network, an RRM mode indicator that indicates a set of one or more beams for which cell measurement and reporting is to be performed by the UE. In some examples, the RRM mode indicator may be associated with a cell measurement report transmission periodicity. The cell measurement report transmission periodicity may be based at least in part on whether the RRM mode indicator indicates per cell measurement reporting or per beam measurement reporting.

The cell measurement manager 630 may be used to perform at least one cell measurement on at least one SS block received from at least one neighboring cell.

The PBCH decoding manager 635 may be used to determine, based at least in part on the RRM mode indicator, whether to decode a PBCH received in each SS block of the at least one SS block.

The cell measurement reporting manager 640 may be used to transmit a cell measurement report (e.g., to the serving cell). The cell measurement report may be based at least in part on the at least one cell measurement. The cell measurement report may selectively include at least one beam index based at least in part on whether the PBCH is decoded.

Figure 7:
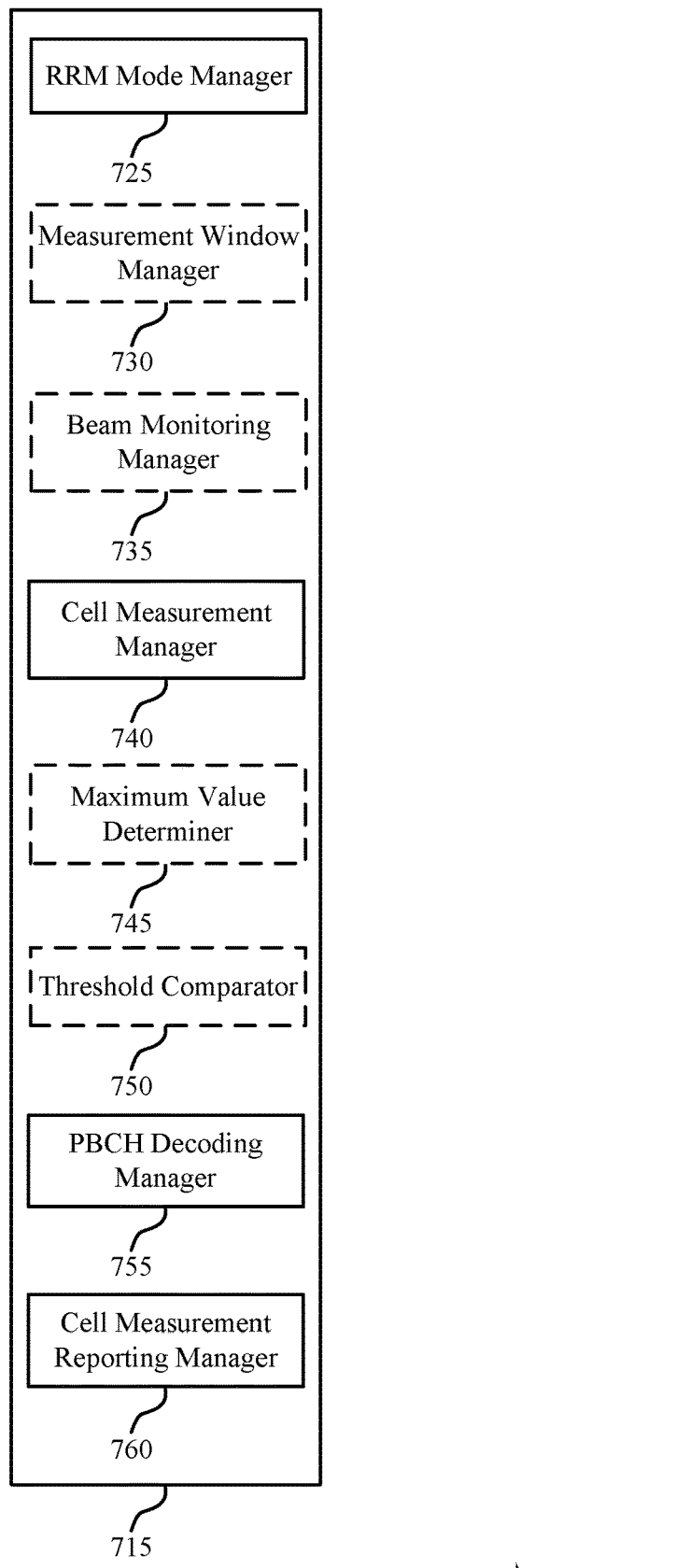
FIG. 7 shows a block diagram of a UE wireless communications manager, in accordance with aspects of the present disclosure.

FIG. 7 shows a block diagram 700 of a UE wireless communications manager 715, in accordance with aspects of the present disclosure. The UE wireless communications manager 715 may be an example of aspects of the UE wireless communications manager 615 described with reference to FIG. 6. The UE wireless communications manager 715 may include an RRM mode manager 725, an optional measurement window manager 730, an optional beam monitoring manager 735, a cell measurement manager 740, an optional maximum value determiner 745, an optional threshold comparator 750, a PBCH decoding manager 755, and a cell measurement reporting manager 760. Each of these components may communicate, directly or indirectly, with one another (e.g., via one or more buses). The RRM mode manager 725, cell measurement manager 740, PBCH decoding manager 755, and cell measurement reporting manager 760 may be examples of the RRM mode manager 625, cell measurement manager 630, PBCH decoding manager 635, and cell measurement reporting manager 640 described with reference to FIG. 6.

In some examples, the RRM mode manager 725 may be used to receive at a UE including the UE wireless communications manager 715, from a serving cell associated with a wireless network, an RRM mode indicator that indicates a set of one or more beams for which cell measurement and reporting is to be performed by the UE. In some examples, the RRM mode manager 725 may also receive, from the serving cell, an indicator of a maximum number of SS blocks in an SS burst set of a neighboring cell. In some examples, the RRM mode indicator may be associated with a cell measurement report transmission periodicity. The cell measurement report transmission periodicity may be based at least in part on whether the RRM mode indicator indicates per cell measurement reporting or per beam measurement reporting.

The cell measurement manager 740 may be used to perform at least one cell measurement on at least one SS block received from at least one neighboring cell.

The PBCH decoding manager 755 may be used to determine, based at least in part on the RRM mode indicator, whether to decode a PBCH received in each SS block of the at least one SS block.

The cell measurement reporting manager 760 may be used to transmit a cell measurement report (e.g., to the serving cell). The cell measurement report may be based at least in part on the at least one cell measurement. The cell measurement report may selectively include at least one beam index based at least in part on whether the PBCH is decoded.

When the RRM mode indicator indicates a single beam for which cell measurement and reporting is to be performed by the UE, and in some examples, the beam monitoring manager 735 may be used to monitor the single beam for the at least one SS block, and the PBCH decoding manager 755 may determine, based at least in part on the RRM mode indicator, to refrain from decoding a PBCH received in each SS block of the at least one SS block. In these examples, the cell measurement reporting manager 760 may format a cell measurement report, based at least in part on the RRM mode indicator and the at least one cell measurement, to include an association of a cell ID of a neighboring cell and one or more of the at least one cell measurement.

When the RRM mode indicator indicates a plurality of beams for which cell measurement and reporting is to be performed by the UE, and in some examples, the beam monitoring manager 735 may be used to monitor the plurality of beams for the at least one SS block, and the maximum value determiner 745 may be used to determine a maximum value of the at least one cell measurement. In some of these examples, the PBCH decoding manager 755 may determine, based at least in part on the RRM mode indicator, to refrain from decoding a PBCH received in each SS block of the at least one SS block, and the cell measurement reporting manager 760 may format a cell measurement report, based at least in part on the RRM mode indicator and the at least one cell measurement, to include an association of a cell ID of a neighboring cell and the maximum value of the at least one cell measurement. In other examples, the PBCH decoding manager 755 may determine, based at least in part on the RRM mode indicator, to decode a first PBCH received in a first SS block associated with the maximum value of the at least one cell measurement, and the cell measurement reporting manager 760 may format a cell measurement report, based at least in part on the RRM mode indicator and the at least one cell measurement, to include an association of a cell ID of a neighboring cell, a beam index obtained from the decoded first PBCH, and the maximum value of the at least one cell measurement.

When the RRM mode indicator indicates a plurality of beams for which cell measurement and reporting is to be performed by the UE, and in some examples, the beam monitoring manager 735 may be used to monitor the plurality of beams for the at least one SS block, the maximum value determiner 745 may be used to determine a maximum value of the at least one cell measurement, and the threshold comparator 750 may be used to determine whether the maximum value satisfies a threshold. When the maximum value satisfies the threshold, and in some examples, the PBCH decoding manager 755 may determine, based at least in part on the RRM mode indicator and the determination that the maximum value satisfies the threshold, to decode a first PBCH received in a first SS block associated with the maximum value of the at least one cell measurement, and the cell measurement reporting manager 760 may format a cell measurement report, based at least in part on the RRM mode indicator, the determination that the maximum value satisfies the threshold, and the at least one cell measurement, to include an association of a cell ID of a neighboring cell, a beam index obtained from the decoded first PBCH, and the maximum value of the at least one cell measurement. When the maximum value fails to satisfy the threshold, and in some examples, the PBCH decoding manager 755 may determine, based at least in part on the RRM mode indicator and the determination that the maximum value fails to satisfy the threshold, to refrain from decoding a PBCH received in each SS block of the at least one SS block, and the cell measurement reporting manager 760 may format a cell measurement report, based at least in part on the RRM mode indicator, the determination that the maximum value fails to satisfy the threshold, and the at least one cell measurement, to include an association of a cell ID of a neighboring cell and the maximum value of the at least one cell measurement.

When the RRM mode indicator indicates a plurality of beams for which cell measurement and reporting is to be performed by the UE, and in some examples, the beam monitoring manager 735 may be used to monitor the plurality of beams for the at least one SS block, the maximum value determiner 745 may be used to determine a maximum value of the at least one cell measurement per beam (for a set of one or more beams), and the threshold comparator 750 may be used to determine whether one or more of the maximum values satisfies a threshold. When one or more of the maximum values satisfies the threshold, and in some examples, the PBCH decoding manager 755 may determine, based at least in part on the RRM mode indicator and the determination that the maximum value satisfies the threshold, to decode a set of one or more PBCHs received in a set of one or more SS blocks associated with the identified one or more maximum values, and the cell measurement reporting manager 760 may format a cell measurement report, based at least in part on the RRM mode indicator, the identified one or more of the maximum values, and the at least one cell measurement, to include, per beam associated with the identified one or more of the maximum values, an association of a cell ID of a neighboring cell, a beam index obtained from a decoded PBCH, and a corresponding maximum value of the identified one or more of the maximum values. When each of the maximum values fails to satisfy the threshold, and in some examples, the PBCH decoding manager 755 may determine, based at least in part on the RRM mode indicator and the determination that the maximum value fails to satisfy the threshold, to refrain from decoding a PBCH received in each SS block of the at least one SS block, and the cell measurement reporting manager 760 may format a cell measurement report, based at least in part on the RRM mode indicator, the failure of each of the maximum values to satisfy the threshold, and the at least one cell measurement, to include an association of a cell ID of a neighboring cell and the maximum value of the at least one cell measurement.

In some examples, the threshold comparator 750 may be used to receive the threshold(s) to which maximum values are compared from the serving cell.

When the RRM mode indicator indicates a plurality of beams for which cell measurement and reporting is to be performed by the UE, and in some examples, the beam monitoring manager 735 may be used to monitor the plurality of beams for the at least one SS block, and the maximum value determiner 745 may be used to determine a maximum value of the at least one cell measurement. In some of these examples, the PBCH decoding manager 755 may determine, based at least in part on the RRM mode indicator, to decode a set of one or more PBCHs received in a set of one or more SS blocks associated with the determined maximum values, and the cell measurement reporting manager 760 may format a cell measurement report, based at least in part on the RRM mode indicator and the at least one cell measurement, to include, per beam of the set of one or more beams, an association of a cell ID of a neighboring cell, a beam index obtained from a decoded PBCH, and a corresponding maximum value of the determined maximum values.

In some examples, the PBCH decoding manager 755 may determine the serving cell and a neighboring cell have a synchronized SS burst set periodicity and SS burst set transmission. In these examples, the PBCH decoding manager 755 may determine, based at least in part on the determination that the serving cell and the neighboring cell have the synchronized SS burst set periodicity and SS burst set transmission, and based at least in part on a first timing or a first beam index of each SS block received from the serving cell, at least one of a second timing or a second beam index of each SS block in the at least one SS block received from the neighboring cell. The PBCH decoding manager 755 may also determine, based at least in part on the RRM mode indicator and the determination that the serving cell and the neighboring cell have the synchronized SS burst set periodicity and SS burst set transmission, to refrain from decoding a PBCH received in each SS block of the at least one SS block.

In some examples, the measurement window manager 730 may be used to receive, from the serving cell, an indicator of a measurement window smaller than an SS burst set periodicity of the serving cell and the at least one neighboring cell, and the cell measurement manager 740 may perform the at least one cell measurement on the at least one SS block received from the at least one neighboring cell, and at least one measurement on at least one SS block received from the serving cell, during the measurement window.

In some examples, the measurement window manager 730 may be used to determine an indicator of a measurement window is not received from the serving cell. In these examples, the cell measurement manager 740 may perform, based at least in part on the determination that the indicator of the measurement window is not received, the at least one cell measurement on the at least one SS block during a measurement gap. The cell measurement manager 740 may also perform, based at least in part on the determination that the indicator of the measurement window is not received, and during a measurement window larger than an SS burst set periodicity of the serving cell and the at least one neighboring cell, at least one measurement on at least one SS block received from the serving cell.

Figure 8:
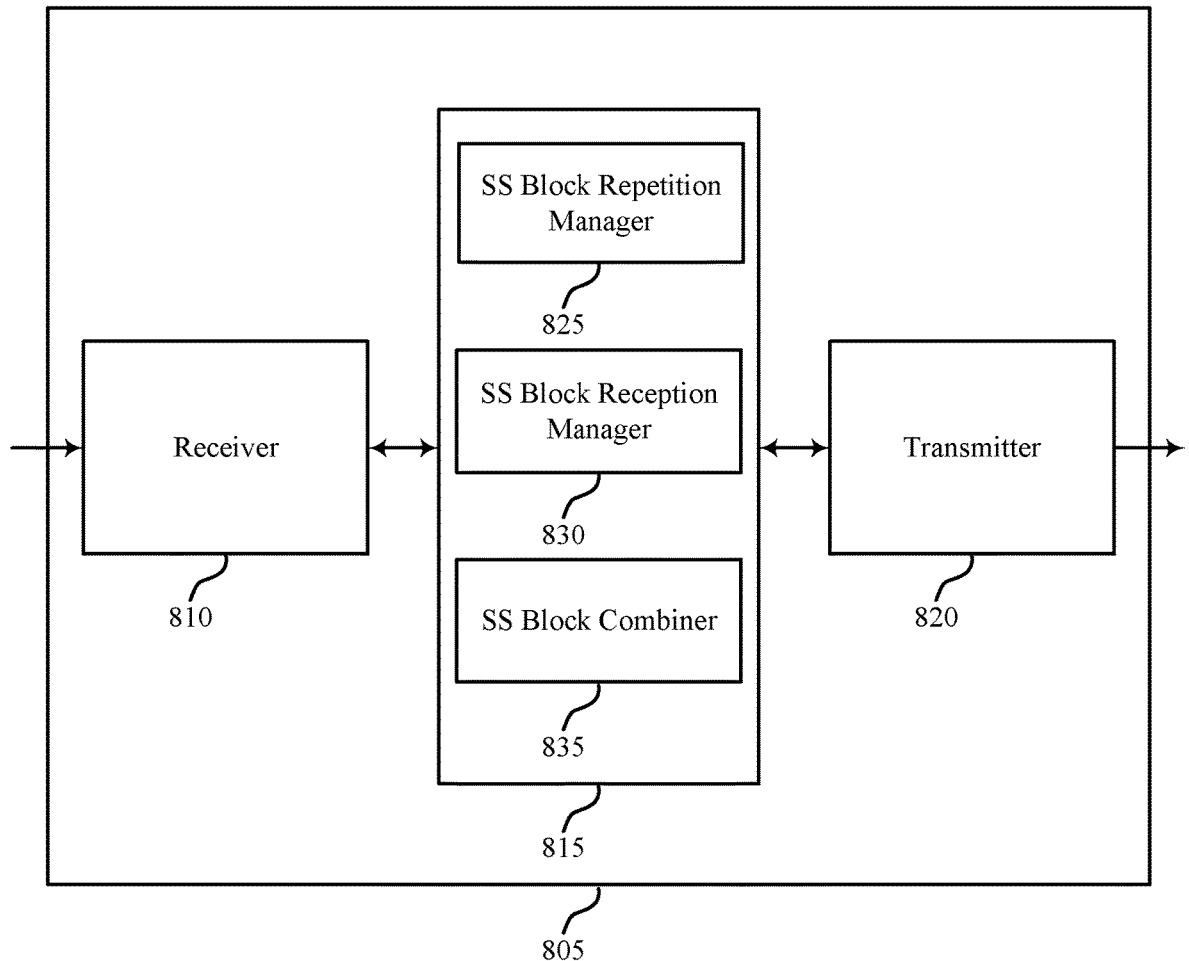
FIGS. 8 and 9 show block diagrams of apparatuses for use in wireless communication, in accordance with aspects of the present disclosure.

FIG. 8 shows a block diagram 800 of an apparatus 805 for use in wireless communication, in accordance with aspects of the present disclosure. The apparatus 805 may be an example of aspects of one or more of the UEs described with reference to FIGS. 1 and 3 through 5. The apparatus 805 may include a receiver 810, a UE wireless communications manager 815, and a transmitter 820. The apparatus 805 may also include a processor. Each of these components may be in communication with one another (e.g., via one or more buses).

The receiver 810 may receive data or control signals or information (i.e., transmissions), some or all of which may be associated with various information channels (e.g., data channels, control channels, etc.). Received signals or information, or measurements performed thereon, may be passed to other components of the apparatus 805. The receiver 810 may include one or a plurality of antennas.

The transmitter 820 may transmit data or control signals or information (i.e., transmissions) generated by other components of the apparatus 805, some or all of which may be associated with various information channels (e.g., data channels, control channels, etc.). In some examples, the transmitter 820 may be collocated with the receiver 810 in a transceiver. For example, the transmitter 820 and receiver 810 may be an example of aspects of the transceiver(s) 1230 described with reference to FIG. 12. The transmitter 820 may include one or a plurality of antennas, which may be separate from (or shared with) the one or more antennas used by the receiver 810.

The UE wireless communications manager 815 and/or at least some of its various sub-components may be implemented in hardware, software executed by a processor, firmware, or any combination thereof. If implemented in software executed by a processor, the functions of the UE wireless communications manager 815 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The UE wireless communications manager 815 and/or at least some of its various sub-components may be physically located at various positions, including being distributed such that portions of functions are implemented at different physical locations by one or more physical devices. In some examples, the UE wireless communications manager 815 and/or at least some of its various sub-components may be a separate and distinct component in accordance with aspects of the present disclosure. In other examples, the UE wireless communications manager 815 and/or at least some of its various sub-components may be combined with one or more other hardware components, including but not limited to an I/O component, a transceiver, another computing device, one or more other components described in the present disclosure, or a combination thereof, in accordance with aspects of the present disclosure. The UE wireless communications manager 815 may include an SS block repetition manager 825, an SS block reception manager 830, and an SS block combiner 835.

The SS block repetition manager 825 may be used to receive, from a serving cell associated with a wireless network, a first indicator of a number of SS block repetitions within an SS burst set, a second indicator of a distance between SS block repetitions within the SS burst set, or a combination thereof.

The SS block reception manager 830 may be used to receive a plurality of SS blocks. In some examples, the plurality of SS blocks may be received from the serving cell, at least one neighboring cell, or a combination thereof.

The SS block combiner 835 may be used to combine at least two of the plurality of SS blocks based at least in part on the first indicator, the second indicator, or a combination thereof.

Figure 9:
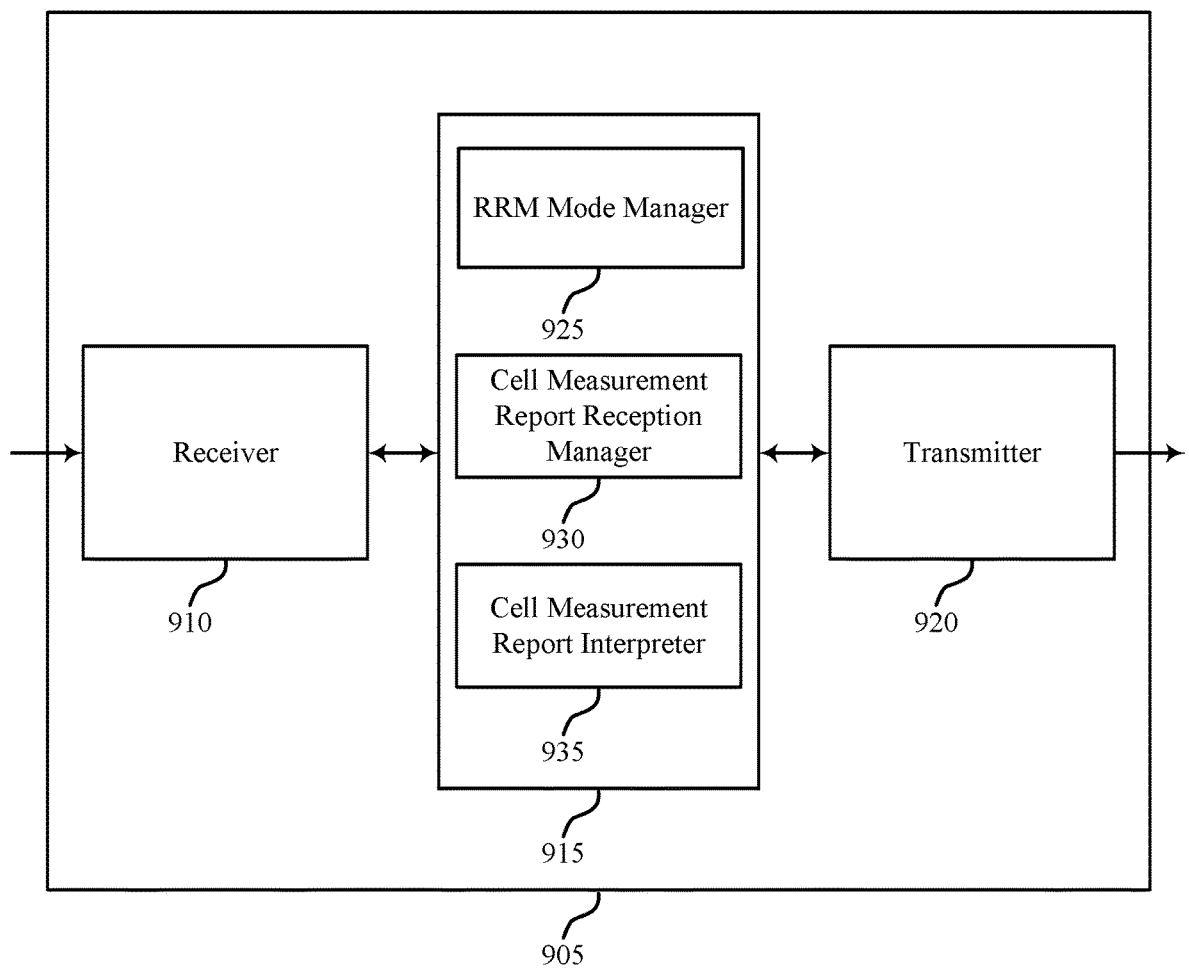

FIG. 9 shows a block diagram 900 of an apparatus 905 for use in wireless communication, in accordance with aspects of the present disclosure. The apparatus 905 may be an example of aspects of one or more of the base stations described with reference to FIGS. 1 and 3 through 5. The apparatus 905 may include a receiver 910, a base station wireless communications manager 915, and a transmitter 920. The apparatus 905 may also include a processor. Each of these components may be in communication with one another (e.g., via one or more buses).

The receiver 910 may receive data or control signals or information (i.e., transmissions), some or all of which may be associated with various information channels (e.g., data channels, control channels, etc.). Received signals or information, or measurements performed thereon, may be passed to other components of the apparatus 905. The receiver 910 may include one or a plurality of antennas.

The transmitter 920 may transmit data or control signals or information (i.e., transmissions) generated by other components of the apparatus 905, some or all of which may be associated with various information channels (e.g., data channels, control channels, etc.). In some examples, the transmitter 920 may be collocated with the receiver 910 in a transceiver. For example, the transmitter 920 and receiver 910 may be an example of aspects of the transceiver(s) 1350 described with reference to FIG. 13. The transmitter 920 may include one or a plurality of antennas, which may be separate from (or shared with) the one or more antennas used by the receiver 910.

The base station wireless communications manager 915 and/or at least some of its various sub-components may be implemented in hardware, software executed by a processor, firmware, or any combination thereof. If implemented in software executed by a processor, the functions of the base station wireless communications manager 915 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station wireless communications manager 915 and/or at least some of its various sub-components may be physically located at various positions, including being distributed such that portions of functions are implemented at different physical locations by one or more physical devices. In some examples, the base station wireless communications manager 915 and/or at least some of its various sub-components may be a separate and distinct component in accordance with aspects of the present disclosure. In other examples, the base station wireless communications manager 915 and/or at least some of its various sub-components may be combined with one or more other hardware components, including but not limited to an I/O component, a transceiver, another computing device, one or more other components described in the present disclosure, or a combination thereof, in accordance with aspects of the present disclosure. The base station wireless communications manager 915 may include an RRM mode manager 925, a cell measurement report reception manager 930, and a cell measurement report interpreter 935.

The RRM mode manager 925 may be used to transmit, to a UE, an RRM mode indicator that indicates a set of one or more beams for which cell measurement and reporting is to be performed by the UE. In some examples, the RRM mode indicator may be associated with a cell measurement report transmission periodicity. In some examples, the cell measurement report transmission periodicity may be based at least in part on whether the RRM mode indicator indicates per cell measurement reporting or per beam measurement reporting.

The cell measurement report reception manager 930 may be used to receive a cell measurement report from the UE.

The cell measurement report interpreter 935 may be used to interpret the cell measurement report, based at least in part on the RRM mode indicator, to extract at least one cell measurement on at least one SS block received by the UE from at least one neighboring cell.

Figure 10:
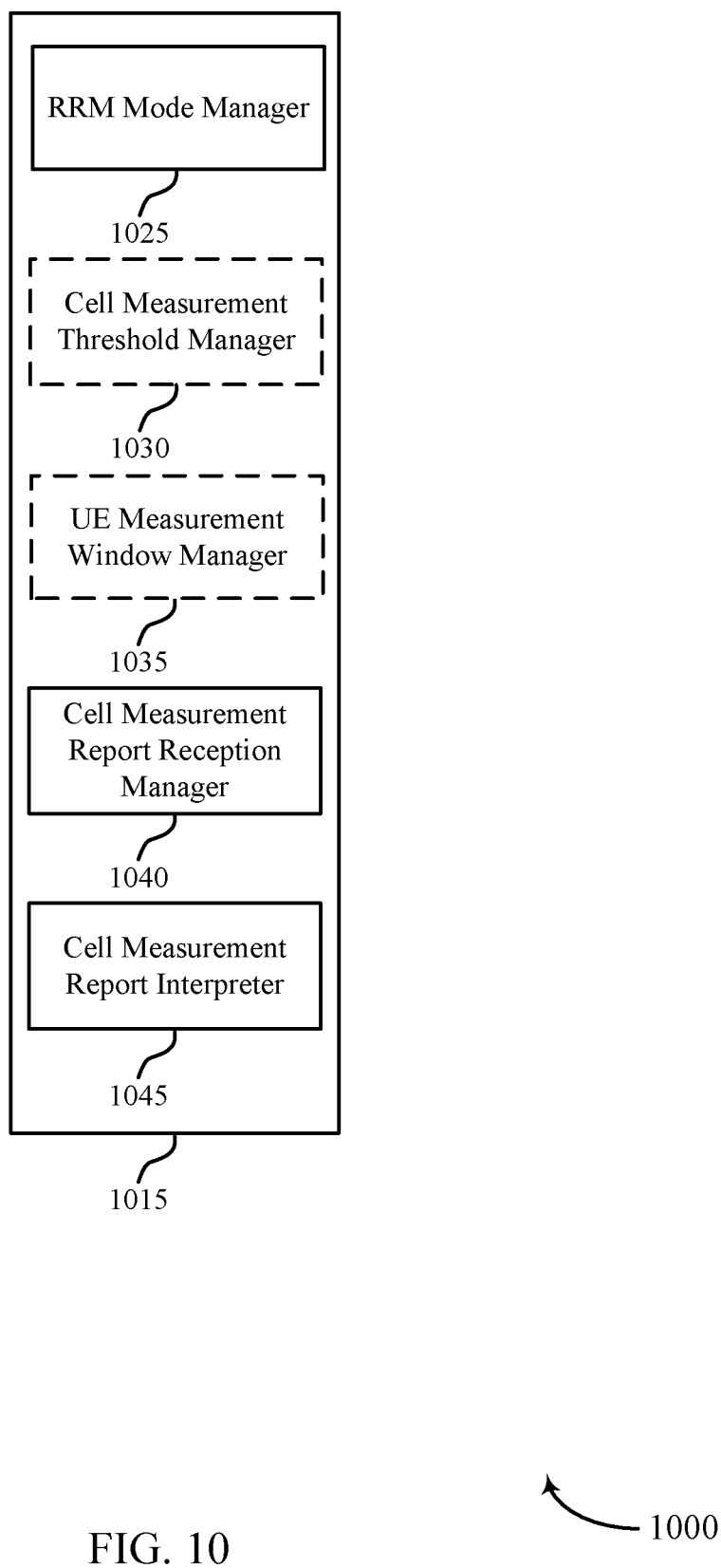
FIG. 10 shows a block diagram of a base station wireless communications manager, in accordance with aspects of the present disclosure.

FIG. 10 shows a block diagram 1000 of a base station wireless communications manager 1015, in accordance with aspects of the present disclosure. The base station wireless communications manager 1015 may be an example of aspects of the base station wireless communications manager 915 described with reference to FIG. 9. The base station wireless communications manager 1015 may include an RRM mode manager 1025, an optional cell measurement threshold manager 1030, an optional UE measurement window manager 1035, a cell measurement report reception manager 1040, and a cell measurement report interpreter 1045. Each of these components may communicate, directly or indirectly, with one another (e.g., via one or more buses). The RRM mode manager 1025, cell measurement report reception manager 1040, and cell measurement report interpreter 1045 may be examples of the RRM mode manager 925, cell measurement report reception manager 930, and cell measurement report interpreter 935 described with reference to FIG. 9.

The RRM mode manager 1025 may be used to transmit, to a UE, an RRM mode indicator that indicates a set of one or more beams for which cell measurement and reporting is to be performed by the UE. In some examples, the RRM mode indicator may be associated with a cell measurement report transmission periodicity. In some examples, the cell measurement report transmission periodicity may be based at least in part on whether the RRM mode indicator indicates per cell measurement reporting or per beam measurement reporting.

The cell measurement report reception manager 1040 may be used to receive a cell measurement report from the UE.

The cell measurement report interpreter 1045 may be used to interpret the cell measurement report, based at least in part on the RRM mode indicator, to extract at least one cell measurement on at least one SS block received by the UE from at least one neighboring cell.

In some examples, the cell measurement threshold manager 1030 may be used to transmit, to the UE, at least one cell measurement threshold for determining whether the UE should include a cell measurement in the cell measurement report.

In some examples, the UE measurement window manager 1035 may transmit, to the UE, an indicator of a measurement window smaller than an SS burst set periodicity of a serving cell for the UE and the at least one neighboring cell. In some examples, the UE measurement window manager 1035 may also or alternatively transmit, to the UE, a maximum number of SS blocks in an SS burst set of a neighboring cell.

In some examples, the set of one or more beams indicated by the RRM mode indicator may include a single beam, and interpreting the cell measurement report may include interpreting the cell measurement report, based at least in part on the RRM mode indicator, to include an association of a cell ID of a neighboring cell and the at least one cell measurement.

In some examples, the set of one or more beams indicated by the RRM mode indicator may include a plurality of beams, and interpreting the cell measurement report may include interpreting the cell measurement report, based at least in part on the RRM mode indicator, to include an association of a cell ID of a neighboring cell and a maximum value of the at least one cell measurement.

In some examples, the set of one or more beams indicated by the RRM mode indicator may include a plurality of beams, and interpreting the cell measurement report may include interpreting the cell measurement report, based at least in part on the RRM mode indicator, to include an association of a cell ID of a neighboring cell, a beam index, and a maximum value of the at least one cell measurement.

In some examples, the set of one or more beams indicated by the RRM mode indicator may include a plurality of beams, and interpreting the cell measurement report may include interpreting the cell measurement report, based at least in part on the RRM mode indicator, to include, for each beam in a set of one or more beams, an association of a cell ID of a neighboring cell, a beam index for a beam in the set of one or more beams, and a maximum value of the at least one cell measurement for the beam in the set of one or more beams.

Figure 11:
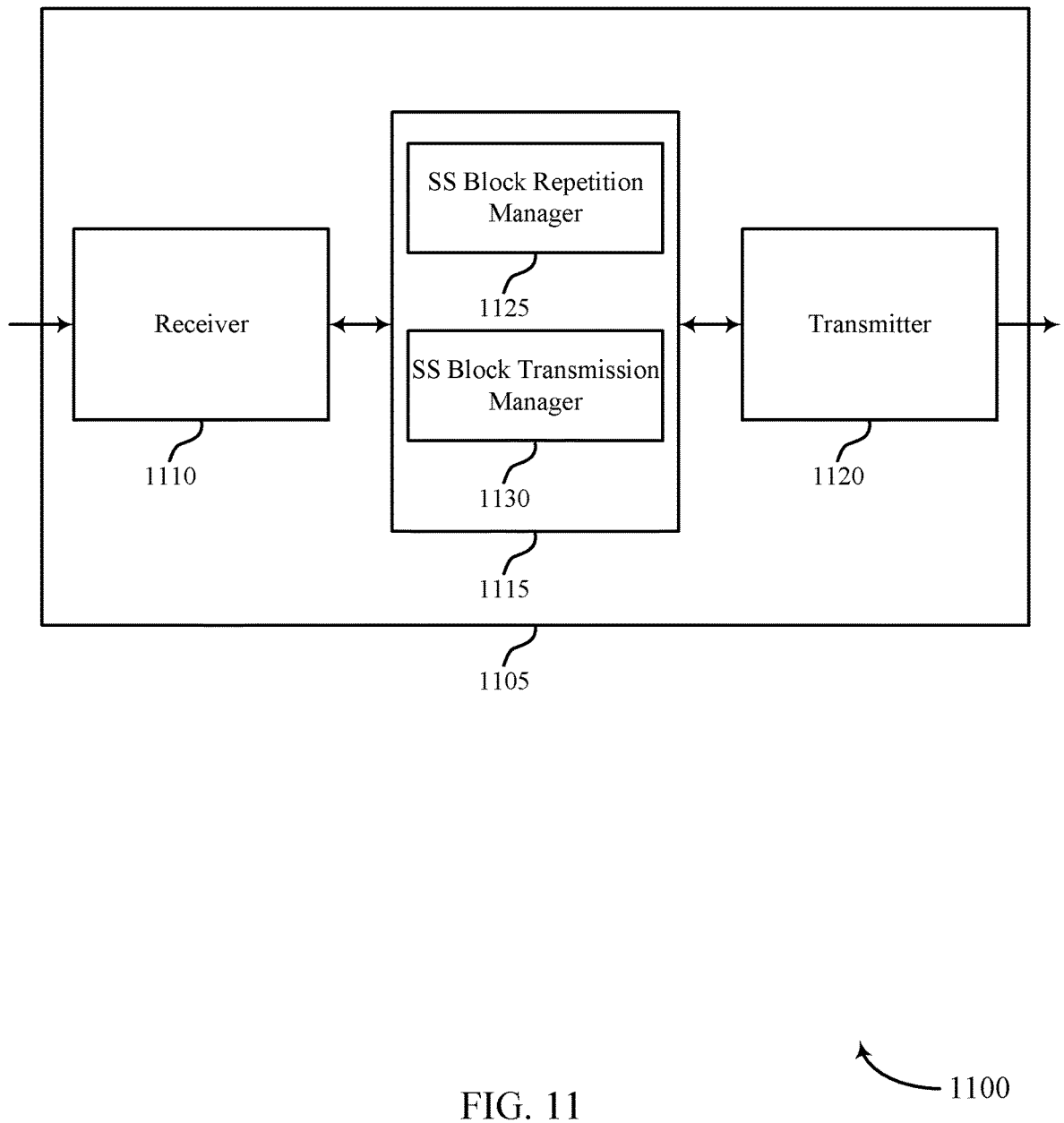
FIG. 11 shows a block diagram of an apparatus for use in wireless communication, in accordance with aspects of the present disclosure.

FIG. 11 shows a block diagram 1100 of an apparatus 1105 for use in wireless communication, in accordance with aspects of the present disclosure. The apparatus 1105 may be an example of aspects of one or more of the base stations described with reference to FIGS. 1 and 3 through 5. The apparatus 1105 may include a receiver 1110, a base station wireless communications manager 1115, and a transmitter 1120. The apparatus 1105 may also include a processor. Each of these components may be in communication with one another (e.g., via one or more buses).

The receiver 1110 may receive data or control signals or information (i.e., transmissions), some or all of which may be associated with various information channels (e.g., data channels, control channels, etc.). Received signals or information, or measurements performed thereon, may be passed to other components of the apparatus 1105. The receiver 1110 may include one or a plurality of antennas.

The transmitter 1120 may transmit data or control signals or information (i.e., transmissions) generated by other components of the apparatus 1105, some or all of which may be associated with various information channels (e.g., data channels, control channels, etc.). In some examples, the transmitter 1120 may be collocated with the receiver 1110 in a transceiver. For example, the transmitter 1120 and receiver 1110 may be an example of aspects of the transceiver(s) 1350 described with reference to FIG. 13. The transmitter 1120 may include one or a plurality of antennas, which may be separate from (or shared with) the one or more antennas used by the receiver 1110.

The base station wireless communications manager 1115 and/or at least some of its various sub-components may be implemented in hardware, software executed by a processor, firmware, or any combination thereof. If implemented in software executed by a processor, the functions of the base station wireless communications manager 1115 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station wireless communications manager 1115 and/or at least some of its various sub-components may be physically located at various positions, including being distributed such that portions of functions are implemented at different physical locations by one or more physical devices. In some examples, the base station wireless communications manager 1115 and/or at least some of its various sub-components may be a separate and distinct component in accordance with aspects of the present disclosure. In other examples, the base station wireless communications manager 1115 and/or at least some of its various sub-components may be combined with one or more other hardware components, including but not limited to an I/O component, a transceiver, another computing device, one or more other components described in the present disclosure, or a combination thereof, in accordance with aspects of the present disclosure. The base station wireless communications manager 1115 may include an SS block repetition manager 1125 and an SS block transmission manager 1130.

The SS block repetition manager 1125 may be used to transmit, to a UE, a first indicator of a number of SS block repetitions within an SS burst set, a second indicator of a distance between SS block repetitions within the SS burst set, or a combination thereof.

The SS block transmission manager 1130 may be used to transmit a plurality of SS blocks according to the number of SS block repetitions, the distance between SS block repetitions, or a combination thereof.

Figure 12:
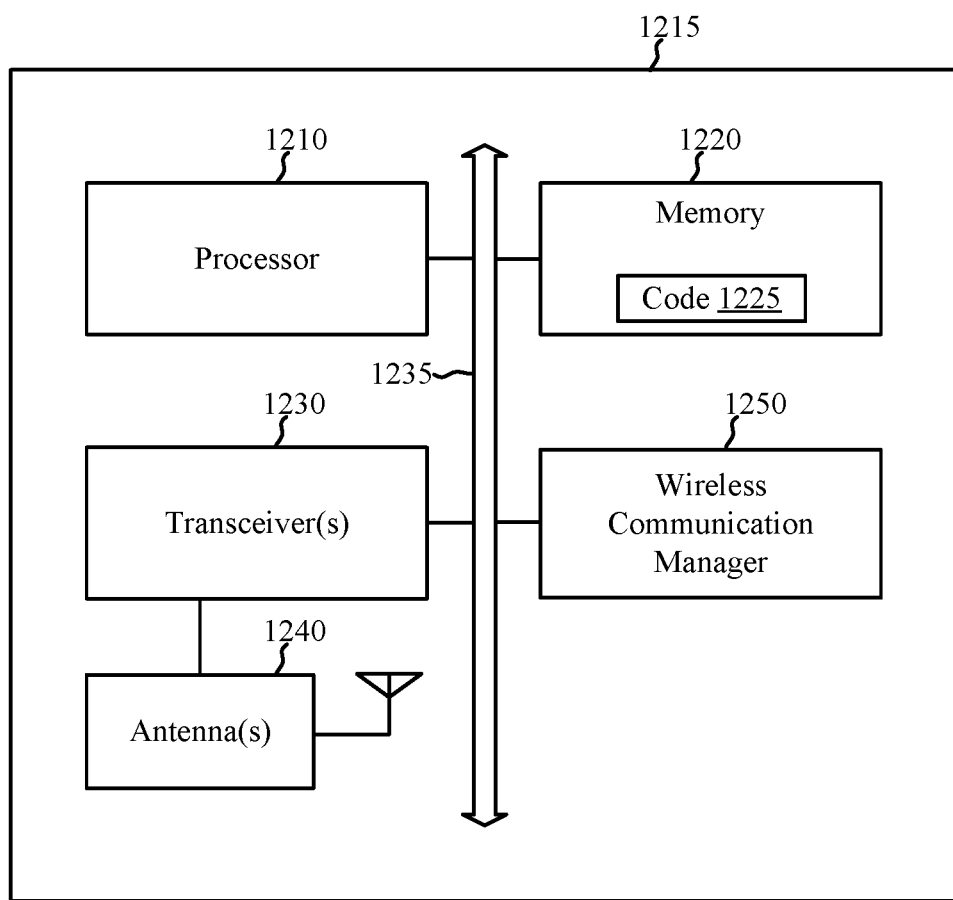
FIG. 12 shows a block diagram of a UE for use in wireless communication, in accordance with aspects of the present disclosure.

FIG. 12 shows a block diagram 1200 of a UE 1215 for use in wireless communication, in accordance with aspects of the present disclosure. The UE 1215 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1215 may, in some examples, have an internal power supply (not shown), such as a small battery, to facilitate mobile operation. In some examples, the UE 1215 may be an example of aspects of one or more of the UEs described with reference to FIGS. 1 and 3 through 5, or aspects of one or more of the apparatuses described with reference to FIGS. 6 and 8. The UE 1215 may be configured to implement at least some of the UE or apparatus techniques or functions described with reference to FIGS. 1 through 8.

The UE 1215 may include a processor 1210, a memory 1220, at least one transceiver (represented by transceiver(s) 1230), at least one antenna (represented by antenna(s) 1240), or a UE wireless communications manager 1250. Each of these components may be in communication with each other, directly or indirectly, over one or more buses 1235.

The memory 1220 may include random access memory (RAM) or read-only memory (ROM). The memory 1220 may store computer-readable, computer-executable code 1225 containing instructions that are configured to, when executed, cause the processor 1210 to perform various functions described herein related to wireless communication, including, for example, determining whether to decode a PBCH received in an SS block based at least in part on an RRM mode indicator, or combining SS blocks based at least in part on a first indicator of a number of SS block repetitions within an SS burst set, a second indicator of a distance between SS block repetitions within the SS burst set, or a combination thereof. Alternatively, the computer-executable code 1225 may not be directly executable by the processor 1210 but be configured to cause the UE 1215 (e.g., when compiled and executed) to perform various of the functions described herein.

The processor 1210 may include an intelligent hardware device, e.g., a central processing unit (CPU), a microcontroller, an ASIC, etc. The processor 1210 may process information received through the transceiver(s) 1230 or information to be sent to the transceiver(s) 1230 for transmission through the antenna(s) 1240. The processor 1210 may handle, alone or in connection with the UE wireless communications manager 1250, one or more aspects of communicating over (or managing communications over) one or more radio frequency spectrum bands.

The transceiver(s) 1230 may include a modem configured to modulate packets and provide the modulated packets to the antenna(s) 1240 for transmission, and to demodulate packets received from the antenna(s) 1240. The transceiver(s) 1230 may, in some examples, be implemented as one or more transmitters and one or more separate receivers. The transceiver(s) 1230 may support communications in one or more radio frequency spectrum bands. The transceiver(s) 1230 may be configured to communicate bi-directionally, via the antenna(s) 1240, with one or more base stations or apparatuses, such as one or more of the base stations or apparatuses described with reference to FIGS. 1, 3 through 5, 9, and 11.

The UE wireless communications manager 1250 may be configured to perform or control some or all of the UE or apparatus techniques or functions described with reference to FIGS. 1 through 8. The UE wireless communications manager 1250, or portions of it, may include a processor, or some or all of the functions of the UE wireless communications manager 1250 may be performed by the processor 1210 or in connection with the processor 1210. In some examples, the UE wireless communications manager 1250 may be an example of aspects of one or more of the UE wireless communications managers described with reference to FIGS. 6 through 8.

Figure 13:
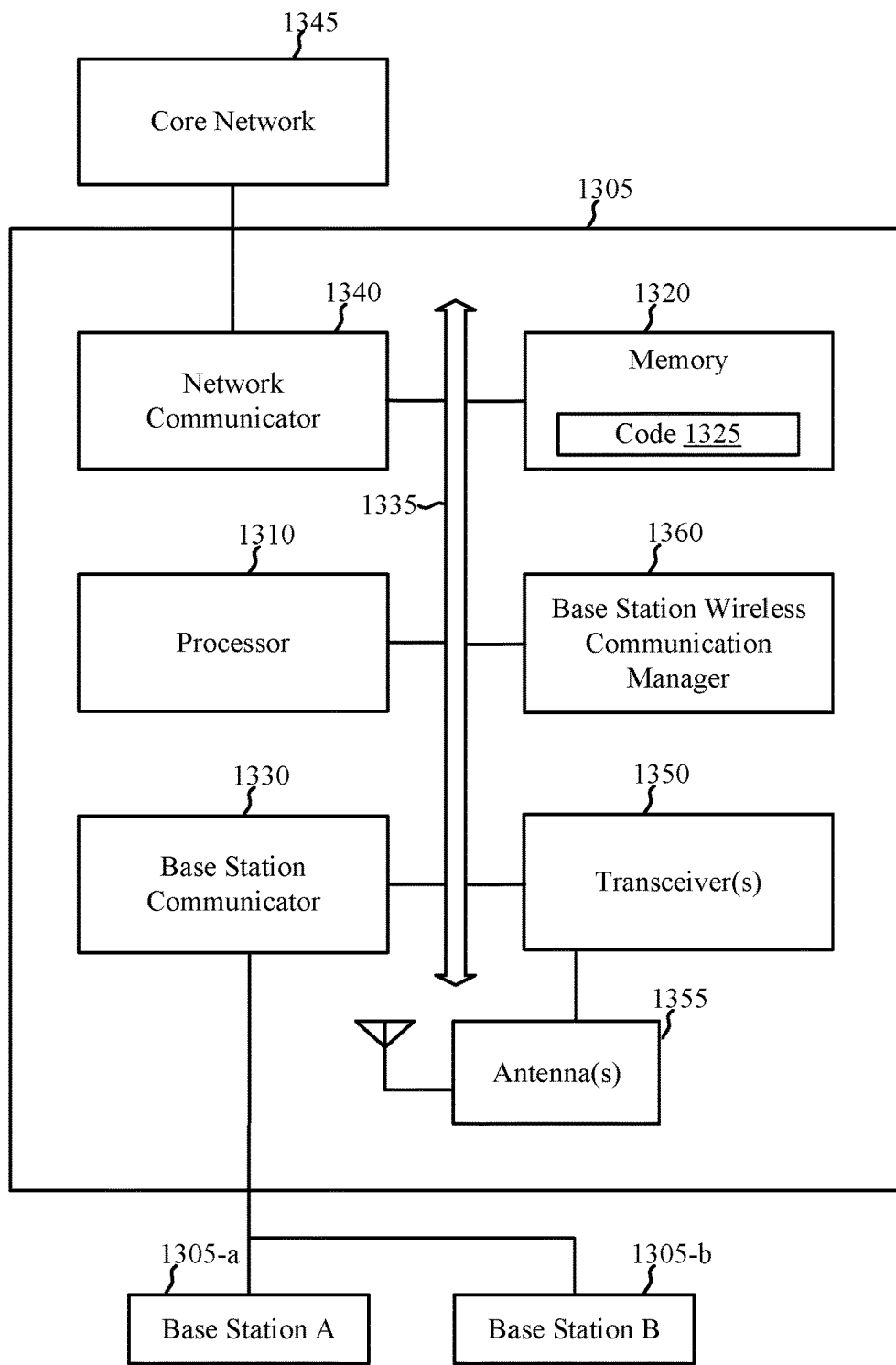
FIG. 13 shows a block diagram of a base station for use in wireless communication, in accordance with aspects of the present disclosure.

FIG. 13 shows a block diagram 1300 of a base station 1305 for use in wireless communication, in accordance with aspects of the present disclosure. In some examples, the base station 1305 may be an example of aspects of one or more of the base stations described with reference to FIGS. 1 and 3 through 5, or aspects of one or more of the apparatuses described with reference to FIGS. 9 and 11. The base station 1305 may be configured to implement or facilitate at least some of the base station or apparatus techniques or functions described with reference to FIGS. 1 through 5 and 9 through 11.

The base station 1305 may include a processor 1310, a memory 1320, at least one transceiver (represented by transceiver(s) 1350), at least one antenna (represented by antenna(s) 1355), or a base station wireless communications manager 1360. The base station 1305 may also include one or more of a base station communicator 1330 or a network communicator 1340. Each of these components may be in communication with each other, directly or indirectly, over one or more buses 1335.

The memory 1320 may include RAM or ROM. The memory 1320 may store computer-readable, computer-executable code 1325 containing instructions that are configured to, when executed, cause the processor 1310 to perform various functions described herein related to wireless communication, including, for example, transmitting an RRM mode indicator to a UE, interpreting a received cell measurement report based at least in part on an RRM mode indicator, or transmitting a first indicator of a number of SS block repetitions within an SS burst set, a second indicator of a distance between SS block repetitions within the SS burst set, or a combination thereof. Alternatively, the computer-executable code 1325 may not be directly executable by the processor 1310 but be configured to cause the base station 1305 (e.g., when compiled and executed) to perform various of the functions described herein.

The processor 1310 may include an intelligent hardware device, e.g., a CPU, a microcontroller, an ASIC, etc. The processor 1310 may process information received through the transceiver(s) 1350, the base station communicator 1330, or the network communicator 1340. The processor 1310 may also process information to be sent to the transceiver(s) 1350 for transmission through the antenna(s) 1355, or to the base station communicator 1330 for transmission to one or more other base stations (e.g., base station 1305-*a* and base station 1305-*b*), or to the network communicator 1340 for transmission to a core network 1345, which may be an example of one or more aspects of the core network 130 described with reference to FIG. 1. The processor 1310 may handle, alone or in connection with the base station wireless communications manager 1360, one or more aspects of communicating over (or managing communications over) one or more radio frequency spectrum bands.

The transceiver(s) 1350 may include a modem configured to modulate packets and provide the modulated packets to the antenna(s) 1355 for transmission, and to demodulate packets received from the antenna(s) 1355. The transceiver(s) 1350 may, in some examples, be implemented as one or more transmitters and one or more separate receivers. The transceiver(s) 1350 may support communications in one or more radio frequency spectrum bands. The transceiver(s) 1350 may be configured to communicate bi-directionally, via the antenna(s) 1355, with one or more UEs or apparatuses, such as one or more of the UEs or apparatuses described with reference to FIGS. 1, 3 through 6, 8, and 12. The base station 1305 may communicate with the core network 1345 through the network communicator 1340. The base station 1305 may also communicate with other base stations, such as the base station 1305-*a* and the base station 1305-*b*, using the base station communicator 1330.

The base station wireless communications manager 1360 may be configured to perform or control some or all of the base station or apparatus techniques or functions described with reference to FIGS. 1 through 5 and 9 through 11. The base station wireless communications manager 1360, or portions of it, may include a processor, or some or all of the functions of the base station wireless communications manager 1360 may be performed by the processor 1310 or in connection with the processor 1310. In some examples, the base station wireless communications manager 1360 may be an example of aspects of one or more of the base station wireless communications managers described with reference to FIGS. 9 through 11.

Figure 14:
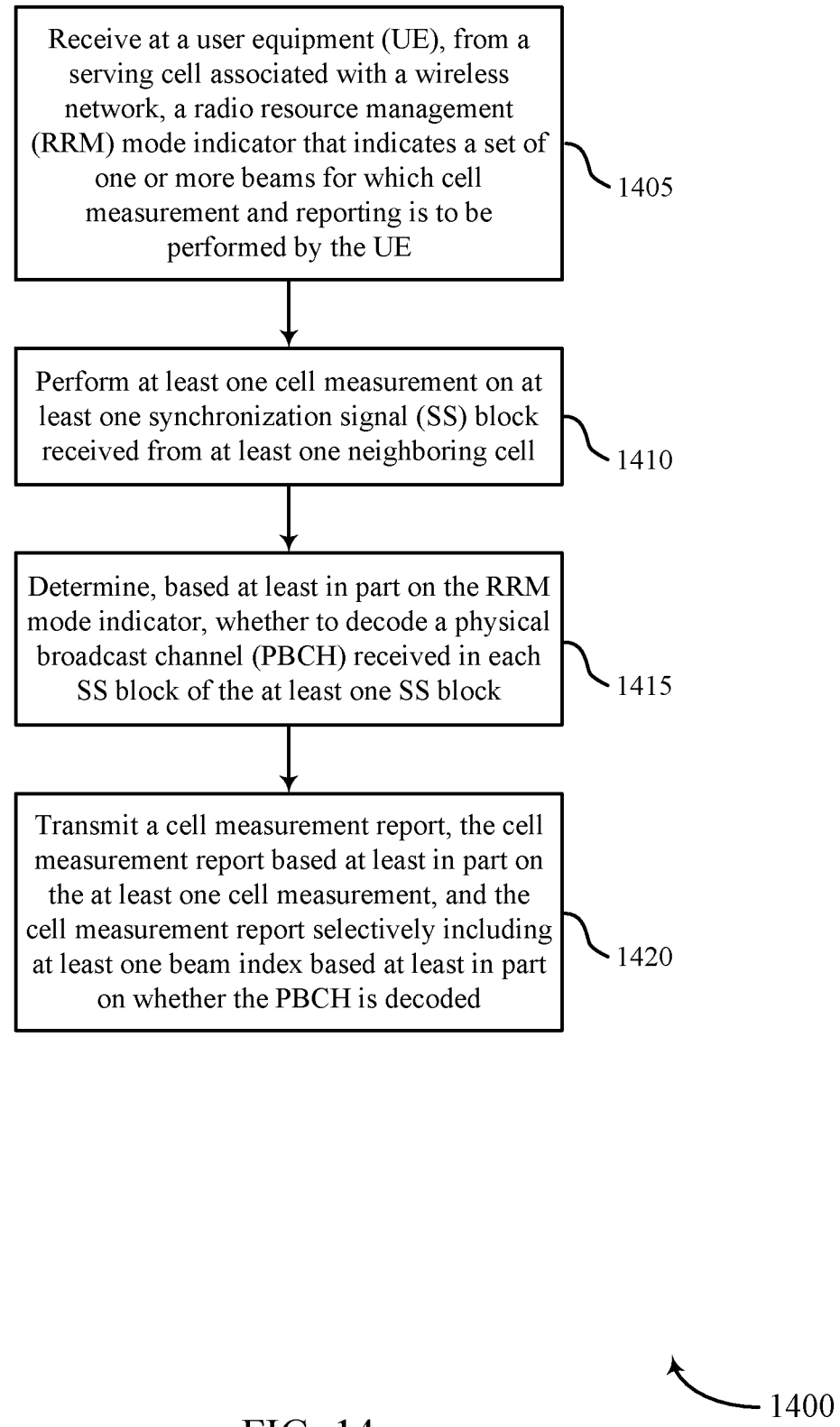
FIGS. 14 through 22 are flow charts illustrating examples of methods for wireless communications at a UE, in accordance with aspects of the present disclosure.

FIG. 14 is a flow chart illustrating an example of a method 1400 for wireless communications at a UE, in accordance with aspects of the present disclosure. For clarity, the method 1400 is described below with reference to aspects of one or more of the UEs described with reference to FIGS. 1, 3 through 5, and 12, aspects of one or more of the apparatuses described with reference to FIGS. 6 and 8, or aspects of one or more of the UE wireless communications managers described with reference to FIGS. 6 through 8 and 12. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include receiving at the UE, from a serving cell associated with a wireless network, an RRM mode indicator that indicates a set of one or more beams for which cell measurement and reporting is to be performed by the UE. In some examples, the RRM mode indicator may be associated with a cell measurement report transmission periodicity. The cell measurement report transmission periodicity may be based at least in part on whether the RRM mode indicator indicates per cell measurement reporting or per beam measurement reporting. In some examples, the operation(s) at block 1405 may be performed using the RRM mode manager described with reference to FIGS. 6 and 7.

At block 1410, the method 1400 may include performing at least one cell measurement on at least one SS block received from at least one neighboring cell. In some examples, the operation(s) at block 1410 may be performed using the cell measurement manager described with reference to FIGS. 6 and 7.

At block 1415, the method 1400 may include determining, based at least in part on the RRM mode indicator, whether to decode a PBCH received in each SS block of the at least one SS block. In some examples, the operation(s) at block 1415 may be performed using the PBCH decoding manager described with reference to FIGS. 6 and 7.

At block 1420, the method 1400 may include transmitting a cell measurement report (e.g., to the serving cell). The cell measurement report may be based at least in part on the at least one cell measurement. The cell measurement report may selectively include at least one beam index based at least in part on whether the PBCH is decoded. In some examples, the operation(s) at block 1420 may be performed using the cell measurement report manager described with reference to FIGS. 6 and 7.

In some examples of the method 1400, the operation(s) at block 1405 may further include receiving at the UE, from the serving cell, an indicator of a measurement window smaller than an SS burst set periodicity of the serving cell and the neighboring cell, and the operation(s) at block 1410 may further include performing the at least one cell measurement on the at least one SS block received from the at least one neighboring cell, and at least one measurement on at least one SS block received from the serving cell, during the measurement window.

In some examples, the method 1400 may further include determining an indicator of a measurement window is not received from the serving cell (e.g., using the measurement window manager described with reference to FIG. 7). In these examples, the operation(s) at block 1410 may further include performing, based at least in part on the determination that the indicator of the measurement window is not received, the at least one cell measurement on the at least one SS block during a measurement gap. The operation(s) at block 1410 may also include performing, based at least in part on the determination that the indicator of the measurement window is not received, and during a measurement window larger than an SS burst set periodicity of the serving cell and the at least one neighboring cell, at least one measurement on at least one SS block received from the serving cell.

Figure 15:
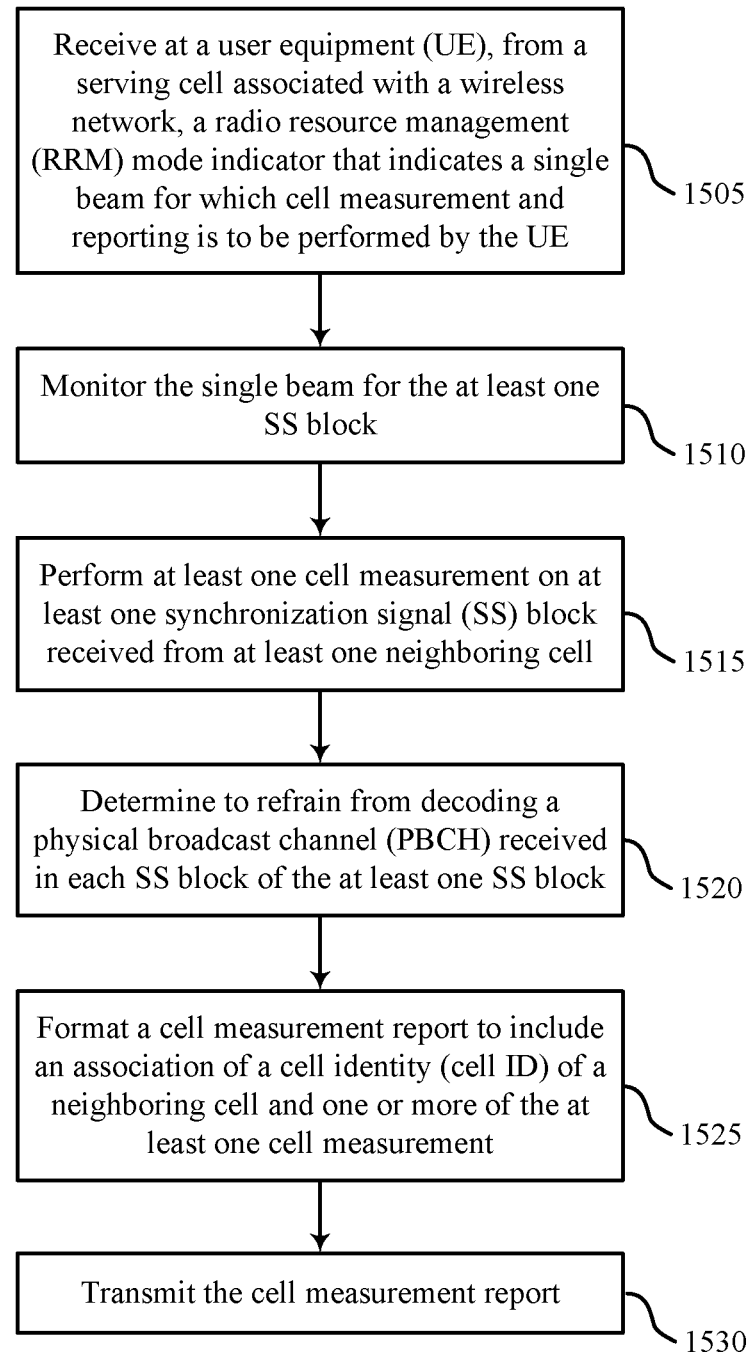

FIG. 15 is a flow chart illustrating an example of a method 1500 for wireless communications at a UE, in accordance with aspects of the present disclosure. For clarity, the method 1500 is described below with reference to aspects of one or more of the UEs described with reference to FIGS. 1, 3 through 5, and 12, aspects of one or more of the apparatuses described with reference to FIGS. 6 and 8, or aspects of one or more of the UE wireless communications managers described with reference to FIGS. 6 through 8 and 12. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving at the UE, from a serving cell associated with a wireless network, an RRM mode indicator that indicates a single beam for which cell measurement and reporting is to be performed by the UE. In some examples, the RRM mode indicator may be associated with a cell measurement report transmission periodicity. The cell measurement report transmission periodicity may be based at least in part on whether the RRM mode indicator indicates per cell measurement reporting or per beam measurement reporting. In some examples, the operation(s) at block 1505 may be performed using the RRM mode manager described with reference to FIGS. 6 and 7.

At block 1510, the method 1500 may include monitoring the single beam for the at least one SS block. In some examples, the operation(s) at block 1510 may be performed using the beam monitoring manager described with reference to FIG. 7.

At block 1515, the method 1500 may include performing at least one cell measurement on at least one SS block received from at least one neighboring cell. In some examples, the operation(s) at block 1515 may be performed using the cell measurement manager described with reference to FIGS. 6 and 7.

At block 1520, the method 1500 may include determining, based at least in part on the RRM mode indicator, to refrain from decoding a PBCH received in each SS block of the at least one SS block. In some examples, the operation(s) at block 1520 may be performed using the PBCH decoding manager described with reference to FIGS. 6 and 7.

At block 1525, the method 1500 may include formatting a cell measurement report, based at least in part on the RRM mode indicator and the at least one cell measurement, to include an association of a cell ID of a neighboring cell and one or more of the at least one cell measurement. In some examples, the operation(s) at block 1525 may be performed using the cell measurement reporting manager described with reference to FIGS. 6 and 7.

At block 1530, the method 1500 may include transmitting the cell measurement report (e.g., to the serving cell). In some examples, the operation(s) at block 1530 may be performed using the cell measurement report manager described with reference to FIGS. 6 and 7.

In some examples of the method 1500, the operation(s) at block 1505 may further include receiving at the UE, from the serving cell, an indicator of a measurement window smaller than an SS burst set periodicity of the serving cell and the at least one neighboring cell, and the operation(s) at block 1515 may further include performing the at least one cell measurement on the at least one SS block received from the at least one neighboring cell, and at least one measurement on at least one SS block received from the serving cell, during the measurement window.

In some examples, the method 1500 may further include determining an indicator of a measurement window is not received from the serving cell (e.g., using the measurement window manager described with reference to FIG. 7). In these examples, the operation(s) at block 1515 may further include performing, based at least in part on the determination that the indicator of the measurement window is not received, the at least one cell measurement on the at least one SS block during a measurement gap. The operation(s) at block 1515 may also include performing, based at least in part on the determination that the indicator of the measurement window is not received, and during a measurement window larger than an SS burst set periodicity of the serving cell and the at least one neighboring cell, at least one measurement on at least one SS block received from the serving cell.

Figure 16:
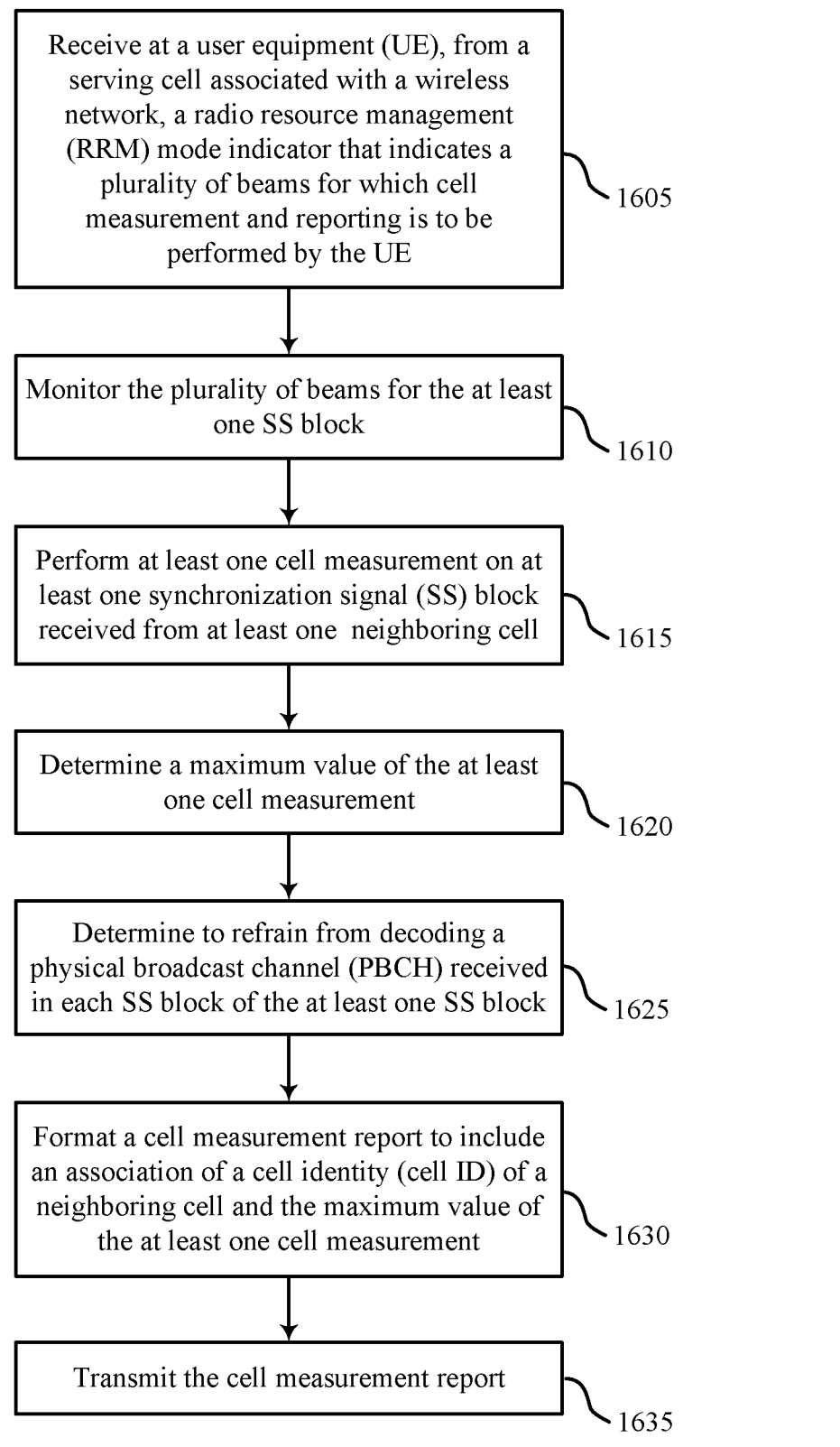

FIG. 16 is a flow chart illustrating an example of a method 1600 for wireless communications at a UE, in accordance with aspects of the present disclosure. For clarity, the method 1600 is described below with reference to aspects of one or more of the UEs described with reference to FIGS. 1, 3 through 5, and 12, aspects of one or more of the apparatuses described with reference to FIGS. 6 and 8, or aspects of one or more of the UE wireless communications managers described with reference to FIGS. 6 through 8 and 12. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include receiving at the UE, from a serving cell associated with a wireless network, an RRM mode indicator that indicates a plurality of beams for which cell measurement and reporting is to be performed by the UE. In some examples, the RRM mode indicator may be associated with a cell measurement report transmission periodicity. The cell measurement report transmission periodicity may be based at least in part on whether the RRM mode indicator indicates per cell measurement reporting or per beam measurement reporting. In some examples, the operation(s) at block 1605 may be performed using the RRM mode manager described with reference to FIGS. 6 and 7.

At block 1610, the method 1600 may include monitoring the plurality of beams for the at least one SS block. In some examples, the operation(s) at block 1610 may be performed using the beam monitoring manager described with reference to FIG. 7.

At block 1615, the method 1600 may include performing at least one cell measurement on at least one SS block received from at least one neighboring cell. In some examples, the operation(s) at block 1615 may be performed using the cell measurement manager described with reference to FIGS. 6 and 7.

At block 1620, the method 1600 may include determining a maximum value of the at least one cell measurement. In some examples, the operation(s) at block 1620 may be performed using the maximum value determiner described with reference to FIG. 7.

At block 1625, the method 1600 may include determining, based at least in part on the RRM mode indicator, to refrain from decoding a PBCH received in each SS block of the at least one SS block. In some examples, the operation(s) at block 1625 may be performed using the PBCH decoding manager described with reference to FIGS. 6 and 7.

At block 1630, the method 1600 may include formatting a cell measurement report, based at least in part on the RRM mode indicator and the at least one cell measurement, to include an association of a cell ID of a neighboring cell and the maximum value of the at least one cell measurement. In some examples, the operation(s) at block 1630 may be performed using the cell measurement reporting manager described with reference to FIGS. 6 and 7.

At block 1635, the method 1600 may include transmitting the cell measurement report (e.g., to the serving cell). In some examples, the operation(s) at block 1635 may be performed using the cell measurement report manager described with reference to FIGS. 6 and 7.

In some examples of the method 1600, the operation(s) at block 1605 may further include receiving at the UE, from the serving cell, an indicator of a measurement window smaller than an SS burst set periodicity of the serving cell and the at least one neighboring cell, and the operation(s) at block 1615 may further include performing the at least one cell measurement on the at least one SS block received from the at least one neighboring cell, and at least one measurement on at least one SS block received from the serving cell, during the measurement window.

In some examples, the method 1600 may further include determining an indicator of a measurement window is not received from the serving cell (e.g., using the measurement window manager described with reference to FIG. 7). In these examples, the operation(s) at block 1615 may further include performing, based at least in part on the determination that the indicator of the measurement window is not received, the at least one cell measurement on the at least one SS block during a measurement gap. The operation(s) at block 1615 may also include performing, based at least in part on the determination that the indicator of the measurement window is not received, and during a measurement window larger than an SS burst set periodicity of the serving cell and the at least one neighboring cell, at least one measurement on at least one SS block received from the serving cell.

Figure 17:
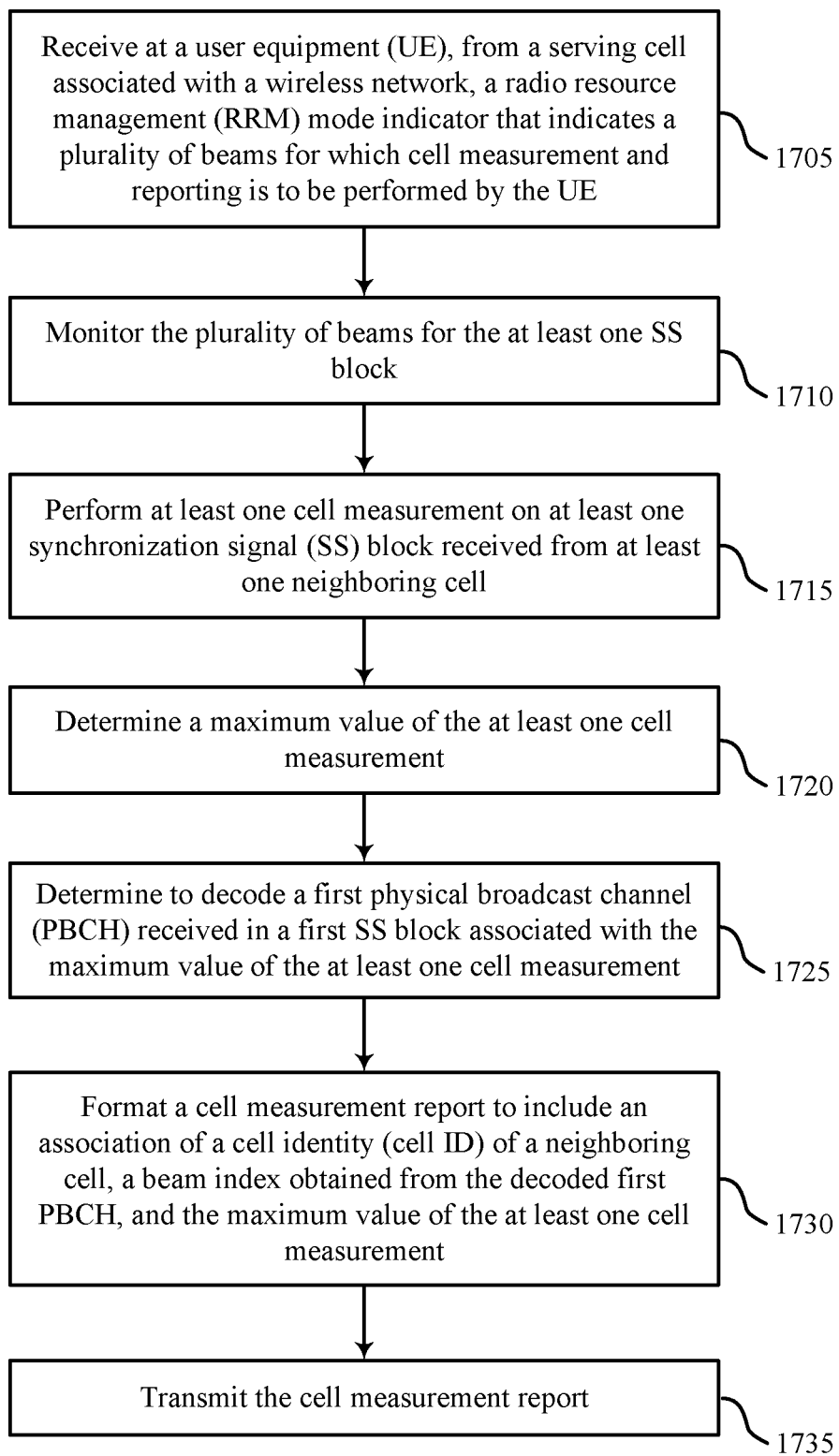

FIG. 17 is a flow chart illustrating an example of a method 1700 for wireless communications at a UE, in accordance with aspects of the present disclosure. For clarity, the method 1700 is described below with reference to aspects of one or more of the UEs described with reference to FIGS. 1, 3 through 5, and 12, aspects of one or more of the apparatuses described with reference to FIGS. 6 and 8, or aspects of one or more of the UE wireless communications managers described with reference to FIGS. 6 through 8 and 12. In some examples, a UE may execute one or more sets of codes to control the functional elements of the UE to perform the functions described below. Additionally or alternatively, the UE may perform one or more of the functions described below using special-purpose hardware.

At block 1705, the method 1700 may include receiving at the UE, from a serving cell associated with a wireless network, an RRM mode indicator that indicates a plurality of beams for which cell measurement and reporting is to be performed by the UE. In some examples, the RRM mode indicator may be associated with a cell measurement report transmission periodicity. The cell measurement report transmission periodicity may be based at least in part on whether the RRM mode indicator indicates per cell measurement reporting or per beam measurement reporting. In some examples, the operation(s) at block 1705 may be performed using the RRM mode manager described with reference to FIGS. 6 and 7.

At block 1710, the method 1700 may include monitoring the plurality of beams for the at least one SS block. In some examples, the operation(s) at block 1710 may be performed using the beam monitoring manager described with reference to FIG. 7.

At block 1715, the method 1700 may include performing at least one cell measurement on at least one SS block received from at least one neighboring cell. In some examples, the operation(s) at block 1715 may be performed using the cell measurement manager described with reference to FIGS. 6 and 7.

At block 1720, the method 1700 may include determining a maximum value of the at least one cell measurement. In some examples, the operation(s) at block 1720 may be performed using the maximum value determiner described with reference to FIG. 7.

At block 1725, the method 1700 may include determining, based at least in part on the RRM mode indicator, to decode a first PBCH received in a first SS block associated with the maximum value of the at least one cell measurement. In some examples, the operation(s) at block 1725 may be performed using the PBCH decoding manager described with reference to FIGS. 6 and 7.

At block 1730, the method 1700 may include formatting a cell measurement report, based at least in part on the RRM mode indicator and the at least one cell measurement, to include an association of a cell ID of a neighboring cell, a beam index obtained from the decoded first PBCH, and the maximum value of the at least one cell measurement. In some examples, the operation(s) at block 1730 may be performed using the cell measurement reporting manager described with reference to FIGS. 6 and 7.

At block 1735, the method 1700 may include transmitting the cell measurement report (e.g., to the serving cell). In some examples, the operation(s) at block 1735 may be performed using the cell measurement report manager described with reference to FIGS. 6 and 7.

In some examples of the method 1700, the operation(s) at block 1705 may further include receiving at the UE, from the serving cell, an indicator of a measurement window smaller than an SS burst set periodicity of the serving cell and the at least one neighboring cell, and the operation(s) at block 1715 may further include performing the at least one cell measurement on the at least one SS block received from the at least one neighboring cell, and at least one measurement on at least one SS block received from the serving cell, during the measurement window.

In some examples, the method 1700 may further include determining an indicator of a measurement window is not received from the serving cell (e.g., using the measurement window manager described with reference to FIG. 7). In these examples, the operation(s) at block 1715 may further include performing, based at least in part on the determination that the indicator of the measurement window is not received, the at least one cell measurement on the at least one SS block during a measurement gap. The operation(s) at block 1715 may also include performing, based at least in part on the determination that the indicator of the measurement window is not received, and during a measurement window larger than an SS burst set periodicity of the serving cell and the at least one neighboring cell, at least one measurement on at least one SS block received from the serving cell.

Figure 18:
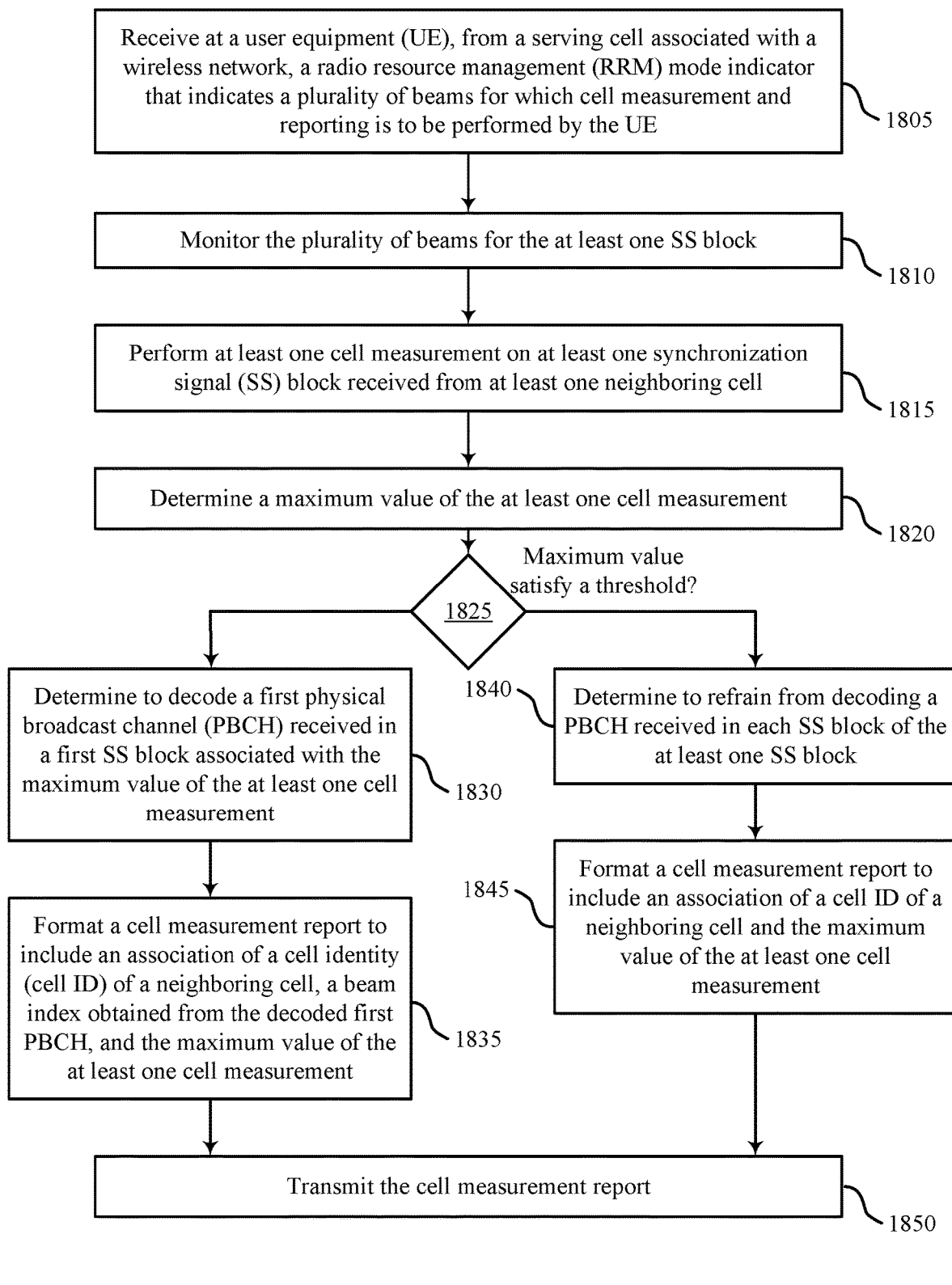

FIG. 18 is a flow chart illustrating an example of a method 1800 for wireless communications at a UE, in accordance with aspects of the present disclosure. For clarity, the method 1800 is described below with reference to aspects of one or more of the UEs described with reference to FIGS. 1, 3 through 5, and 12, aspects of one or more of the apparatuses described with reference to FIGS. 6 and 8, or aspects of one or more of the UE wireless communications managers described with reference to FIGS. 6 through 8 and 12. In some examples, a UE may execute one or more sets of codes to control the functional elements of the UE to perform the functions described below. Additionally or alternatively, the UE may perform one or more of the functions described below using special-purpose hardware.

At block 1805, the method 1800 may include receiving at the UE, from a serving cell associated with a wireless network, an RRM mode indicator that indicates a plurality of beams for which cell measurement and reporting is to be performed by the UE. In some examples, the RRM mode indicator may be associated with a cell measurement report transmission periodicity. The cell measurement report transmission periodicity may be based at least in part on whether the RRM mode indicator indicates per cell measurement reporting or per beam measurement reporting. In some examples, the operation(s) at block 1805 may be performed using the RRM mode manager described with reference to FIGS. 6 and 7.

At block 1810, the method 1800 may include monitoring the plurality of beams for the at least one SS block. In some examples, the operation(s) at block 1810 may be performed using the beam monitoring manager described with reference to FIG. 7.

At block 1815, the method 1800 may include performing at least one cell measurement on at least one SS block received from at least one neighboring cell. In some examples, the operation(s) at block 1815 may be performed using the cell measurement manager described with reference to FIGS. 6 and 7.

At block 1820, the method 1800 may include determining a maximum value of the at least one cell measurement. In some examples, the operation(s) at block 1820 may be performed using the maximum value determiner described with reference to FIG. 7.

At block 1825, the method 1800 may include determining whether the maximum value satisfies a threshold. In some examples, the method 1800 may include receiving the threshold from the serving cell. When the maximum value satisfies the threshold, the method 1800 may continue at block 1830. When the maximum value fails to satisfy the threshold, the method 1800 may continue at block 1840. In some examples, the operation(s) at block 1825 may be performed using the threshold comparator described with reference to FIG. 7.

At block 1830, the method 1800 may include determining, based at least in part on the RRM mode indicator and the determination that the maximum value satisfies the threshold, to decode a first PBCH received in a first SS block associated with the maximum value of the at least one cell measurement. In some examples, the operation(s) at block 1830 may be performed using the PBCH decoding manager described with reference to FIGS. 6 and 7.

At block 1835, the method 1800 may include formatting a cell measurement report, based at least in part on the RRM mode indicator, the determination that the maximum value satisfies the threshold, and the at least one cell measurement, to include an association of a cell ID of a neighboring cell, a beam index obtained from the decoded first PBCH, and the maximum value of the at least one cell measurement. In some examples, the operation(s) at block 1835 may be performed using the cell measurement reporting manager described with reference to FIGS. 6 and 7.

At block 1840, the method 1800 may include determining, based at least in part on the RRM mode indicator and the determination that the maximum value fails to satisfy the threshold, to refrain from decoding a PBCH received in each SS block of the at least one SS block. In some examples, the operation(s) at block 1840 may be performed using the PBCH decoding manager described with reference to FIGS. 6 and 7.

At block 1845, the method 1800 may include formatting a cell measurement report, based at least in part on the RRM mode indicator, the determination that the maximum value fails to satisfy the threshold, and the at least one cell measurement, to include an association of a cell ID of a neighboring cell and the maximum value of the at least one cell measurement. In some examples, the operation(s) at block 1845 may be performed using the cell measurement reporting manager described with reference to FIGS. 6 and 7.

At block 1850, the method 1800 may include transmitting (e.g., to the serving cell) the cell measurement report formatted at block 1835 or 1845. In some examples, the operation(s) at block 1850 may be performed using the cell measurement report manager described with reference to FIGS. 6 and 7.

In some examples of the method 1800, the operation(s) at block 1805 may further include receiving at the UE, from the serving cell, an indicator of a measurement window smaller than an SS burst set periodicity of the serving cell and the at least one neighboring cell, and the operation(s) at block 1815 may further include performing the at least one cell measurement on the at least one SS block received from the at least one neighboring cell, and at least one measurement on at least one SS block received from the serving cell, during the measurement window.

In some examples, the method 1800 may further include determining an indicator of a measurement window is not received from the serving cell (e.g., using the measurement window manager described with reference to FIG. 7). In these examples, the operation(s) at block 1815 may further include performing, based at least in part on the determination that the indicator of the measurement window is not received, the at least one cell measurement on the at least one SS block during a measurement gap. The operation(s) at block 1815 may also include performing, based at least in part on the determination that the indicator of the measurement window is not received, and during a measurement window larger than an SS burst set periodicity of the serving cell and the at least one neighboring cell, at least one measurement on at least one SS block received from the serving cell.

Figure 19:
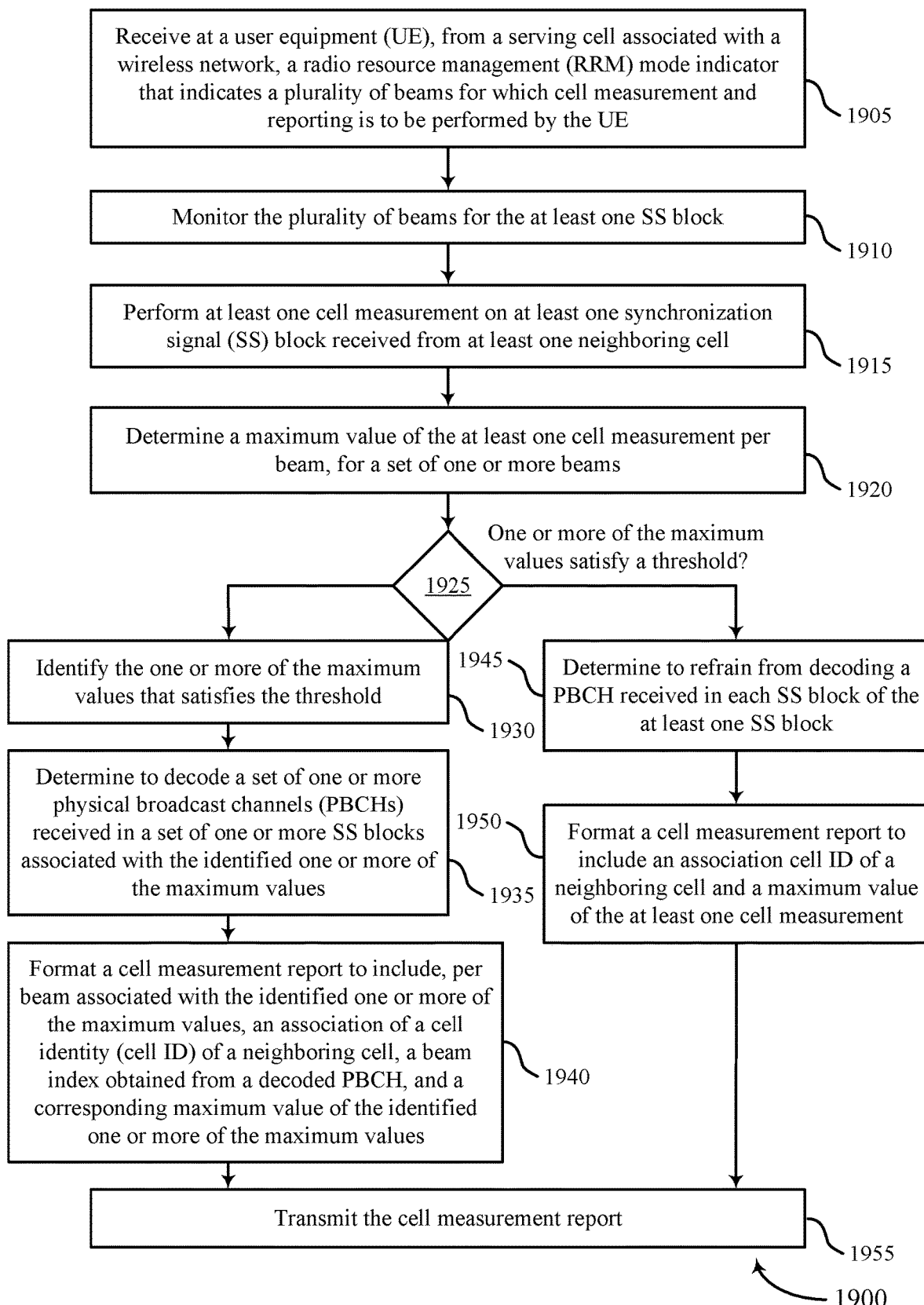

FIG. 19 is a flow chart illustrating an example of a method 1900 for wireless communications at a UE, in accordance with aspects of the present disclosure. For clarity, the method 1900 is described below with reference to aspects of one or more of the UEs described with reference to FIGS. 1, 3 through 5, and 12, aspects of one or more of the apparatuses described with reference to FIGS. 6 and 8, or aspects of one or more of the UE wireless communications managers described with reference to FIGS. 6 through 8 and 12. In some examples, a UE may execute one or more sets of codes to control the functional elements of the UE to perform the functions described below. Additionally or alternatively, the UE may perform one or more of the functions described below using special-purpose hardware.

At block 1905, the method 1900 may include receiving at the UE, from a serving cell associated with a wireless network, an RRM mode indicator that indicates a plurality of beams for which cell measurement and reporting is to be performed by the UE. In some examples, the RRM mode indicator may be associated with a cell measurement report transmission periodicity. The cell measurement report transmission periodicity may be based at least in part on whether the RRM mode indicator indicates per cell measurement reporting or per beam measurement reporting. In some examples, the operation(s) at block 1905 may be performed using the RRM mode manager described with reference to FIGS. 6 and 7.

At block 1910, the method 1900 may include monitoring the plurality of beams for the at least one SS block. In some examples, the operation(s) at block 1910 may be performed using the beam monitoring manager described with reference to FIG. 7.

At block 1915, the method 1900 may include performing at least one cell measurement on at least one SS block received from at least one neighboring cell. In some examples, the operation(s) at block 1915 may be performed using the cell measurement manager described with reference to FIGS. 6 and 7.

At block 1920, the method 1900 may include determining a maximum value of the at least one cell measurement per beam, for a set of one or more beams. In some examples, the operation(s) at block 1920 may be performed using the maximum value determiner described with reference to FIG. 7.

At block 1925, the method 1900 may include determining whether one or more of the maximum values satisfies a threshold. In some examples, the method 1900 may include receiving the threshold from the serving cell. When one or more of the maximum values satisfies the threshold, the method 1900 may continue at block 1930. When each of the maximum values fails to satisfy the threshold, the method 1900 may continue at block 1945. In some examples, the operation(s) at block 1925 may be performed using the threshold comparator described with reference to FIG. 7.

At block 1930, the method 1900 may include identifying the one or more of the maximum values that satisfies the threshold. In some examples, the operation(s) at block 1930 may be performed using the threshold comparator described with reference to FIG. 7.

At block 1935, the method 1900 may include determining, based at least in part on the RRM mode indicator and the identified one or more maximum values that satisfy the threshold, to decode a set of one or more PBCHs received in a set of one or more SS blocks associated with the identified one or more of the maximum values. In some examples, the operation(s) at block 1935 may be performed using the PBCH decoding manager described with reference to FIGS. 6 and 7.

At block 1940, the method 1900 may include formatting a cell measurement report, based at least in part on the RRM mode indicator, the identified one or more of the maximum values that satisfies the threshold, and the at least one cell measurement, to include, per beam associated with the identified one or more of the maximum values, an association of a cell ID of a neighboring cell, a beam index obtained from a decoded PBCH, and a corresponding maximum value of the identified one or more of the maximum values. In some examples, the operation(s) at block 1940 may be performed using the cell measurement reporting manager described with reference to FIGS. 6 and 7.

At block 1945, the method 1900 may include determining, based at least in part on the RRM mode indicator and the failure of each of the maximum values to satisfy the threshold, to refrain from decoding a PBCH received in each SS block of the at least one SS block. In some examples, the operation(s) at block 1945 may be performed using the PBCH decoding manager described with reference to FIGS. 6 and 7.

At block 1950, the method 1900 may include formatting a cell measurement report, based at least in part on the RRM mode indicator, the failure of each of the maximum values to satisfy the threshold, and the at least one cell measurement, to include an association of a cell ID of a neighboring cell and a maximum value of the at least one cell measurement. In some examples, the operation(s) at block 1950 may be performed using the cell measurement reporting manager described with reference to FIGS. 6 and 7.

At block 1955, the method 1900 may include transmitting (e.g., to the serving cell) the cell measurement report formatted at block 1940 or 1950. In some examples, the operation(s) at block 1955 may be performed using the cell measurement report manager described with reference to FIGS. 6 and 7.

In some examples of the method 1900, the operation(s) at block 1905 may further include receiving at the UE, from the serving cell, an indicator of a measurement window smaller than an SS burst set periodicity of the serving cell and the at least one neighboring cell, and the operation(s) at block 1915 may further include performing the at least one cell measurement on the at least one SS block received from the at least one neighboring cell, and at least one measurement on at least one SS block received from the serving cell, during the measurement window.

In some examples, the method 1900 may further include determining an indicator of a measurement window is not received from the serving cell (e.g., using the measurement window manager described with reference to FIG. 7). In these examples, the operation(s) at block 1915 may further include performing, based at least in part on the determination that the indicator of the measurement window is not received, the at least one cell measurement on the at least one SS block during a measurement gap. The operation(s) at block 1915 may also include performing, based at least in part on the determination that the indicator of the measurement window is not received, and during a measurement window larger than an SS burst set periodicity of the serving cell and the at least one neighboring cell, at least one measurement on at least one SS block received from the serving cell.

Figure 20:
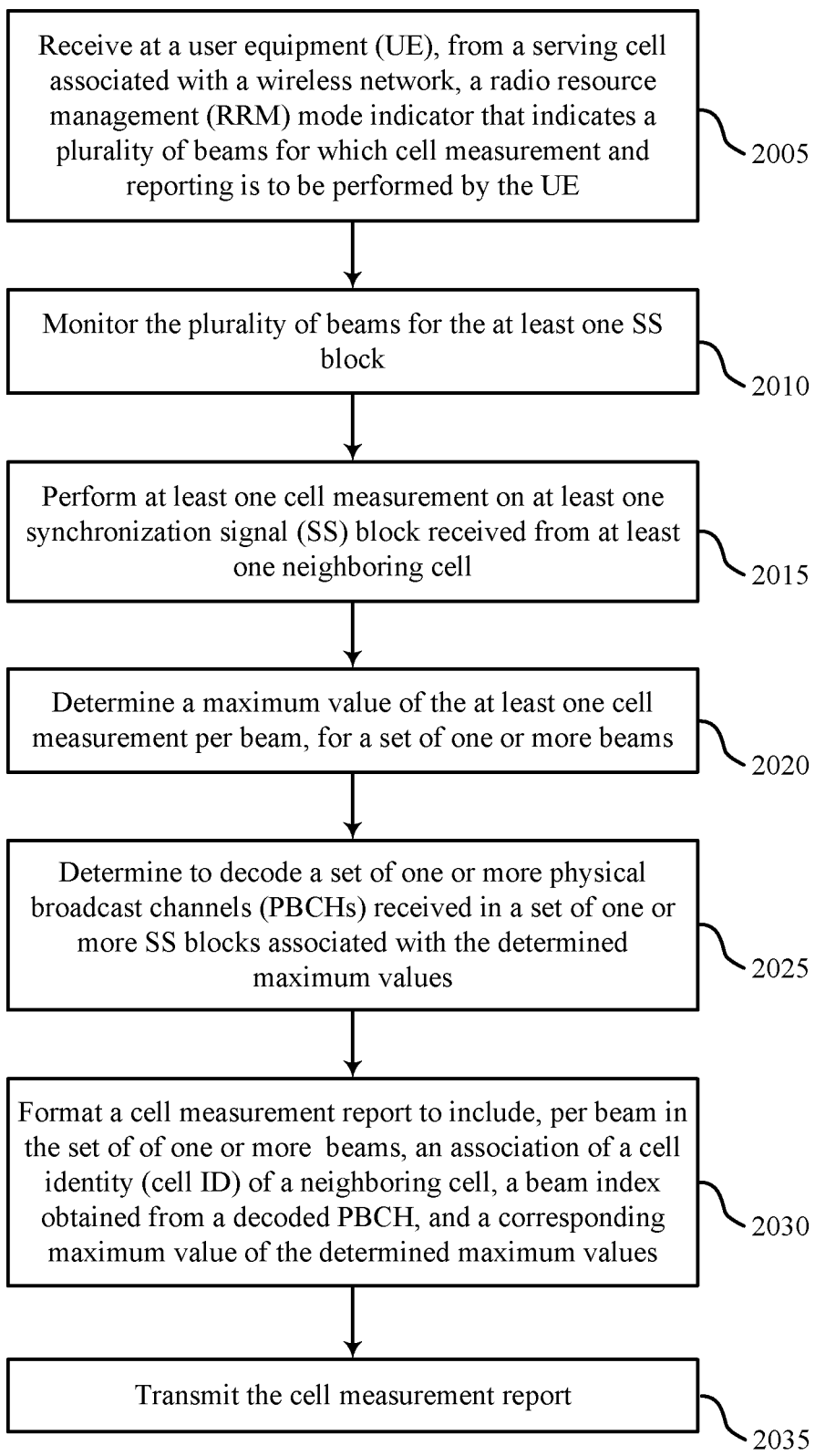

FIG. 20 is a flow chart illustrating an example of a method 2000 for wireless communications at a UE, in accordance with aspects of the present disclosure. For clarity, the method 2000 is described below with reference to aspects of one or more of the UEs described with reference to FIGS. 1, 3 through 5, and 12, aspects of one or more of the apparatuses described with reference to FIGS. 6 and 8, or aspects of one or more of the UE wireless communications managers described with reference to FIGS. 6 through 8 and 12. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include receiving at the UE, from a serving cell associated with a wireless network, an RRM mode indicator that indicates a plurality of beams for which cell measurement and reporting is to be performed by the UE. In some examples, the RRM mode indicator may be associated with a cell measurement report transmission periodicity. The cell measurement report transmission periodicity may be based at least in part on whether the RRM mode indicator indicates per cell measurement reporting or per beam measurement reporting. In some examples, the operation(s) at block 2005 may be performed using the RRM mode manager described with reference to FIGS. 6 and 7.

At block 2010, the method 2000 may include monitoring the plurality of beams for the at least one SS block. In some examples, the operation(s) at block 2010 may be performed using the beam monitoring manager described with reference to FIG. 7.

At block 2015, the method 2000 may include performing at least one cell measurement on at least one SS block received from at least one neighboring cell. In some examples, the operation(s) at block 2015 may be performed using the cell measurement manager described with reference to FIGS. 6 and 7.

At block 2020, the method 2000 may include determining a maximum value of the at least one cell measurement per beam, for a set of one or more beams. In some examples, the operation(s) at block 2020 may be performed using the maximum value determiner described with reference to FIG. 7.

At block 2025, the method 2000 may include determining, based at least in part on the RRM mode indicator, to decode a set of one or more PBCHs received in a set of one or more SS blocks associated with the determined maximum values. In some examples, the operation(s) at block 2025 may be performed using the PBCH decoding manager described with reference to FIGS. 6 and 7.

At block 2030, the method 2000 may include formatting a cell measurement report, based at least in part on the RRM mode indicator and the at least one cell measurement, to include, per beam of the set of one or more beams, an association of a cell ID of a neighboring cell, a beam index obtained from a decoded PBCH, and a corresponding maximum value of the determined maximum values. In some examples, the operation(s) at block 2030 may be performed using the cell measurement reporting manager described with reference to FIGS. 6 and 7.

At block 2035, the method 2000 may include transmitting the cell measurement report (e.g., to the serving cell). In some examples, the operation(s) at block 2035 may be performed using the cell measurement report manager described with reference to FIGS. 6 and 7.

In some examples of the method 2000, the operation(s) at block 2005 may further include receiving at the UE, from the serving cell, an indicator of a measurement window smaller than an SS burst set periodicity of the serving cell and the at least one neighboring cell, and the operation(s) at block 2015 may further include performing the at least one cell measurement on the at least one SS block received from the at least one neighboring cell, and at least one measurement on at least one SS block received from the serving cell, during the measurement window.

In some examples, the method 2000 may further include determining an indicator of a measurement window is not received from the serving cell (e.g., using the measurement window manager described with reference to FIG. 7). In these examples, the operation(s) at block 2015 may further include performing, based at least in part on the determination that the indicator of the measurement window is not received, the at least one cell measurement on the at least one SS block during a measurement gap. The operation(s) at block 2015 may also include performing, based at least in part on the determination that the indicator of the measurement window is not received, and during a measurement window larger than an SS burst set periodicity of the serving cell and the at least one neighboring cell, at least one measurement on at least one SS block received from the serving cell.

Figure 21:
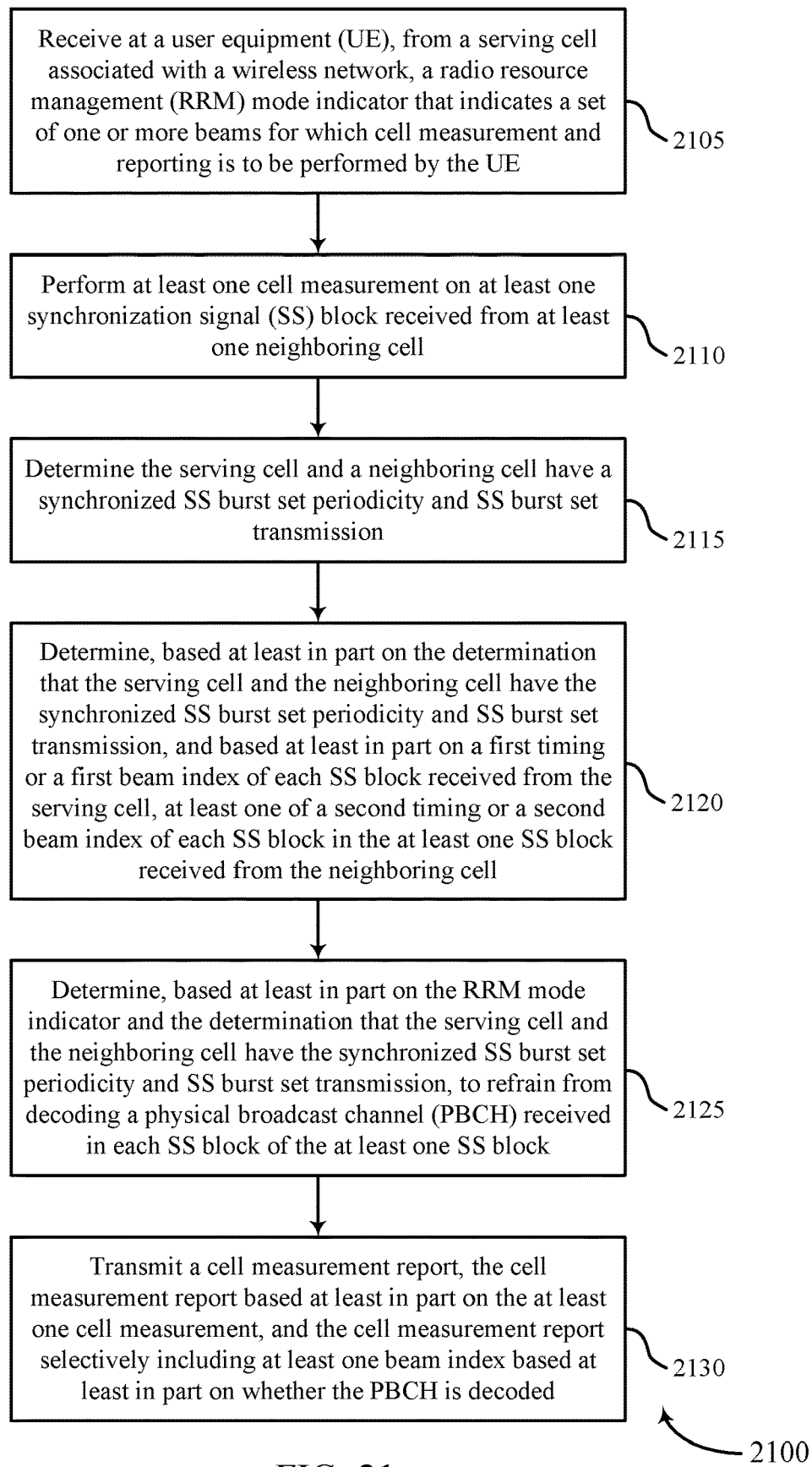

FIG. 21 is a flow chart illustrating an example of a method 2100 for wireless communications at a UE, in accordance with aspects of the present disclosure. For clarity, the method 2100 is described below with reference to aspects of one or more of the UEs described with reference to FIGS. 1, 3 through 5, and 12, aspects of one or more of the apparatuses described with reference to FIGS. 6 and 8, or aspects of one or more of the UE wireless communications managers described with reference to FIGS. 6 through 8 and 12. In some examples, a UE may execute one or more sets of codes to control the functional elements of the UE to perform the functions described below. Additionally or alternatively, the UE may perform one or more of the functions described below using special-purpose hardware.

At block 2105, the method 2100 may include receiving at the UE, from a serving cell associated with a wireless network, an RRM mode indicator that indicates a set of one or more beams for which cell measurement and reporting is to be performed by the UE. In some examples, the operation(s) at block 2105 may also include receiving, from the serving cell, an indicator of a maximum number of SS blocks in an SS burst set of a neighboring cell. In some examples, the RRM mode indicator may be associated with a cell measurement report transmission periodicity. The cell measurement report transmission periodicity may be based at least in part on whether the RRM mode indicator indicates per cell measurement reporting or per beam measurement reporting. In some examples, the operation(s) at block 2105 may be performed using the RRM mode manager described with reference to FIGS. 6 and 7.

At block 2110, the method 2100 may include performing at least one cell measurement on at least one SS block received from at least one neighboring cell. In some examples, the operation(s) at block 2110 may be performed using the cell measurement manager described with reference to FIGS. 6 and 7.

At block 2115, the method 2100 may include determining the serving cell and a neighboring cell have a synchronized SS burst set periodicity and SS burst set transmission. In some examples, the operation(s) at block 2115 may be performed using the PBCH decoding manager described with reference to FIGS. 6 and 7.

At block 2120, the method 2100 may include determining, based at least in part on the determination that the serving cell and the neighboring cell have the synchronized SS burst set periodicity and SS burst set transmission, and based at least in part on a first timing or a first beam index of each SS block received from the serving cell, at least one of a second timing or a second beam index of each SS block in the at least one SS block received from the neighboring cell. In some examples, the operation(s) at block 2120 may be performed using the cell measurement manager described with reference to FIGS. 6 and 7.

At block 2125, the method 2100 may include determining, based at least in part on the RRM mode indicator and the determination that the serving cell and the neighboring cell have the synchronized SS burst set periodicity and SS burst set transmission, to refrain from decoding a PBCH received in each SS block of the at least one SS block. In some examples, the operation(s) at block 2125 may be performed using the PBCH decoding manager described with reference to FIGS. 6 and 7.

At block 2130, the method 2100 may include transmitting a cell measurement report (e.g., to the serving cell). The cell measurement report may be based at least in part on the at least one cell measurement. The cell measurement report may selectively include at least one beam index based at least in part on whether the PBCH is decoded. In some examples, the operation(s) at block 2130 may be performed using the cell measurement report manager described with reference to FIGS. 6 and 7.

In some examples of the method 2100, the operation(s) at block 2105 may further include receiving at the UE, from the serving cell, an indicator of a measurement window smaller than an SS burst set periodicity of the serving cell and the at least one neighboring cell, and the operation(s) at block 2110 may further include performing the at least one cell measurement on the at least one SS block received from the at least one neighboring cell, and at least one measurement on at least one SS block received from the serving cell, during the measurement window.

In some examples, the method 2100 may further include determining an indicator of a measurement window is not received from the serving cell (e.g., using the measurement window manager described with reference to FIG. 7). In these examples, the operation(s) at block 2110 may further include performing, based at least in part on the determination that the indicator of the measurement window is not received, the at least one cell measurement on the at least one SS block during a measurement gap. The operation(s) at block 2110 may also include performing, based at least in part on the determination that the indicator of the measurement window is not received, and during a measurement window larger than an SS burst set periodicity of the serving cell and the at least one neighboring cell, at least one measurement on at least one SS block received from the serving cell.

Figure 22:
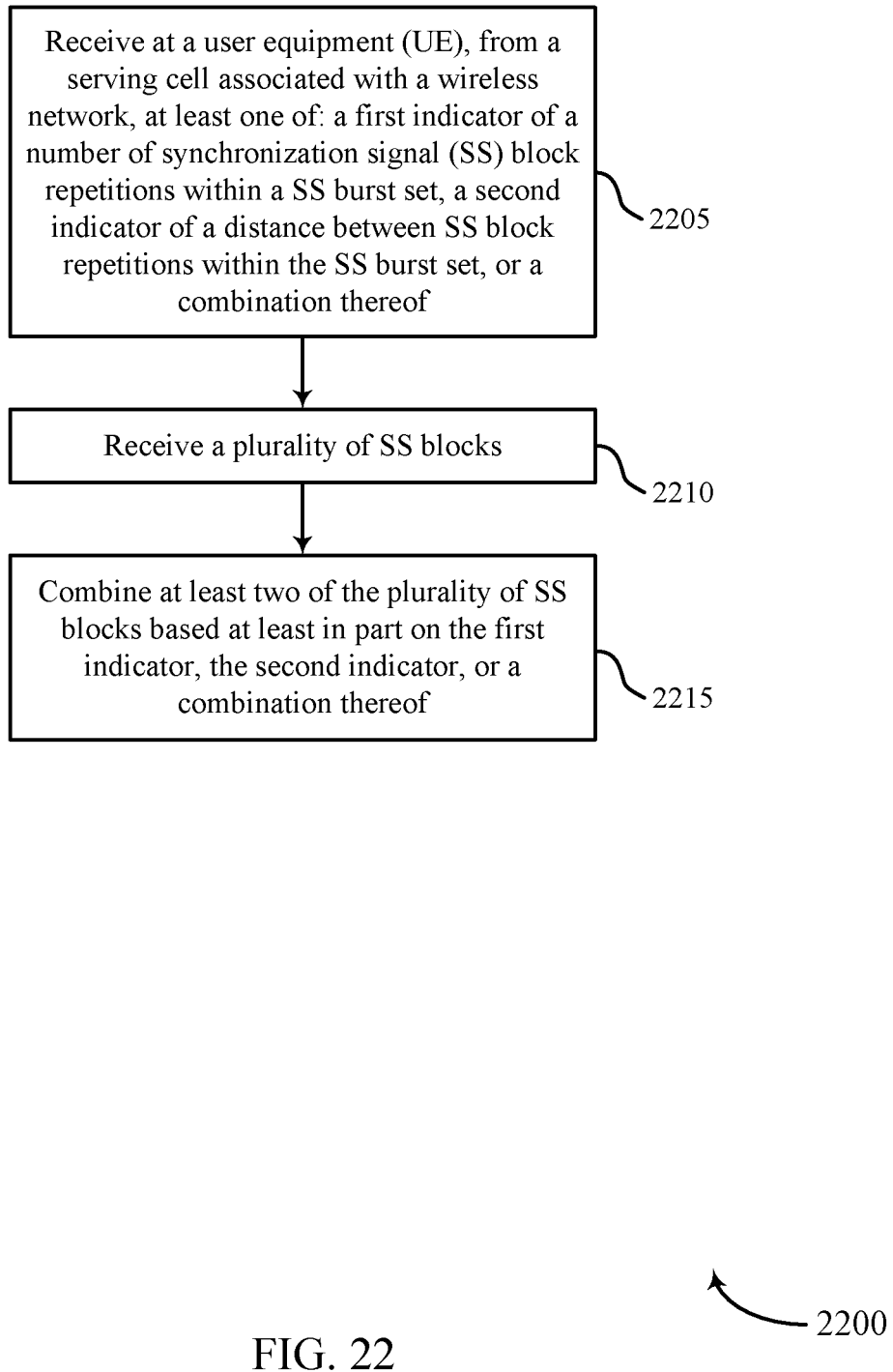

FIG. 22 is a flow chart illustrating an example of a method 2200 for wireless communications at a UE, in accordance with aspects of the present disclosure. For clarity, the method 2200 is described below with reference to aspects of one or more of the UEs described with reference to FIGS. 1, 3 through 5, and 12, aspects of one or more of the apparatuses described with reference to FIGS. 6 and 8, or aspects of one or more of the UE wireless communications managers described with reference to FIGS. 6 through 8 and 12. In some examples, a UE may execute one or more sets of codes to control the functional elements of the UE to perform the functions described below. Additionally or alternatively, the UE may perform one or more of the functions described below using special-purpose hardware.

At block 2205, the method 2200 may include receiving at the UE, from a serving cell associated with a wireless network, a first indicator of a number of SS block repetitions within an SS burst set, a second indicator of a distance between SS block repetitions within the SS burst set, or a combination thereof. In some examples, the operation(s) at block 2205 may be performed using the SS block repetition manager described with reference to FIG. 8.

At block 2210, the method 2200 may include receiving a plurality of SS blocks. In some examples, the plurality of SS blocks may be received from the serving cell, a neighboring cell, or a combination thereof. In some examples, the operation(s) at block 2210 may be performed using the SS block reception manager described with reference to FIG. 8.

At block 2215, the method 2200 may include combining at least two of the plurality of SS blocks based at least in part on the first indicator, the second indicator, or a combination thereof. In some examples, the operation(s) at block 2215 may be performed using the SS block combiner described with reference to FIG. 8.

Figure 23:
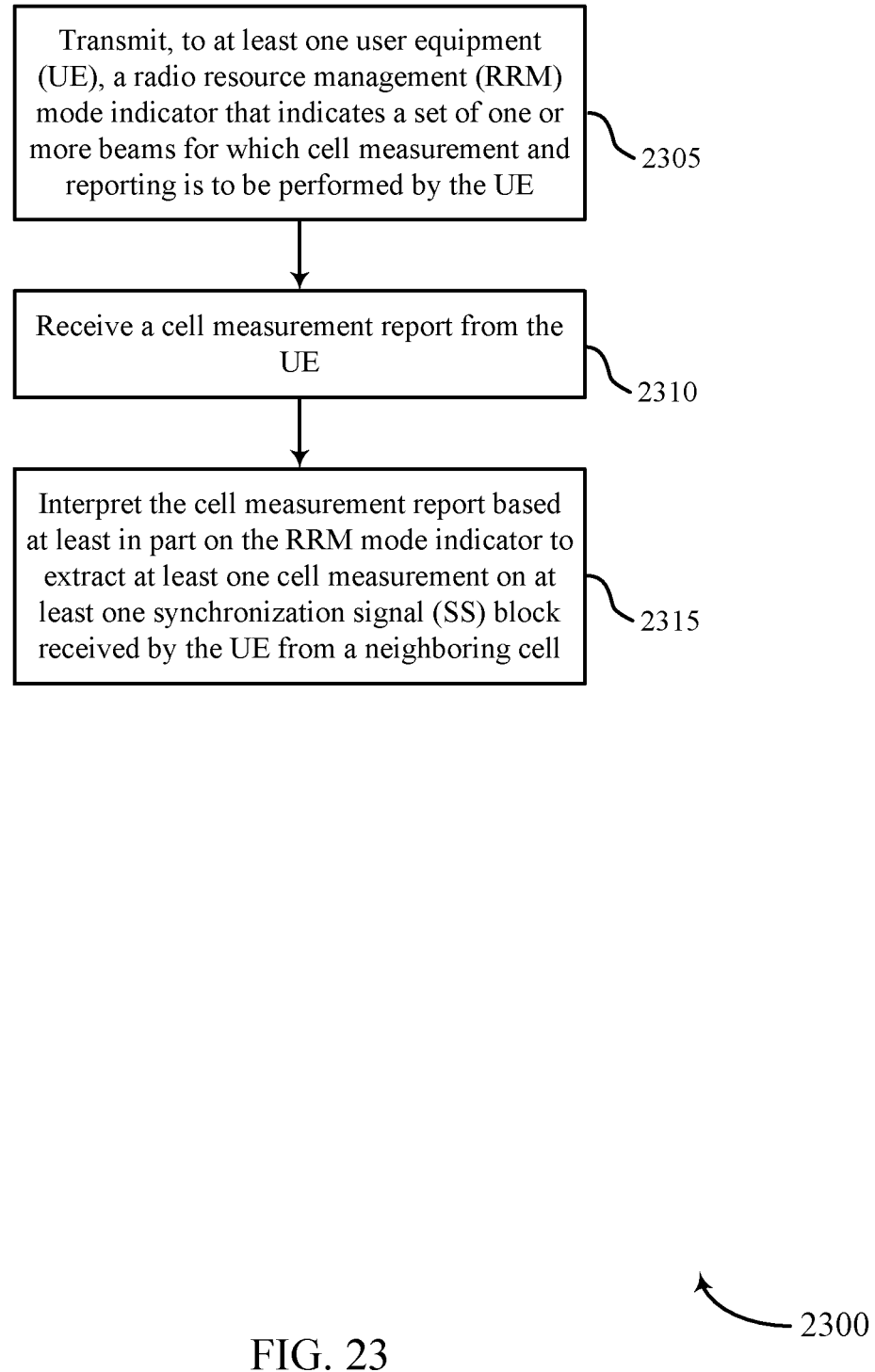
FIGS. 23 and 24 are flow charts illustrating examples of methods for wireless communications at a base station, in accordance with aspects of the present disclosure.

FIG. 23 is a flow chart illustrating an example of a method 2300 for wireless communications at a base station, in accordance with aspects of the present disclosure. For clarity, the method 2300 is described below with reference to aspects of one or more of the base stations described with reference to FIGS. 1, 3 through 5, and 13, aspects of one or more of the apparatuses described with reference to FIGS. 9 and 11, or aspects of one or more of the base station wireless communications managers described with reference to FIGS. 9 through 11 and 13. In some examples, a base station may execute one or more sets of codes to control the functional elements of the base station to perform the functions described below. Additionally or alternatively, the base station may perform one or more of the functions described below using special-purpose hardware.

At block 2305, the method 2300 may include transmitting, to a UE, an RRM mode indicator that indicates a set of one or more beams for which cell measurement and reporting is to be performed by the UE. In some examples, the RRM mode indicator may be associated with a cell measurement report transmission periodicity. In some examples, the cell measurement report transmission periodicity may be based at least in part on whether the RRM mode indicator indicates per cell measurement reporting or per beam measurement reporting. In some examples, the operation(s) at block 2305 may be performed using the RRM mode manager described with reference to FIGS. 9 and 10.

At block 2310, the method 2300 may include receiving a cell measurement report from the UE. In some examples, the operation(s) at block 2310 may be performed using the cell measurement report reception manager described with reference to FIGS. 9 and 10.

At block 2315, the method 2300 may include interpreting the cell measurement report, based at least in part on the RRM mode indicator, to extract at least one cell measurement on at least one SS block received by the UE from at least one neighboring cell. In some examples, the operation(s) at block 2315 may be performed using the cell measurement report interpreter described with reference to FIGS. 9 and 10.

In some examples, the operation(s) at block 2305 may further include transmitting, to the UE, at least one cell measurement threshold for determining whether the UE should include a cell measurement in the cell measurement report. In some examples, the operation(s) at block 2305 may include transmitting, to the UE, an indicator of a measurement window smaller than an SS burst set periodicity of a serving cell for the UE and the at least one neighboring cell. In some examples, the operation(s) at block 2305 may include transmitting, to the UE, a maximum number of SS blocks in an SS burst set of a neighboring cell.

In some examples of the method 2300, the set of one or more beams indicated by the RRM mode indicator may include a single beam, and interpreting the cell measurement report at block 2315 may include interpreting the cell measurement report, based at least in part on the RRM mode indicator, to include an association of a cell ID of a neighboring cell and the at least one cell measurement.

In some examples of the method 2300, the set of one or more beams indicated by the RRM mode indicator may include a plurality of beams, and interpreting the cell measurement report at block 2315 may include interpreting the cell measurement report, based at least in part on the RRM mode indicator, to include an association of a cell ID of a neighboring cell and a maximum value of the at least one cell measurement.

In some examples of the method 2300, the set of one or more beams indicated by the RRM mode indicator may include a plurality of beams, and interpreting the cell measurement report at block 2315 may include interpreting the cell measurement report, based at least in part on the RRM mode indicator, to include an association of a cell ID of a neighboring cell, a beam index, and a maximum value of the at least one cell measurement.

In some examples of the method 2300, the set of one or more beams indicated by the RRM mode indicator may include a plurality of beams, and interpreting the cell measurement report at block 2315 may include interpreting the cell measurement report, based at least in part on the RRM mode indicator, to include, for each beam in a set of one or more beams, an association of a cell ID of a neighboring cell, a beam index for a beam in the set of one or more beams, and a maximum value of the at least one cell measurement for the beam in the set of one or more beams.

Figure 24:
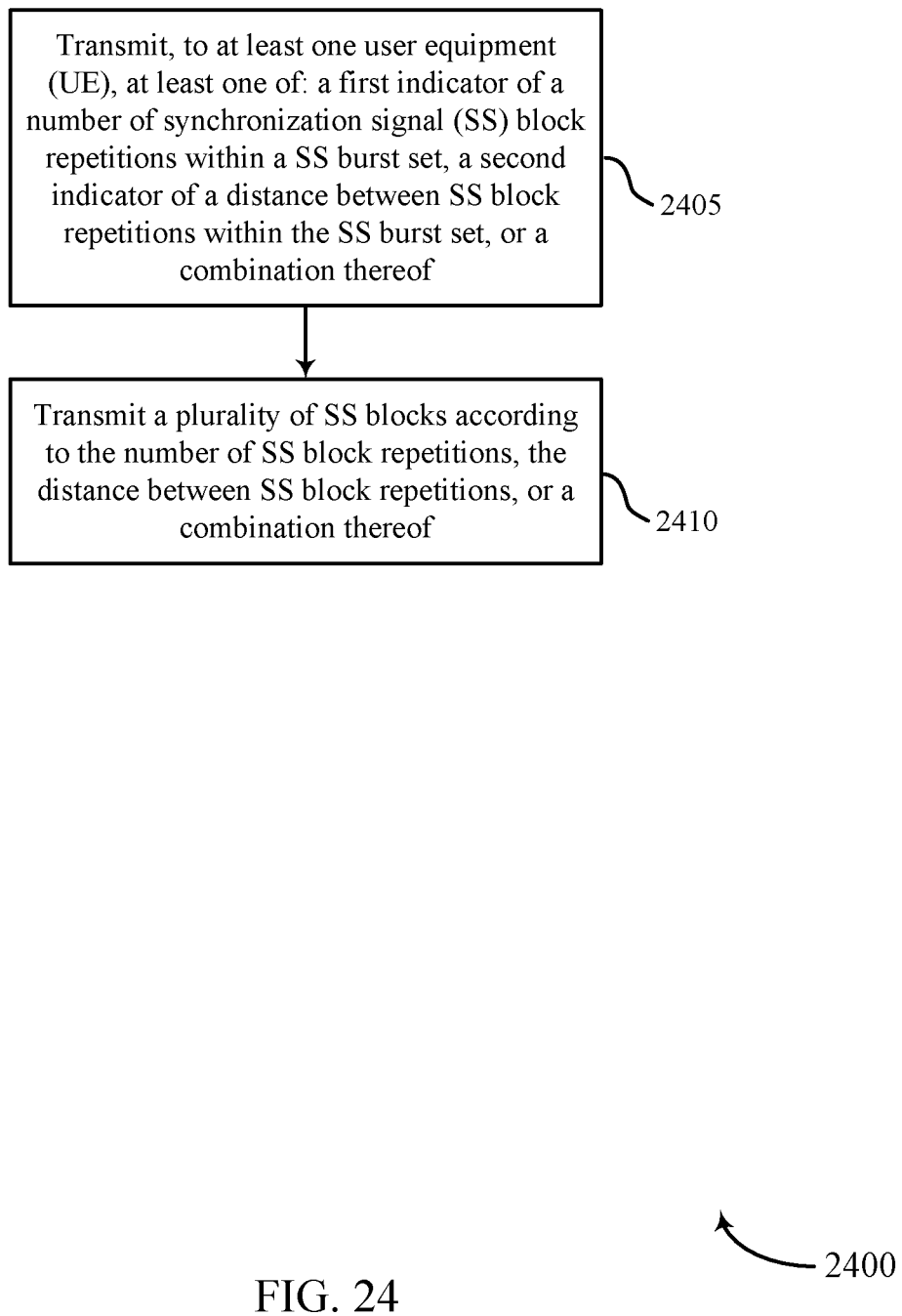

FIG. 24 is a flow chart illustrating an example of a method 2400 for wireless communications at a base station, in accordance with aspects of the present disclosure. For clarity, the method 2400 is described below with reference to aspects of one or more of the base stations described with reference to FIGS. 1, 3 through 5, and 13, aspects of one or more of the apparatuses described with reference to FIGS. 9 and 11, or aspects of one or more of the base station wireless communications managers described with reference to FIGS. 9 through 11 and 13. In some examples, a base station may execute one or more sets of codes to control the functional elements of the base station to perform the functions described below. Additionally or alternatively, the base station may perform one or more of the functions described below using special-purpose hardware.

At block 2405, the method 2400 may include transmitting, to a UE, a first indicator of a number of SS block repetitions within an SS burst set, a second indicator of a distance between SS block repetitions within the SS burst set, or a combination thereof. In some examples, the operation(s) at block 2405 may be performed using the SS block repetition indicator described with reference to FIG. 11.

At block 2410, the method 2400 may include transmitting a plurality of SS blocks according to the number of SS block repetitions, the distance between SS block repetitions, or a combination thereof. In some examples, the operation(s) at block 2410 may be performed using the SS block transmission manager described with reference to FIG. 11.

The methods 1400, 1500, 1600, 1700, 1800, 1900, 2000, 2100, 2200, 2300, and 2400 are example implementations of some of the techniques described in the present disclosure, and the operations of the methods may be rearranged, combined with other operations of the same or a different method, or otherwise modified, such that other implementations are possible. In some examples, operations of the methods 1400, 1500, 1600, 1700, 1800, 1900, 2000, 2100, or 2200 may be combined. In some examples, operations of the methods 2300 and 2400 may be combined. In some examples, operations may be added to the methods.

Techniques described herein may be used for various wireless communications systems such as CDMA, time-division multiple access (TDMA), frequency-division multiple access (FDMA), orthogonal frequency-division multiple access (OFDMA), SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunications system (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communications at a user equipment (UE), comprising:
   receiving at the UE, from a serving cell associated with a wireless network, radio resource control (RRC) messaging comprising a beam indicator that indicates a set of one or more beams for which cell measurement and reporting is to be performed by the UE, wherein the RRC messaging comprises at least one indication of whether the UE is to utilize a timing of the serving cell to derive a synchronization signal (SS) block index for at least one SS block received from at least one neighboring cell;
   determining, for each neighboring cell of the at least one neighboring cell, whether to decode or to refrain from decoding a physical broadcast channel (PBCH) within the at least one SS block received from the at least one neighboring cell based at least in part on the at least one indication of whether the UE is to utilize the timing of the serving cell to derive the SS block index;
   performing at least one cell measurement on the at least one SS block received from the at least one neighboring cell and at leas tone cell measurement on at least one SS block received from the serving cell; and
   transmitting a cell measurement report, the cell measurement report based at least in part on the at least one cell measurement on the at least one SS block received from the at least one neighboring cell and on the at least one cell measurement on the at least one SS block received from the serving cell.

2. The method of claim 1, wherein the at least one cell measurement on the at least one SS block received from the at least one neighboring cell comprises at least one intra-frequency measurement on the at least one SS block received from the at least one neighboring cell.

3. The method of claim 1, further comprising:
   determining that the serving cell and a neighboring cell of the at least one neighboring cell have a synchronized SS burst set periodicity and SS burst set transmission; and
   determining, based at least in part on the determination that the serving cell and the neighboring cell have the synchronized SS burst set periodicity and SS burst set transmission, and based at least in part on a first timing of each SS block received from the serving cell, a second timing of each SS block in the at least one SS block received from the neighboring cell, wherein the timing of the serving cell comprises the first timing of each SS block received from the serving cell.

4. The method of claim 1, wherein the set of one or more beams indicated by the beam indicator comprises a single beam, the method further comprising:
   monitoring the single beam for the at least one SS block from the at least one neighboring cell;
   determining, based at least in part on the beam indicator and the at least one indication, to refrain from decoding the PBCH received in each SS block of the at least one SS block from the at least one neighboring cell; and
   formatting the cell measurement report, based at least in part on the beam indicator, to include an association of a cell identity (cell ID) of a neighboring cell of the at least one neighboring cell and one or more of the at least one cell measurement on the at least one SS block received from the at least one neighboring cell and the at least one cell measurement on the at least one SS block received from the serving cell.

5. The method of claim 1, wherein the set of one or more beams indicated by the beam indicator comprises a plurality of beams, the method further comprising:
   monitoring the plurality of beams for the at least one SS block from the at least one neighboring cell.

6. The method of claim 5, further comprising:
   determining a maximum value of the at least one cell measurement on the at least one SS block received from the at least one neighboring cell and the at least one cell measurement on the at least one SS block received from the serving cell;
   determining, based at least in part on the beam indicator and the at least one indication, to refrain from decoding the PBCH received in each SS block of the at least one SS block from the at least one neighboring cell; and
   formatting the cell measurement report, based at least in part on the beam indicator, to include an association of a cell identity (cell ID) of a neighboring cell of the at least one neighboring cell and the maximum value of the at least one cell measurement on the at least one SS block received from the at least one neighboring cell and the at least one cell measurement on the at least one SS block received from the serving cell.

7. The method of claim 5, further comprising:
   determining a maximum value of the at least one cell measurement on the at least one SS block received from the at least one neighboring cell and the at least one cell measurement on the at least one SS block received from the serving cell;
   determining, based at least in part on the beam indicator and the at least one indication, to decode a first PBCH received in a first SS block associated with the maximum value of the at least one cell measurement on the at least one SS block received from the at least one neighboring cell; and
   formatting the cell measurement report, based at least in part on the beam indicator, to include an association of a cell identity (cell ID) of a neighboring cell of the at least one neighboring cell, a beam index obtained from the decoded first PBCH, and the maximum value of the at least one cell measurement on the at least one SS block received from the at least one neighboring cell and the at least one cell measurement on the at least one SS block received from the serving cell.

8. The method of claim 5, further comprising:
determining a maximum value of the at least one cell measurement on the at least one SS block received from the at least one neighboring cell and the at least one cell measurement on the at least one SS block received from the serving cell;
determining that the maximum value satisfies a threshold;
determining, based at least in part on the beam indicator, the at least one indication, and the determination that the maximum value satisfies the threshold, to decode a first PBCH received in a first SS block associated with the maximum value of the at least one cell measurement on the at least one SS block received from the at least one neighboring cell; and
formatting the cell measurement report, based at least in part on the beam indicator and the determination that the maximum value satisfies the threshold, to include an association of a cell identity (cell ID) of a neighboring cell of the at least one neighboring cell, a beam index obtained from the decoded first PBCH, and the maximum value of the at least one cell measurement on the at least one SS block received from the at least one neighboring cell and the at least one cell measurement on the at least one SS block received from the serving cell.

9. The method of claim 8 further comprising:
receiving the threshold from the serving cell.

10. The method of claim 5, further comprising:
determining a maximum value of the at least one cell measurement on the at least one SS block received from the at least one neighboring cell and the at least one cell measurement on the at least one SS block received from the serving cell;
determining that the maximum value fails to satisfy a threshold;
determining, based at least in part on the beam indicator, the at least one indication, and the determination that the maximum value fails to satisfy the threshold, to refrain from decoding the PBCH received in each SS block of the at least one SS block from the at least one neighboring cell; and
formatting the cell measurement report, based at least in part on the beam indicator and the determination that the maximum value fails to satisfy the threshold, to include an association of a cell identity (cell ID) of a neighboring cell of the at least one neighboring cell and the maximum value of the at least one cell measurement on the at least one SS block received from the at least one neighboring cell and the at least one cell measurement on the at least one SS block received from the serving cell.

11. The method of claim 5, further comprising:
determining a per beam maximum value of the at least one cell measurement on the at least one SS block received from the at least one neighboring cell and the at least one cell measurement on the at least one SS block received from the serving cell, for the set of one or more beams;
identifying one or more of the maximum values that satisfies a threshold;
determining, based at least in part on the beam indicator, the at least one indication, and the identified one or more of the maximum values that satisfy the threshold, to decode a set of one or more PBCHs received in a set of one or more SS blocks associated with the identified one or more of the maximum values; and
formatting the cell measurement report, based at least in part on the beam indicator and the identified one or more of the maximum values that satisfies the threshold, to include, per beam associated with the identified one or more of the maximum values, an association of a cell identity (cell ID) of a neighboring cell of the at least one neighboring cell, a beam index obtained from a decoded PBCH, and a corresponding maximum value of the identified one or more of the maximum values.

12. The method of claim 5, further comprising:
determining a per beam maximum value of the at least one cell measurement on the at least one SS block received from the at least one neighboring cell and the at least one cell measurement on the at least one SS block received from the serving cell, for the set of one or more beams;
determining that each of the maximum values fail to satisfy a threshold;
determining, based at least in part on the beam indicator, the at least one indication, and the failure of each of the maximum values to satisfy the threshold, to refrain from decoding the PBCH received in each SS block of the at least one SS block from the at least one neighboring cell; and
formatting the cell measurement report, based at least in part on the beam indicator and the failure of each of the maximum values to satisfy the threshold, to include an association of a cell identity (cell ID) of a neighboring cell of the at least one neighboring cell and the maximum value of the at least one cell measurement on the at least one SS block received from the at least one neighboring cell and the at least one cell measurement on the at least one SS block received from the serving cell.

13. The method of claim 5, further comprising:
determining a per beam maximum value of the at least one cell measurement on the at least one SS block received from the at least one neighboring cell and the at least one cell measurement on the at least one SS block received from the serving cell, for the set of one or more beams;
determining, based at least in part on the beam indicator and the at least one indication, to decode a set of one or more PBCHs received in a set of one or more SS blocks associated with the determined maximum values; and
formatting the cell measurement report, based at least in part on the beam indicator, to include, per beam of the set of one or more beams, an association of a cell identity (cell ID) of a neighboring cell of the at least one neighboring cell, a beam index obtained from a decoded PBCH, and a corresponding maximum value of the determined maximum values.

14. The method of claim 1, wherein an SS burst set periodicity of the at least one neighboring cell is based at least in part on an SS burst set of the at least one neighboring cell.

15. The method of claim 1, wherein the beam indicator is associated with a cell measurement report transmission periodicity.

16. The method of claim 1, wherein the beam indicator is an RRM mode indicator.

17. An apparatus for wireless communications at a user equipment (UE), comprising:
a processor;
memory in electronic communication with the processor; and instructions stored in the memory and executable by the processor to cause the apparatus to:

receive at the UE, from a serving cell associated with a wireless network, radio resource control (RRC) messaging comprising a beam indicator that indicates a set of one or more beams for which cell measurement and reporting is to be performed by the UE, wherein the RRC messaging comprises at least one indication of whether the UE is to utilize a timing of the serving cell to derive a synchronization signal (SS) block index for at least one SS block received from at least one neighboring cell;

determine, for each neighboring cell of the at least one neighboring cell, whether to decode or to refrain from decoding a physical broadcast channel (PBCH) within the at least one SS block received from the at least one neighboring cell based at least in part on the at least one indication of whether the UE is to utilize the timing of the serving cell to derive the SS block index;

perform at least one cell measurement on the at least one SS block received from the at least one neighboring cell and at least one cell measurement on at least one SS block received from the serving cell; and transmit a cell measurement report, the cell measurement report based at least in part on the at least one cell measurement on the at least one SS block received from the at least one neighboring cell and the at least one cell measurement on the at least one SS block received from the serving cell.

18. A method of wireless communications at a base station, comprising:

transmitting, to a user equipment (UE), radio resource control (RRC) messaging comprising a beam indicator that indicates a set of one or more beams for which cell measurement and reporting is to be performed by the UE, wherein the RRC messaging comprises at least one indication of whether the UE is to utilize a timing of a serving cell associated with the base station to derive a synchronization signal (SS) block index for at least one SS block transmitted by at least one neighboring cell;

receiving a cell measurement report from the UE, the cell measurement report based at least in part on at least one cell measurement performed on the at least one SS block received by the UE from the at least one neighboring cell and at least one cell measurement performed on at least one SS block received by the UE from the serving cell; and interpreting the cell measurement report, based at least in part on the beam indicator, to extract the at least one cell measurement on the at least one SS block received by the UE from at least one neighboring cell during a transmission time interval, and to extract the at least one cell measurement on the at least one SS block received by the UE from a serving cell.

19. The method of claim 18, wherein the set of one or more beams indicated by the beam indicator comprises a single beam, and wherein interpreting the cell measurement report comprises:

interpreting the cell measurement report, based at least in part on the beam indicator, to include an association of a cell identity (cell ID) of a neighboring cell of the at least one neighboring cell, the at least one cell measurement on the at least one SS block received by the UE from the at least one neighboring cell, and the at least one cell measurement on the at least one SS block received by the UE from the serving cell.

20. The method of claim 18, wherein the set of one or more beams indicated by the beam indicator comprises a plurality of beams.

21. The method of claim 20, wherein interpreting the cell measurement report comprises:

interpreting the cell measurement report, based at least in part on the beam indicator, to include an association of a cell identity (cell ID) of a neighboring cell of the at least one neighboring cell, a maximum value of the at least one cell measurement on the at least one SS block received by the UE from the at least one neighboring cell, and the at least one cell measurement on the at least one SS block received by the UE from the serving cell.

22. The method of claim 20, wherein interpreting the cell measurement report comprises:

interpreting the cell measurement report, based at least in part on the beam indicator, to include an association of a cell identity (cell ID) of a neighboring cell of the at least one neighboring cell, a beam index, a maximum value of the at least one cell measurement on the at least one SS block received by the UE from the at least one neighboring cell, and the at least one cell measurement on the at least one SS block received by the UE from the serving cell.

23. The method of claim 20, wherein interpreting the cell measurement report comprises:

interpreting the cell measurement report, based at least in part on the beam indicator, to include, for each beam in the set of one or more beams, an association of a cell identity (cell ID) of a neighboring cell of the at least one neighboring cell, a beam index for a beam in the set of one or more beams, a maximum value of the at least one cell measurement on at least one SS block received by the UE from the at least one neighboring cell for the beam in the set of one or more beams, and a maximum value of the at least one cell measurement on the at least one SS block received by the UE from the serving cell for the beam in the set of one or more beams.

24. The method of claim 18, further comprising:

transmitting, to the UE, at least one cell measurement threshold for determining whether the UE should include a cell measurement in the cell measurement report.

25. The method of claim 18, wherein an SS burst set periodicity of the at least one neighboring cell is based at least in part on an SS burst set of the at least one neighboring cell.

26. The method of claim 18, wherein the beam indicator is associated with a cell measurement report transmission periodicity.

27. The method of claim 26, wherein the cell measurement report transmission periodicity is based at least in part on whether the beam indicator indicates per cell measurement reporting or per beam measurement reporting.

28. An apparatus for wireless communications at a base station, comprising:

a processor;

memory in electronic communication with the processor; and instructions stored in the memory and executable by the processor to cause the apparatus to:

transmit, to a user equipment (UE), radio resource control (RRC) messaging comprising a beam indicator that indicates a set of one or more beams for which cell measurement and reporting is to be performed by the UE, wherein the RRC messaging comprises at least one indication of whether the UE is to utilize timing of a serving cell associated with the base station to derive a synchronization signal (SS) block index for at least one SS block transmitted by at least one neighboring cell;

receive a cell measurement report from the UE, the cell measurement report based at least in part on at least one cell measurement performed on at least one SS block received by the UE from the at least one neighboring cell and at least one cell measurement performed on at least one SS block received by the UE from the serving cell; and interpret the cell measurement report, based at least in part on the beam indicator, to extract the at least one cell measurement on the at least one SS block received by the UE from at least one neighboring cell during a transmission time interval, and to extract the at least one cell measurement on the at least one SS block received by the UE from a serving cell.

* * * * *